United States Patent
Cho et al.

(10) Patent No.: US 10,811,002 B2
(45) Date of Patent: Oct. 20, 2020

(54) ELECTRONIC DEVICE AND METHOD FOR CONTROLLING THE SAME

(71) Applicant: Samsung Electronics Co., Ltd., Suwon-si, Gyeonggi-do (KR)

(72) Inventors: Chi-Hyun Cho, Suwon-si (KR); Dong-Il Son, Hwaseong-si (KR); Kyung-Tae Kim, Hwaseong-si (KR); Ji-Min Lee, Suwon-si (KR); Chang-Ryong Heo, Suwon-si (KR); Jae-Bong Chun, Suwon-si (KR); Gyu-Cheol Choi, Yongin-si (KR); Chang-Taek Kang, Suwon-si (KR); Chang-Soo Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/341,454

(22) Filed: Nov. 2, 2016

(65) Prior Publication Data

US 2017/0133009 A1 May 11, 2017

(30) Foreign Application Priority Data

Nov. 10, 2015 (KR) .................. 10-2015-0157196

(51) Int. Cl.
| | |
|---|---|
| *G10L 15/22* | (2006.01) |
| *G10L 15/183* | (2013.01) |
| *G06F 40/279* | (2020.01) |
| *G10L 25/63* | (2013.01) |
| *G10L 15/08* | (2006.01) |

(52) U.S. Cl.
CPC ............ *G10L 15/183* (2013.01); *G10L 15/22* (2013.01); *G06F 40/279* (2020.01); *G10L 25/63* (2013.01); *G10L 2015/088* (2013.01); *G10L 2015/223* (2013.01)

(58) Field of Classification Search
CPC ........................ G10L 15/22; G10L 2015/088
USPC ....................................................... 704/275
See application file for complete search history.

(56) References Cited

U.S. PATENT DOCUMENTS

| | | | |
|---|---|---|---|
| 5,799,279 A | 8/1998 | Gould et al. | |
| 7,120,234 B1 * | 10/2006 | Quinn ................. | H04M 1/2473 |
| | | | 379/88.04 |
| 8,521,531 B1 | 8/2013 | Kim | |
| 9,119,069 B1 * | 8/2015 | Vipond ................ | H04W 12/06 |
| 9,294,476 B1 * | 3/2016 | Lurey ................. | H04L 63/0861 |

(Continued)

FOREIGN PATENT DOCUMENTS

| | | |
|---|---|---|
| WO | 2015/079669 A1 | 6/2015 |
| WO | 2015-088141 A1 | 6/2015 |

*Primary Examiner* — Jakieda R Jackson
(74) *Attorney, Agent, or Firm* — Jefferson IP Law, LLP

(57) ABSTRACT

An electronic device and a method for controlling the electronic device are disclosed. The electronic device includes a memory and a processor electrically connected with the memory. The memory stores instructions to be executed by the processor. The processor is configured to obtain a user voice, determine a response level of the user voice, when the response level of the user voice is a first response level, perform an operation corresponding to the user voice based on a time point of obtaining the user voice, and when the response level of the user voice is a second response level, perform the operation corresponding to the user voice based on a time point of detecting an additional event.

22 Claims, 63 Drawing Sheets

(56) References Cited

U.S. PATENT DOCUMENTS

| | | | |
|---|---|---|---|
| 2001/0047265 A1 | 11/2001 | Sepe, Jr. | |
| 2003/0191629 A1* | 10/2003 | Yoshizawa | G10L 15/22 |
| | | | 704/10 |
| 2004/0019489 A1* | 1/2004 | Funk | H04L 12/2803 |
| | | | 704/275 |
| 2006/0223509 A1* | 10/2006 | Fukazawa | G06Q 10/10 |
| | | | 455/414.3 |
| 2007/0118357 A1 | 5/2007 | Kasravi et al. | |
| 2007/0239443 A1 | 10/2007 | Koyama | |
| 2008/0235031 A1 | 9/2008 | Yamamoto | |
| 2008/0288259 A1* | 11/2008 | Chambers | G10L 15/22 |
| | | | 704/275 |
| 2009/0112602 A1* | 4/2009 | Alfred | H04L 12/2818 |
| | | | 704/273 |
| 2010/0088100 A1* | 4/2010 | Lindahl | G10L 15/30 |
| | | | 704/270.1 |
| 2010/0174546 A1 | 7/2010 | Kim et al. | |
| 2011/0087670 A1 | 4/2011 | Jorstad et al. | |
| 2011/0301958 A1 | 12/2011 | Brush et al. | |
| 2012/0058783 A1* | 3/2012 | Kim | G06F 1/1626 |
| | | | 455/456.2 |
| 2013/0268687 A1* | 10/2013 | Schrecker | H04W 12/06 |
| | | | 709/229 |
| 2014/0108019 A1* | 4/2014 | Ehsani | G10L 21/06 |
| | | | 704/275 |
| 2014/0195230 A1 | 7/2014 | Han et al. | |
| 2014/0222436 A1* | 8/2014 | Binder | G06F 3/167 |
| | | | 704/275 |
| 2014/0275807 A1* | 9/2014 | Redei | A61B 5/0022 |
| | | | 600/300 |
| 2014/0282964 A1* | 9/2014 | Stubblefield | H04L 63/0853 |
| | | | 726/7 |
| 2015/0006184 A1 | 1/2015 | Marti et al. | |
| 2015/0112684 A1* | 4/2015 | Scheffer | G10L 17/14 |
| | | | 704/257 |
| 2015/0121216 A1* | 4/2015 | Brown | G06N 3/008 |
| | | | 715/707 |
| 2015/0187354 A1* | 7/2015 | Kim | G10L 15/22 |
| | | | 704/246 |
| 2015/0286204 A1* | 10/2015 | Yamaoka | G05B 19/056 |
| | | | 700/86 |
| 2015/0348554 A1* | 12/2015 | Orr | G10L 17/22 |
| | | | 704/275 |
| 2016/0012820 A1* | 1/2016 | Mun | G10L 15/32 |
| | | | 704/251 |
| 2016/0180844 A1* | 6/2016 | VanBlon | G10L 15/222 |
| | | | 704/275 |
| 2016/0267908 A1* | 9/2016 | Borjeson | G10L 25/78 |
| 2016/0314782 A1* | 10/2016 | Klimanis | G10L 15/065 |
| 2016/0349953 A1* | 12/2016 | Adler | G06Q 10/109 |
| 2016/0379634 A1 | 12/2016 | Yamamoto et al. | |
| 2016/0379638 A1* | 12/2016 | Basye | G10L 15/18 |
| | | | 704/235 |
| 2017/0046892 A1* | 2/2017 | Masters | G07C 9/00103 |
| 2017/0163435 A1* | 6/2017 | Ehsani | H04L 12/282 |

* cited by examiner

ELECTRONIC DEVICE AND METHOD FOR CONTROLLING THE SAME

CROSS-REFERENCE TO RELATED APPLICATION(S)

This application claims the benefit under 35 U.S.C. § 119(a) of a Korean patent application filed on Nov. 10, 2015 in the Korean Intellectual Property Office and assigned Serial No. 10-2015-0157196, the entire disclosure of which is incorporated herein by reference.

TECHNICAL FIELD

The present disclosure relates to electronic devices and methods for controlling the same. More particularly, the present disclosure relates to electronic devices performing operations corresponding to user commands and methods for controlling the same.

BACKGROUND

Voice command recognition techniques according to the related art are implemented largely in two types. The first type is a vocabulary level sentence analysis method. Electronic devices according to the related art carry out voice command recognition in such a manner as to previously store combinations of words for commands in a database, convert an entered user voice into text, and determine whether the converted text matches a combination previously stored in the database. The electronic devices according to the related art perform a command previously stored in the database in case the similarity between the converted text and a word in the database is a predetermined level or higher.

The second type is a meaning level sentence analysis method. Electronic devices according to the related art may conduct meaning level analysis by carrying out voice recognition generally utilizing ontology or semantic parsing. The electronic devices according to the related art may perform voice command recognition in such a manner as to configure a map for the correlation between the words forming the sentence of the converted text, identify the components, e.g., verb, subject, object, and adjective, of the sentence recognized using the same, extract the actual meaning from the identified components, and map to a particular command.

The above information is presented as background information only to assist with an understanding of the present disclosure. No determination has been made, and no assertion is made, as to whether any of the above might be applicable as prior art with regard to the present disclosure.

SUMMARY

Such voice command recognition techniques according to the related art may conduct a particular command corresponding to an entered voice if the entered voice is determined to correspond to the particular command and, if not, may take no action. That is, the voice command techniques according to the related art may or may not perform a command corresponding to a voice dichotomically.

Accordingly, although what is spoken out by the user does not expect any particular reaction, the electronic device according to the related art may perform a command corresponding to the user voice, resulting in the provision of a service or feedback that may not be desired by the user.

Aspects of the present disclosure are to address at least the above-mentioned problems and/or disadvantages and to provide at least the advantages described below. Accordingly, an aspect of the present disclosure, an electronic device may perform a command corresponding to a user voice immediately or after holding it until an additional event is detected so as to adjust the time of performing the command to the user's intention.

In accordance with an aspect of the present disclosure, an electronic device is provided. The electronic device includes a memory and a processor electrically connected with the memory, wherein the memory may store instructions for the processor to obtain a user voice, determine a response level of the user voice, when the response level of the user voice is a first response level, perform an operation corresponding to the user voice based on a time point of obtaining the user voice, and when the response level of the user voice is a second response level, perform the operation corresponding to the user voice based on a time point of detecting an additional event.

In accordance with another aspect of the present disclosure, a method for controlling an electronic device is provided. The method for controlling an electronic device includes obtaining a user voice, determining a response level of the user voice, when the response level of the user voice is a first response level, performing an operation corresponding to the user voice based on a time point of obtaining the user voice, and when the response level of the user voice is a second response level, performing the operation corresponding to the user voice based on a time point of detecting an additional event.

In accordance with another aspect of the present disclosure, the memory may store instructions executed to enable the processor to detect a first event set to run a first operation, determine whether a restricting condition on performing the first operation is met, when the restricting condition on performing the first operation is not met, perform the first operation based on a time point of detecting the first event, and when the restricting condition on performing the first operation is met, perform the first operation based on a time point of detecting a second event different from the first event.

In accordance with another aspect of the present disclosure, a method for controlling an electronic device is provided. The method for controlling an electronic device includes detecting a first event set to run a first operation, determining whether a restricting condition on performing the first operation is met, when the restricting condition on performing the first operation is not met, performing the first operation based on a time point of detecting the first event, and when the restricting condition on performing the first operation is met, performing the first operation based on a time point of detecting a second event different from the first event.

In accordance with another aspect of the present disclosure, an electronic device is provided. The electronic device includes a memory and a processor electrically connected with the memory, wherein the memory may store instructions for the processor to obtain a user motion, when a response level of the user motion is a first response level, perform an operation corresponding to the user motion based on a time point of obtaining a user voice, and when the response level of the user voice is a second response level, perform the operation corresponding to the user motion based on a time point of detecting an additional event.

In accordance with another aspect of the present disclosure, a method for controlling an electronic device is provided. The method for controlling an electronic device includes obtaining a user motion, determining a response level of the user motion, when a response level of the user motion is a first response level, performing an operation corresponding to the user motion based on a time point of obtaining a user voice, and when the response level of the user motion is a second response level, performing the operation corresponding to the user motion based on a time point of detecting an additional event.

In accordance with another aspect of the present disclosure, an electronic device is provided. The electronic device includes performing a command corresponding to a user voice immediately or after holding it until an additional event is detected so as to adjust the time of performing the command to the user's intention and method for controlling the electronic device. Accordingly, there may be provided an electronic device that may operate fitting more closely to the user's intention and a method for controlling the same.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
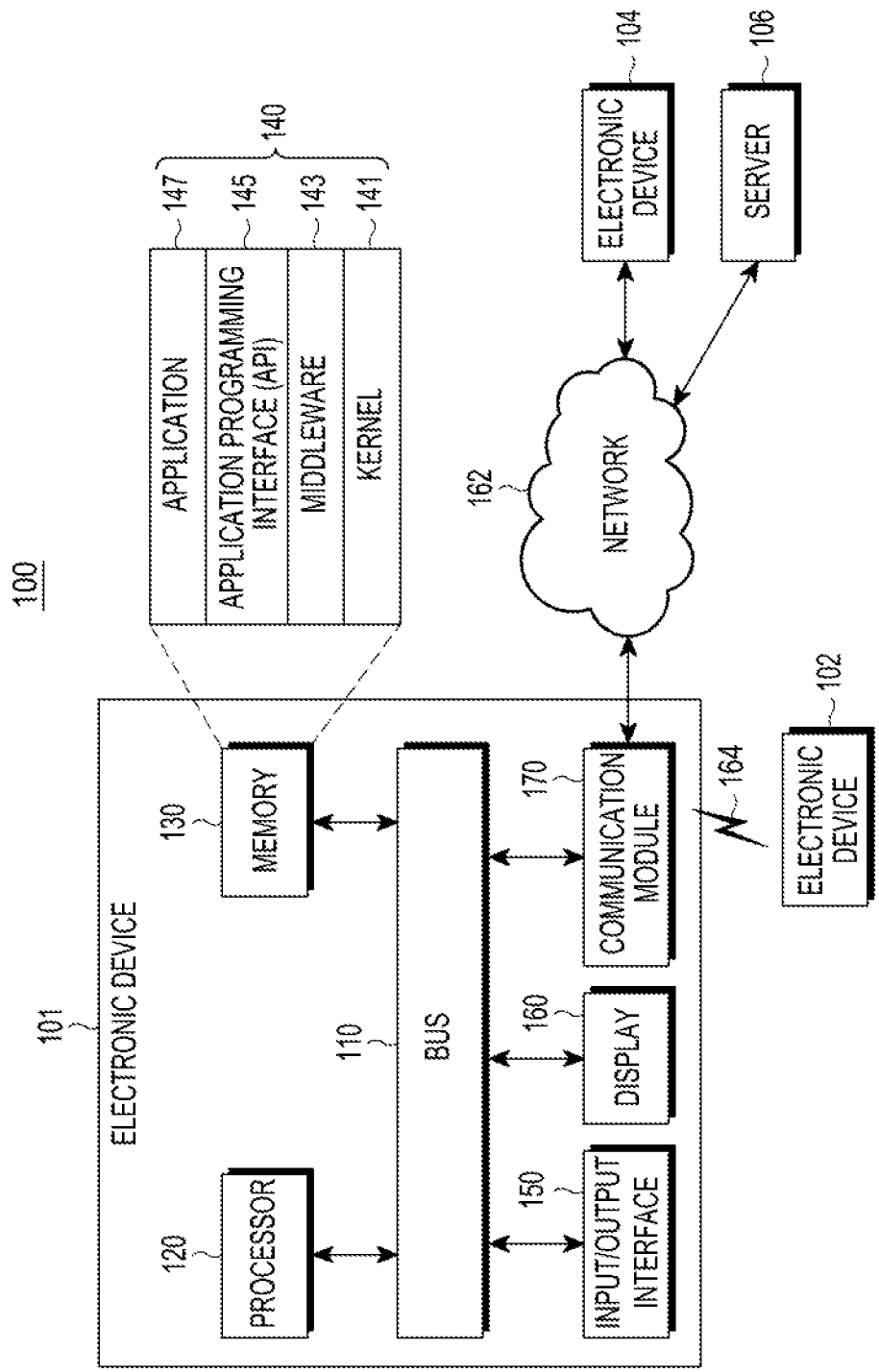
FIG. 1A is a block diagram illustrating an electronic device and a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device and a network according to an embodiment of the present disclosure.

Referring to FIG. 1A, an electronic device 101 is included in a network environment 100. The electronic device 101 may include a bus 110, a processor 120, a memory 130, an input/output interface 150, a display 160, and a communication module 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a central processing unit (CPU), an application processor (AP), a communication processor (CP), a graphic processor (GP), a multi-chip package (MCP), or an image processor (IP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device. The input/output interface 150 may include, e.g., a touch input device, a voice input unit, and various remote control devices. The input/output device 150 may be at least one or more means to provide a particular service to the user. For example, when information to be transferred is a sound, the input/output interface 150 may be a speaker, and when the information is text or image content, the input/output device 150 may be a display device. Further, in order to provide a service under the circumstance where the user does not approach the electronic device 101, data to be output may be transferred to at least one or more other electronic devices through a communication module and may then be output. Here, the other electronic devices may be speakers or other display devices.

The display 160 may include, e.g., a liquid crystal display (LCD), a light emitting diode (LED) display, an organic light emitting diode (OLED) display, a plastic OLED (POLED), or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication module 170 may set up communication between the electronic device 101 and an external device (e.g., a first electronic device 102, a second electronic device 104, or a server 106). For example, the communication module 170 may be connected with the network 162 through wireless or wired communication to communicate with the external electronic device (e.g., the second external electronic device 104 or server 106). The communication module 170 may be a means to enable communication of at least one or more data items with other electronic device and may communicate with the other electronic device through at least one or more communication standards, such as wireless fidelity (Wi-Fi), ZigBee, Bluetooth (BT), long term evolution (LTE), 3rd generation (3G), or infrared (IR) protocols.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (Beidou) or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 1B:
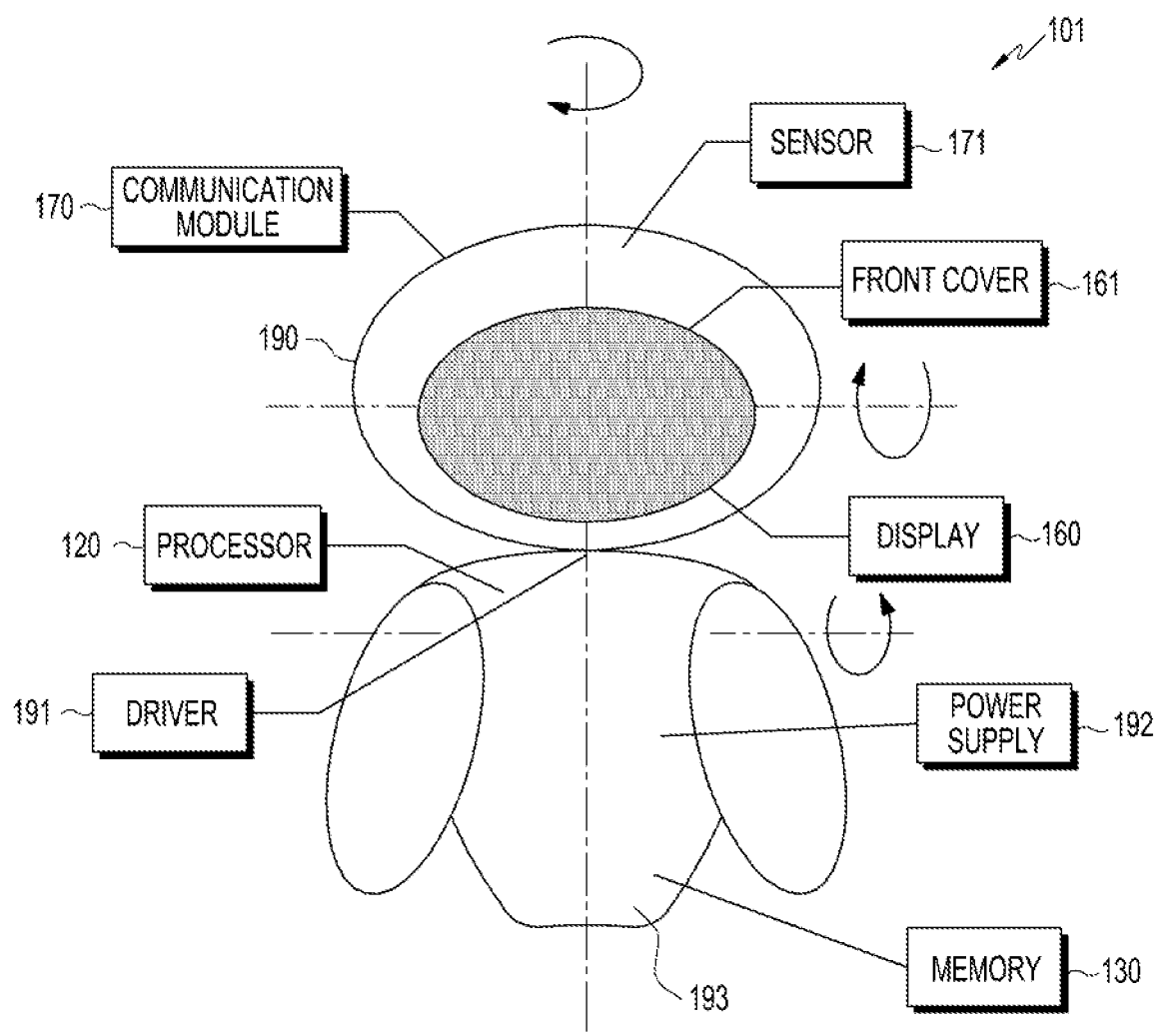
FIG. 1B is a concept view illustrating an implementation example according to an embodiment of the present disclosure.

FIG. 1B is a concept view illustrating an implementation example according to an embodiment of the present disclosure.

Referring to FIG. 1B, the electronic device 101 may be implemented in the form of a robot. The electronic device 101 may include a head portion 190 and a body portion 193. The head portion 190 may be disposed on the body portion 193. The head portion 190 and the body portion 193, in an embodiment, may be implemented in the shape of a human being's head and body, respectively. For example, the head portion 190 may include a front cover 161 corresponding to the shape of a human being's face. The electronic device 101 may include a display 160 disposed at a position corresponding to the front cover 161. For example, the display 160 may be disposed inside the front cover 161, and in this case, the front cover 161 may be formed of a transparent or semi-transparent material. Or, the front cover 161 may be a device that may display any screen, and in such case, the front cover 161 and the display 160 may be implemented as a single hardware device. The front cover 161 may include at least one or more various sensors for image sensing in a direction of interacting with the user, at least one or more microphones for obtaining a voice, and at least one or more hardware (H/W) or instrumental structures that may be an instrumental eye structure or a display for outputting a screen, that enables display through a temporary instrumental change or light in the form of directions being not differentiated, and that may be directed to the user when interacting with the user.

The head portion 190 may further include the communication module 170 and a sensor 171. The communication module 170 may receive a message from a transmitter and transmit a converted message to a receiver. According to an embodiment of the present disclosure, the communication module 170 may be implemented as a microphone, and in this case, the communication module 170 may receive a voice from the user. According to an embodiment of the present disclosure, the communication module 170 may be implemented as a speaker, and in this case, the communication module 170 may output a converted message as a voice.

The sensor 171 may obtain at least one information regarding an external environment. For example, the sensor 171 may be implemented as a camera, and in this case, the sensor 171 may capture the external environment. The electronic device 101 may identify a receiving person according to the capturing result. The sensor 171 may sense the approach of the receiving person to the electronic device 101. The sensor 171 may sense the approach of the receiving person according to proximity information or based on a signal from the electronic device used by the receiving person. Further, the sensor 171 may also sense the action or position of the user.

The driver 191 may include at least one motor to actuate the head portion 190, e.g., to change the direction of the head portion 190. The driver 191 may be used to move or instrumentally change other components. Further, the driver 191 may be in the form capable of moving up, down, left, or right with respect to at least one or more axes, and may be implemented to have various forms. The power supply 192 may feed power to the electronic device 101.

The memory 130 is storage for permanently or temporarily storing information related to providing a service to the user. The memory 130 may be present in the electronic device or may be present in a cloud or other server through a network. The memory 130 may store personal information for user authentication, attribute-related information relating to the manner of providing a service to the user, or information for grasping the relationship between various means that may interact with the electronic device 101. Here, the relationship information may be updated as the electronic device 101 is used or may be studied and changed. The processor 120 may be in charge of control of the electronic device 101 and may functionally control the sensor 171, the input/output interface 150, the communication module 170, and the memory 130 to provide a service to the user. Further, at least a portion of the processor 120 or the memory 130 may include an information determining unit that may determine information obtainable by the electronic device 101. Here, the information determining unit may extract at least one or more data for a service from the information obtained through the sensor 171 or the communication module 170.

Meanwhile, the robot-type implementation of the electronic device 101 is merely an example (and not limited thereto), and there are no limitations as to the type of implementation. For example, the electronic device 101 may be implemented in a standalone type in which it is implemented as a single robot object. The electronic device 101 may be implemented in a docking station type firmly holding a tablet PC or smart phone. Further, the electronic device 101 may come in stationary or mobile type depending on mobility, and the mobile type may include a mobile type using a wheel, a mobile type using a caterpillar, a mobile type using leg movement (including two or four legs), and a flying mobile type.

According to an embodiment of the present disclosure, the memory 130 may store instructions executed to enable the processor 120 to obtain a user voice, determine a response level of the user voice, when the response level of the user voice is a first response level, perform an operation corresponding to the user voice based on a time point of obtaining the user voice, and when the response level of the user voice is a second response level, perform the operation corresponding to the user voice based on a time point of detecting an additional event.

According to an embodiment of the present disclosure, the memory 130 may store instructions executed to enable the processor 120 to obtain text by recognizing the user voice and determine the response level of the user voice based on whether a keyword included in the text meets a predetermined rule.

According to an embodiment of the present disclosure, the memory 130 may store instructions executed to enable the processor 120 to, when the keyword included in the text meets a rule corresponding to the first response level, determine that the response level of the user voice is the first response level. The rule corresponding to the first response level may include detecting at least one of a control keyword indicating control of the electronic device, a keyword indicating the electronic device performing an operation, a keyword indicating a place where the operation is performed, or a keyword indicating a time to perform the operation.

According to an embodiment of the present disclosure, the memory 130 may store instructions executed to enable the processor 120 to, when the keyword included in the text meets a rule corresponding to the second response level, determining that the response level of the user voice is the second response level. A keyword database corresponding to the rule corresponding to the second response level may include detecting at least one of a keyword indicating a user's emotion or status, a keyword indicating a status of an environment, a keyword indicating a history of the electronic device, a keyword indicating a content of an operation of the electronic device performing the operation, or a keyword indicating an operation status of the electronic device performing the operation.

According to an embodiment of the present disclosure, the rule (corresponding to a response level) may include an ontology having layers classified depending on abstraction levels related to accuracy for grasping an intention of a command and including association information between the layers or association information between the included keywords.

According to an embodiment of the present disclosure, the memory 130 may store instructions executed to enable the processor 120 to compare the keyword included in the text with the ontology, assign a score to each keyword included in the text according to a result of the comparison, and compare a sum of assigned scores with a predetermined threshold to determine the response level of the user voice.

According to an embodiment of the present disclosure, the memory 130 may store instructions to enable the processor 120 to, when the sum of the assigned scores exceeds a first threshold, determine that the response level of the user voice is the first response level, and when the sum of the assigned scores exceeds a second threshold and not more than the first threshold, determine that the response level of the user voice is the second response level.

According to an embodiment of the present disclosure, with reference to FIG. 1B, the memory 130 may store instructions executed to enable the processor 120 to expand or update the rule based on obtained information.

According to an embodiment of the present disclosure, the memory 130 may store instructions executed to enable the processor 120 to interpret the text in natural language and determine first whether a keyword classified as a verb as a result of the interpretation of the natural language meets the rule.

According to an embodiment of the present disclosure, the memory 130 may store instructions executed to enable the processor 120 to obtain the user's emotion using a result of analysis of the user voice or using additional information from another electronic device and determine the response level of the user voice using the user's emotion and whether the predetermined rule is met.

According to an embodiment of the present disclosure, the memory 130 may store instructions executed to enable the processor 120 to, when the response level of the user voice is the second response level, determine operation candidates corresponding to the user voice.

According to an embodiment of the present disclosure, the memory 130 may store instructions executed to enable the processor 120 to output the determined operation candidates, and upon detecting the additional event of selecting any one of the operation candidates, perform the selected operation.

According to an embodiment of the present disclosure, the memory 130 may store instructions executed to enable the processor 120 to output the determined operation candidates upon detecting another additional event.

According to an embodiment of the present disclosure, the memory 130 may store an ontology having layers classified depending on abstraction levels related to accuracy for grasping an intention of a command and including association information between the layers or association information between the included keywords, and the memory 130 may store instructions executed to enable the processor 120 to obtain text by recognizing the user voice and determine the operation candidates by combining the keyword included in the text with an associated keyword on an ontology.

According to an embodiment of the present disclosure, with reference to FIG. 1B, the memory 130 may store instructions executed to enable the processor 120 to obtain user identification information corresponding to the user voice, and when the response level of the user voice is the second response level, perform an operation corresponding to the user voice depending on whether a user corresponding to the additional event has the same user identification information as the user identification information corresponding to the user voice.

According to an embodiment of the present disclosure, the memory 130 may store instructions executed to enable the processor 120 to determine a first time when the user voice is obtained, and when the response level of the user voice is the second response level, perform an operation corresponding to the user voice depending on whether a difference between the first time and a second time when the additional event is detected is less than a predetermined threshold.

According to an embodiment of the present disclosure, the memory 130 may store instructions executed to enable the processor 120 to obtain another user voice and compare the response level of the user voice with a response level of the other user voice and perform one of an operation corresponding to the user voice or an operation corresponding to the other user voice based on the comparison result.

According to an embodiment of the present disclosure, the memory 130 may store instructions executed to enable the processor 120 to perform one of the operation corresponding to the user voice or the operation corresponding to the other user voice using relation information between a first user corresponding to the user voice and a second user corresponding to the other user voice.

According to an embodiment of the present disclosure, the memory 130 may store instructions executed to enable the processor 120 to output a control signal for performing the operation to hardware different for each of the first response level and the second response level.

According to an embodiment of the present disclosure, the memory 130 may store instructions executed to enable the processor 120 to, when the response level of the user voice is a third response level, disregard the user voice.

According to an embodiment of the present disclosure, the memory 130 may store instructions executed to enable the processor 120 to detect a first event set to run a first operation, determine whether a restricting condition on performing the first operation is met, when the restricting condition on performing the first operation is not met, perform the first operation based on a time point of detecting the first event, and when the restricting condition on performing the first operation is met, perform the first operation based on a time point of detecting a second event different from the first event.

According to an embodiment of the present disclosure, the memory 130 may store instructions executed to enable the processor 120 to obtain a user motion, when a response level of the user motion is a first response level, perform an operation corresponding to the user motion based on a time point of obtaining a user voice, and when the response level of the user voice is a second response level, perform the operation corresponding to the user motion based on a time point of detecting an additional event.

Figure 2A:
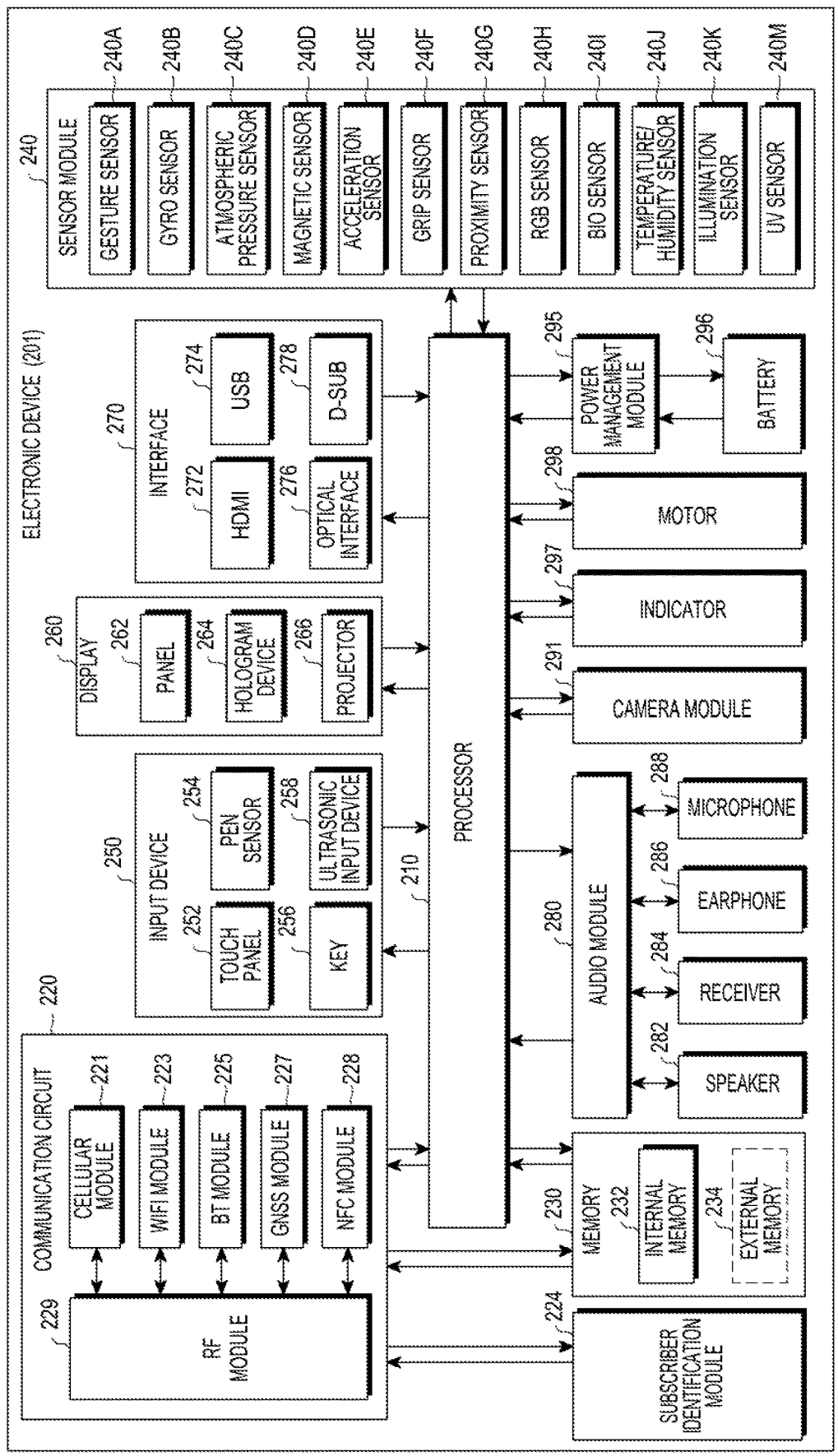
FIG. 2A is a block diagram illustrating an electronic device according to an embodiment of the present disclosure.

FIG. 2A is a block diagram illustrating an electronic device 201 according to an embodiment of the present disclosure.

Referring to FIG. 2A, an electronic device 201 may include the whole or part of the configuration of, e.g., the electronic device 101 shown in FIGS. 1A and 1B. The electronic device 201 may include one or more processors (e.g., application processors (APs)) 210, a communication circuit or communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system (OS) or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2A. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 shown in FIGS. 1A and 1B. The communication module 220 may include, e.g., a cellular module 221, a Wi-Fi module 223, a BT module 225, a GNSS module 227 (e.g., a GPS module, a Glonass module, a Beidou module, or a Galileo module), a near field communication (NFC) module 228, and a radio frequency (RF) module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The WI-FI module 223, the BT module 225, the GNSS module 227, or the NFC module 228 may include a processor for, e.g., processing data communicated through the module. According to an embodiment of the present disclosure, at least some (e.g., two or more) of the cellular module 221, the WI-FI module 223, the BT module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the WI-FI module 223, the BT module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include other sensors (not shown), e.g., an olfactory sensor or an electronic nose (E-nose) sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a digital stylus or (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160 shown in FIGS. 1A and 1B) may include a panel 262, a hologram device 264, or a projector 266. The panel 262 may have the same or similar configuration to the display 160. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIGS. 1A and 1B. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1A. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an image signal processor (ISP), or a flash such as an LED or xenon lamp.

The power manager module 295 may manage power of the electronic device 201, for example. According to an embodiment of the present disclosure, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 2B:
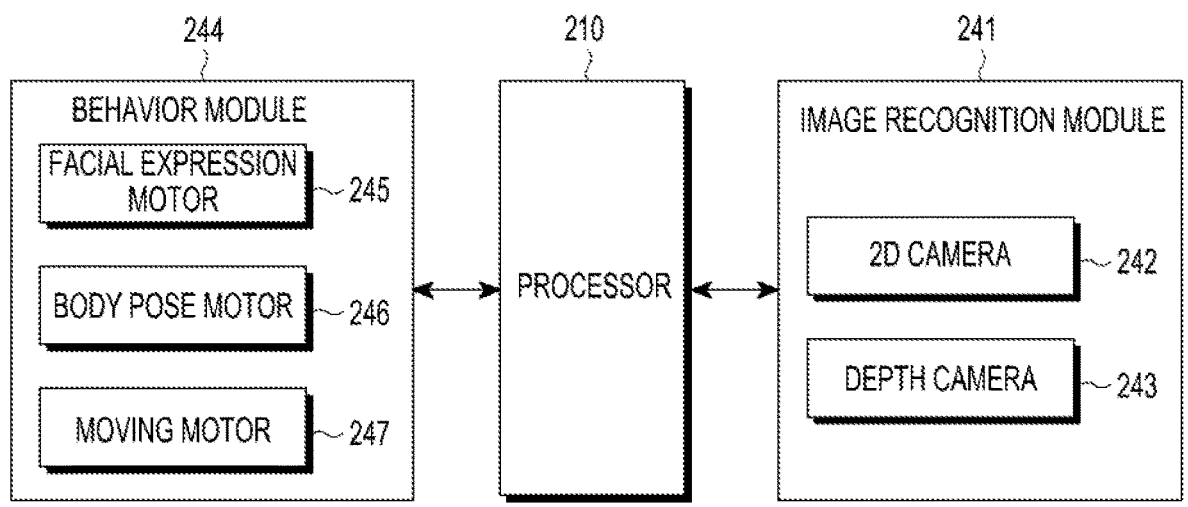
FIG. 2B is a block diagram illustrating an electronic device according to an embodiment of the present disclosure.

FIG. 2B is a block diagram illustrating an electronic device according to an embodiment of the present disclosure.

Referring to FIG. 2B, the processor 210 may be connected with an image recognition module 241. Further, the processor may be connected with a behavior (or action) module 244. The image recognition module 241 may include at least one of a 2-dimensional (2D) camera 242 and a depth camera 243. The image recognition module 241 may perform recognition based on a captured result and transfer the recognized result to the processor 210. The behavior module 244 may include at least one of a facial expression motor 245, a body pose motor 246, and a moving motor 247. The processor 210 may control at least one of the facial expression motor 245, the body pose motor 246, and the moving motor 247 to control the movement of the electronic device 101 implemented in the form of a robot. The electronic device 101 may include the elements shown in FIG. 2B in addition to the elements shown in FIG. 2A.

Figure 3:
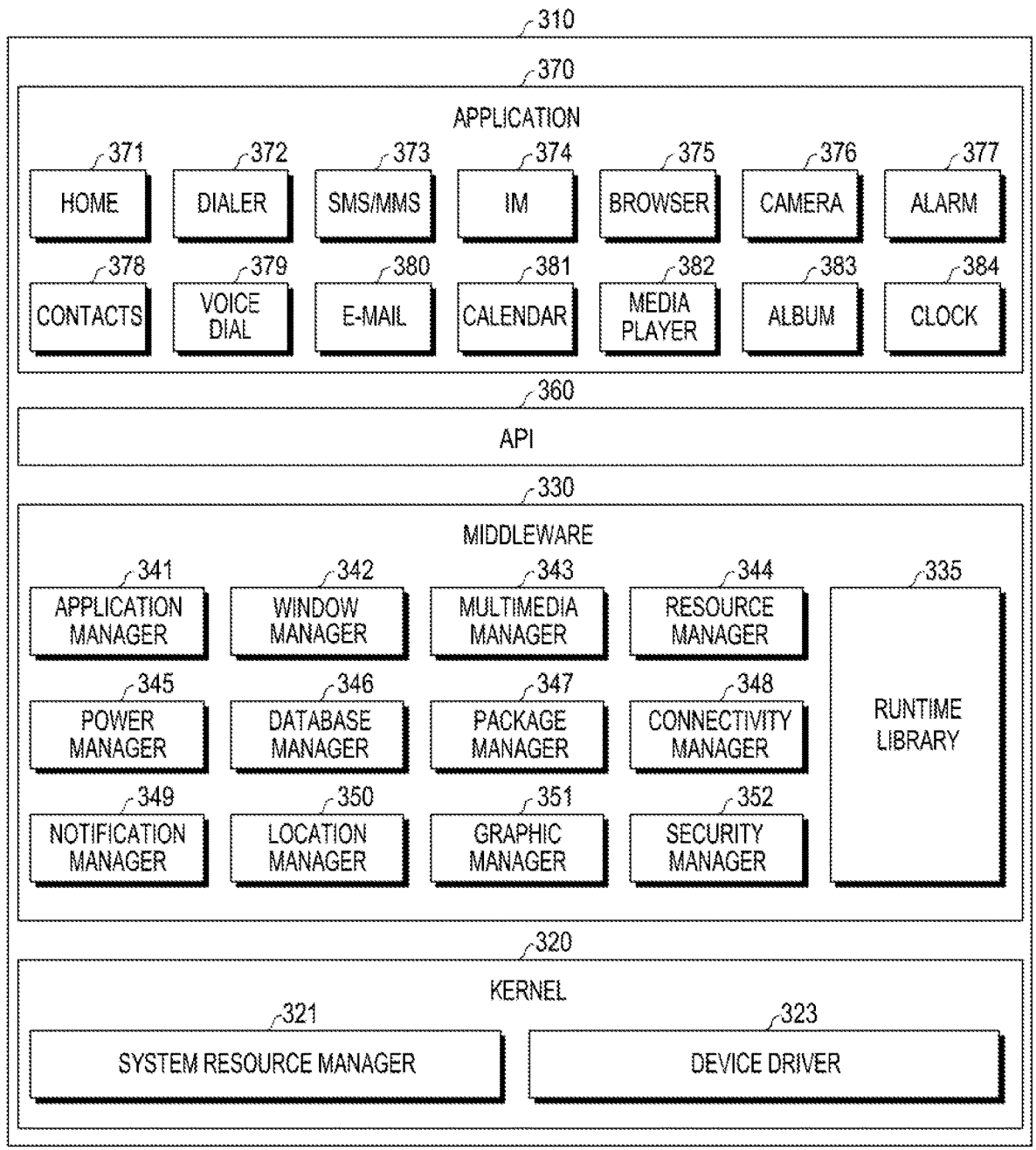
FIG. 3 is a block diagram illustrating a program module according to an embodiment of the present disclosure.

FIG. 3 is a block diagram illustrating a program module according to an embodiment of the present disclosure.

Referring to FIG. 3, the program module 310 (e.g., the program 140 shown in FIG. 1A) may include an operating system (OS) controlling resources related to the electronic device (e.g., the electronic device 101) and/or various applications (e.g., the application processor (AP) 147) driven on the operating system (OS). The OS may include, e.g., Android™, iOS™, Windows™, Symbian®, Tizen®, or Bala®.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106, shown in FIG. 1A).

The kernel 320 (e.g., the kernel 141 shown in FIG. 1A) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system (OS) in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android™ or iOS™, one API set may be provided per platform, and in the case of Tizen®, two or more API sets may be offered per platform.

The application 370 (e.g., the application processor (AP) 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104 shown in FIG. 1A). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104 shown in FIG. 1A). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of operating system (OS).

Figure 4:
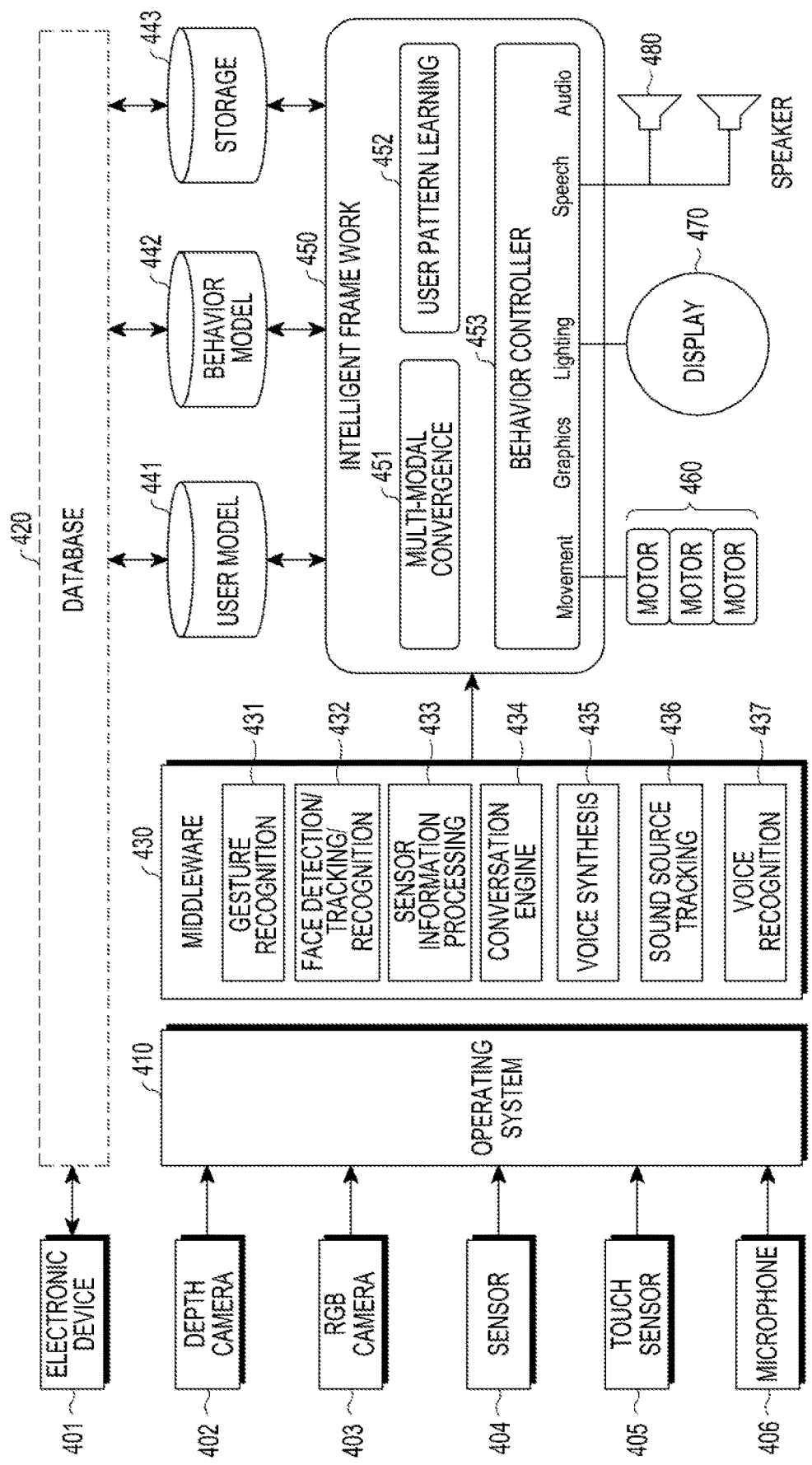
FIG. 4 is a block diagram illustrating software used by an electronic device according to an embodiment of the present disclosure.

FIG. 4 is a block diagram illustrating software used by an electronic device according to an embodiment of the present disclosure.

Referring to FIG. 4, the operating system (OS) 410 may control various hardware devices, such as a depth camera 402, a RGB camera 403, a sensor 404, a touch sensor 405, and a microphone 406 while simultaneously playing a role as a general operating system, such as distributing resources of the electronic device 101 and processing job scheduling and may process signals inputted from the hardware devices 402, 403, 404, 405, and 406.

The middleware 430 may use the signal processed data to perform recognition (e.g., gesture recognition 431) on the user's 3D gesture, authentication (e.g., face detection/tracking recognition 432) through face recognition or tracking the position of the user's face, sensor information processing (e.g., sensor information processing 433), conversational engine driving (e.g., conversation engine 434), voice synthesis 435, tracking (e.g., sound source tracking 436) the position of entry (direction of arrival (DOA)) on audio signals, and voice recognition 437.

The intelligent frame work 450 may include a multi-modal convergence block 451, a user pattern learning block 452, and a behavior control block 453. The multi-modal convergence block 451 may compile and manage various information processed by the middleware 430. The user pattern learning block 452 may extract and learn meaningful information, such as the user's life pattern or preference, using the multi-modal convergence module information. The behavior control block 453 may represent the information fed by the electronic device 101 back to the user in the form of, e.g., movement, graphics, lighting, voice, response, or speech or audio or sound. The motor 460 may represent movement, the display 470 may represent graphics and light, and the speaker 480 may represent voice, responses, and sounds.

The database 420 may store information learned by the intelligent frame work 450 according to users. The database 420 may include a user model database 441, a motion data or behavior model database 442 for controlling the behavior of the electronic device, and a storage 443 storing other information. The information in the database 420 may be shared with another electronic device 401.

Figure 5:
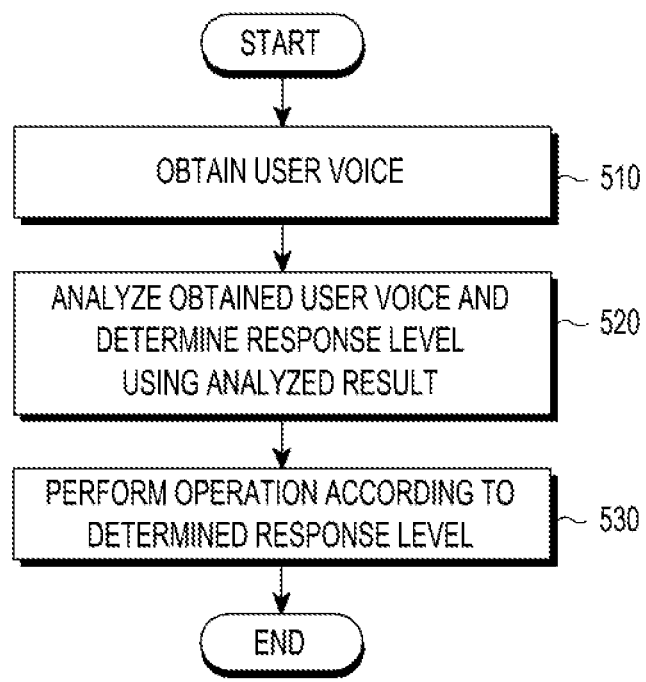
FIG. 5 is a flowchart illustrating a method for controlling an electronic device according to an embodiment of the present disclosure.

FIG. 5 is a flowchart illustrating a method for controlling an electronic device according to an embodiment of the present disclosure.

Referring to FIG. 5, in operation 510, the electronic device 101 may obtain the user voice. According to an embodiment of the present disclosure, the electronic device 101 may obtain the user voice through its containing microphone. The microphone may be an electronic device that may convert an external voice entered into an electrical signal and output the converted electrical signal and is not limited in its implementations. In such case, the electronic device 101 may be implemented as an independent electronic device that may obtain and process the user voice and perform an operation corresponding thereto. According to another embodiment, the electronic device 101 may obtain the user voice from another electronic device including a microphone. The other electronic device including the microphone may obtain an external voice, convert the obtained voice into an electrical signal, and transmit the converted electrical signal to the electronic device 101. In this case, the electronic device 101 may perform a command corresponding to the user voice using the electrical signal received from the other electronic device, and the electronic device 101 may be implemented as an electronic device configuring, e.g., an Internet of things (IoT) environment. Or, the electronic device 101 may transmit a command corresponding to the user voice to a third electronic device using the electrical signal received from the other electronic device. In such case, the electronic device 101 may be implemented as a server in charge of the IoT or network.

In operation 520, the electronic device 101 may analyze the obtained user voice and determine the response level using the result of analysis. According to an embodiment of the present disclosure, the electronic device 101 may apply various voice recognition algorithms to the user voice. The voice recognition algorithms may be algorithms that may process voices, as input values, and output an output value of text corresponding to the voices, but not limited in type thereto.

With reference to FIGS. 1A, 1B and 5, the electronic device 101 may analyze the text, which is the output value of a voice recognition algorithm, and determine the response level corresponding to the user voice. Here, the response level may be one associated with time when the command corresponding to the user voice is performed. According to an embodiment of the present disclosure, when the electronic device 101 determines that a response level of a first user voice is a first response level, the electronic device 101 may process a first operation corresponding to the first user voice corresponding to the time of obtaining the first user voice. When the electronic device 101 determines that a response level of a second user voice is a second response level, the electronic device 101 may stop and delay processing a second operation corresponding to the second user voice at the time of obtaining the second user voice. The electronic device 101 may monitor an additional event related to the second user voice, and upon detecting the additional event related to the second user voice, the electronic device 101 may perform the second operation corresponding to the second user voice corresponding to the time of detecting the event. Or, the electronic device 101 may provide an inquiry feedback related to the second user voice, and upon detecting a response to the inquiry feedback from the user, the electronic device 101 may perform the second operation corresponding to the time of detecting the user's response. When the electronic device 101 determines that a response level of a third user voice is a third response level, the electronic device 101 may disregard the response level of the third user voice. Although an example in which the electronic device 101 sets up three response levels has been described above, this is merely an example (and not limited thereto). It will be appreciated by one of ordinary skill in the art that when the electronic device 101 differentially sets up response times, i.e., times of performing commands, examples of implementing response levels are not limited. The electronic device 101 may determine a response level depending on whether the text contains a particular word. Or, the electronic device 101 may assign scores to the words, respectively, in the text, and may determine a response level based on, e.g., a result of summating the scores. A process of determining a response level by the electronic device 101 is described below in greater detail.

In operation 530, with reference to FIG. 5, the electronic device 101 may perform an operation according to determined response level. The electronic device 101 may previously store association information between the inputted user voice and the set operation. For example, the electronic device 101 may previously store association information obtained by mapping the user voice "Turn on the TV" with the operation "Send a turn on signal to the TV." Meanwhile, according to an embodiment of the present disclosure, the electronic device 101 may also process user voices not explicitly stored in the association information. Specifically, the electronic device 101 may identify that the text of recognizing the user voice is not registered in the association information previously stored. In such case, the electronic device 101 may compare a component in the text with a pre-stored user voice and may determine an operation corresponding to the user voice based on the similarity. For example, it may be assumed that the electronic device 101 obtains the text "What is on TV?" as the result of the recognition of the user voice. The electronic device 101 may identify the pre-stored user voice "Turn on the TV" including the component "TV" of the text and may identify "Transmit a turn on signal to the TV" as an operation corresponding to the user voice. Or, the electronic device 101 may infer an operation corresponding to the user voice using, e.g., ontology. For example, it may be assumed that the electronic device 101 obtains the text "Let's watch movie" as the result of the recognition of the user voice. The electronic device 101 may identify "TV" as a word associated with the components "watch" and "movie" of the text and may identify the operations "Turn on the TV" and "Transmit a turn on signal to the TV" associated therewith. The electronic device 101 may identify an operation further using additional information or user feedback. The above-described process of determining an operation by the electronic device 101 is described below in further detail. The algorithm or program for processing the user's voice and determining operation according to the processing result may be produced by deep learning or machine learning technology.

The electronic device 101 may perform an operation according to operation level. As set forth above, for example, when the response level of the user voice is the first response level, the electronic device 101 may perform an operation set for the user voice. For example, when the response level of the user voice is the second response level, the electronic device 101 may monitor an additional event, and upon detecting the additional event, it may perform an operation set for the user voice. Or, when the response level of the user voice is the second response level, the electronic device 101 may provide a feedback giving, e.g., an operation candidate, and may perform an operation selected by the user. For example, when the response level of the user voice is the third response level, the electronic device 101 may disregard the user voice.

As described above, according to an embodiment of the present disclosure, the electronic device 101 may perform an operation according to response level corresponding to the user voice, and the electronic device 101 may thus provide a function of performing a command consistent with the user's intention.

Figure 6:
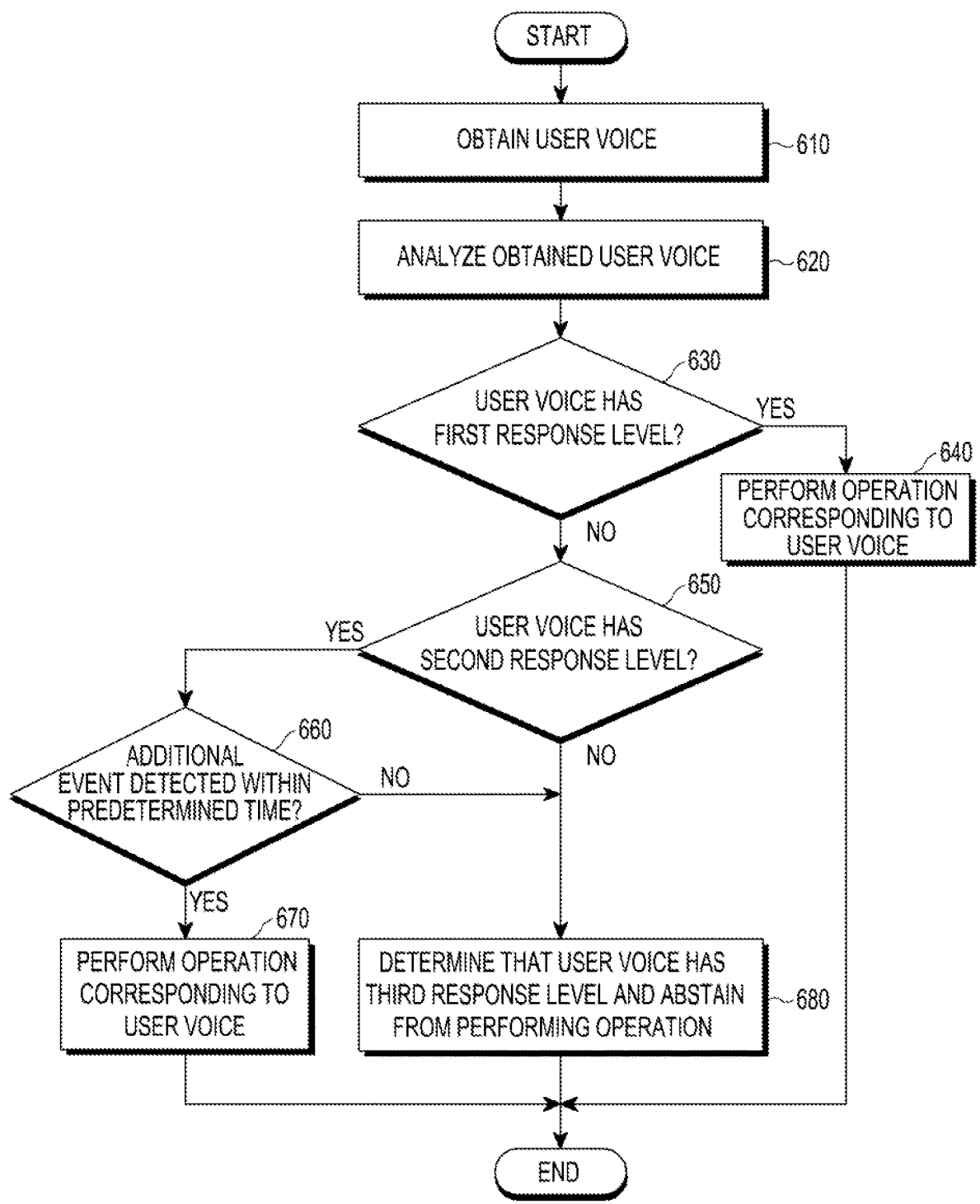
FIG. 6 is a flowchart illustrating an operation of an electronic device according to an embodiment of the present disclosure.

FIG. 6 is a flowchart illustrating an operation of an electronic device according to an embodiment of the present disclosure.

Referring to FIG. 6, in operation 610, the electronic device 101 may obtain the user voice. As described above, according to an embodiment of the present disclosure, the electronic device 101 may obtain a user voice through the microphone or receive a user voice from another electronic device.

In operation 620, the electronic device 101 may analyze the obtained user voice. The electronic device 101 may recognize the obtained user voice to obtain text. The electronic device 101 may identify the response level corresponding to the text. The electronic device 101 may determine a response level depending on whether the text contains a particular word. Or, the electronic device 101 may assign scores to the words, respectively, in the text, and may determine a response level based on, e.g., a result of summating the scores. A process of determining a response level by the electronic device 101 is described below in greater detail.

In operation 630, the electronic device 101 may determine whether the user voice is at the first response level. In operation 640, the electronic device 101 may perform an operation corresponding to the user voice. The electronic device 101 may perform an operation corresponding to the user voice corresponding to the time of obtaining the user voice. For example, the electronic device 101 may perform an operation immediately when obtaining the user voice. The electronic device 101 may determine that the user voice "Turn on the TV" is at the first response level and may immediately perform the operation "Transmit a turn on signal to the TV" corresponding thereto. Or, the electronic device 101 may determine that the user voice "Turn on the TV at 6 o'clock" is at the first response level and perform its corresponding operation "Transmit a turn on signal to the TV" at 6 o'clock corresponding to the user voice.

In operation 650, the electronic device 101 may determine whether the user voice is at the second response level. In operation 660, the electronic device 101 may monitor whether an additional event is detected within a predetermined time. In operation 670, when the additional event is detected, the electronic device 101 may perform an operation corresponding to the user voice. The type of the additional event is not limited, and according to an embodiment of the present disclosure, the electronic device 101 may display operation candidates and perform an operation by the user's selection.

Unless the additional event is detected, the electronic device 101 may determine that the user voice is at the third response level and abstain from performing an operation in operation 680. For example, the electronic device 101 may adjust the response level of the user voice from the second response level to the third response level. Or, unless the user voice is determined to be at the first or second response level, the electronic device 101 may determine that the user voice is at the third response level and abstains from performing the operation in operation 680.

Meanwhile, although three types of response levels are shown in the embodiment of FIG. 6, this is merely an example (and not limited thereto), and according to an embodiment of the present disclosure, the electronic device 101 may set up a plurality of response levels without limitation in number and set up a different operation per response level.

FIGS. 7A to 7F are concept views illustrating operations of an electronic device according to various embodiments of the present disclosure.

Figure 7A:
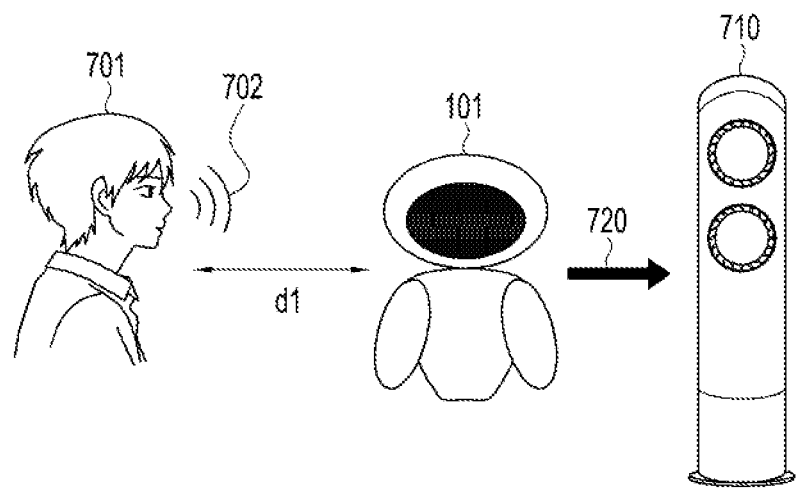
FIGS. 7A to 7F are concept views illustrating operations of an electronic device according to various embodiments of the present disclosure.

Referring to FIG. 7A, the electronic device 101 may be spaced apart from the user 701 at distance d1. The electronic device 101 may obtain a user voice 702 from the user 701. In the embodiment of FIG. 7A, the electronic device 101 may be implemented as a robot and may be in charge of the home network. Specifically, the electronic device 101 may transmit control signals controlling various electronic devices arranged in the home, receive signals from various electronic devices, and process the signals. Meanwhile, although in the embodiment of FIG. 7A, the electronic device 101 is shown to be in charge of the home network, this is merely an example (and not limited thereto), and the electronic device 101 may be responsible for various environments such as office environments. Or, the electronic device 101 may independently operate without interacting with other electronic devices.

It is assumed that the electronic device 101 obtains the user voice 702 "Turn on the air conditioner," for example. The electronic device 101 may determine that the response level of the user voice 702 is the first response level. For example, the electronic device 101 may determine that the response level of the user voice 702 is the first response level based on the text obtained by recognizing the user voice 702 containing the control keyword "Turn on." Meanwhile, the electronic device 101 determining the response level of the user voice depending on whether a particular keyword is contained is merely an example (and not limited thereto), and various embodiments for determining a response level are described below in more detail.

When the response level of the user voice 702 is determined to be the first response level, the electronic device 101 may immediately perform an operation corresponding to the user voice 702. For example, the electronic device 101 may associate the user voice "Turn on the air conditioner" with the operation "Transmit a turn on signal to the air conditioner" and store them. The electronic device 101 may transmit a turn on signal 720 to the air conditioner 710 corresponding to the user voice 702 using the association information. Here, the phrase "immediately perform an operation" may mean performing the operation within a predetermined threshold time from a particular time or may also mean performing the particular operation even without separate additional involvement.

Meanwhile, although in the configuration according to the embodiment of FIG. 7A, the electronic device 101 processes the user voice 702 and transmits the turn on signal 720 to the air conditioner 710, this is merely an example (and not limited thereto). According to an embodiment of the present disclosure, the air conditioner 710 may directly obtain the user voice 702 and process the user voice 702 at the first response level, thereby performing immediate turning on.

FIGS. 7B to 7F are concept views illustrating second response level processing according to various embodiments of the present disclosure.

Figure 7B:
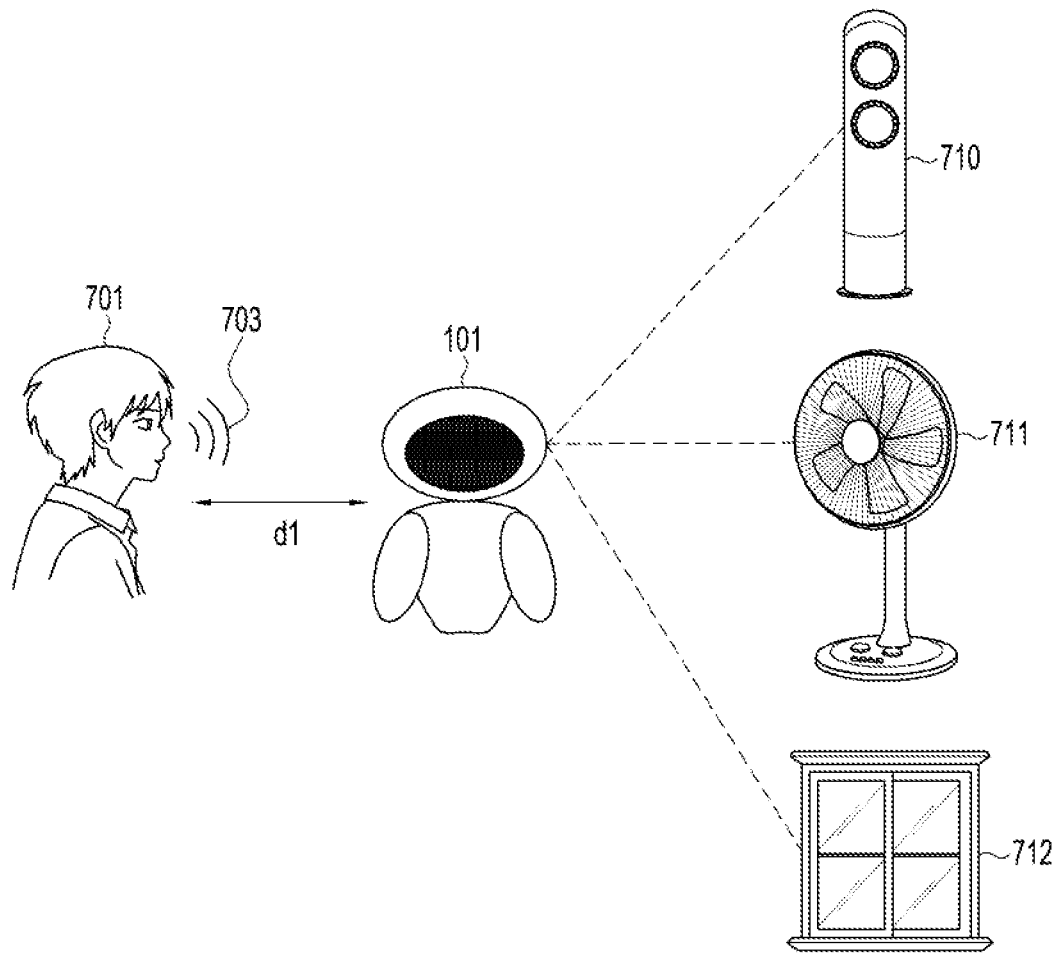

Referring first to FIG. 7B, the electronic device 101 may obtain the user voice 703 "It's hot." The electronic device 101 may determine that the response level of the user voice 703 is the second response level. For example, the electronic device 101 may determine that the response level of the user voice 703 is the second response level based on the fact that the component "hot" of the text obtained by recognizing the user voice 703 is a keyword indicating an emotion or status. The electronic device 101 may delay performing the operation corresponding to the user voice 703 based on the user voice 703 being at the second response level. Further, the electronic device 101 may determine operation candidates corresponding to the user voice 703. For example, the electronic device 101 may determine such operation candidates as "Transmit a turn on signal to the air conditioner," "Transmit a turn on signal to the electric fan," or "transmit an open signal to the window open/close device" as associated with the text "hot." The electronic device 101 may previously associate the status-related keyword "hot" with keywords indicating devices, such as "air conditioner," "electric fan," and "window open/close device," and store them. The electronic device 101 may determine operation candidates related with the keyword. Or, the electronic device 101 may associate the status-related keyword "hot" with the operation candidates, such as "Transmit a turn on signal to the air conditioner," "Transmit a turn on signal to the electric fan," or "transmit an open signal to the window open/close device" and store them, and the electronic device 101 may determine an operation candidate according to the association information.

Figure 7C:
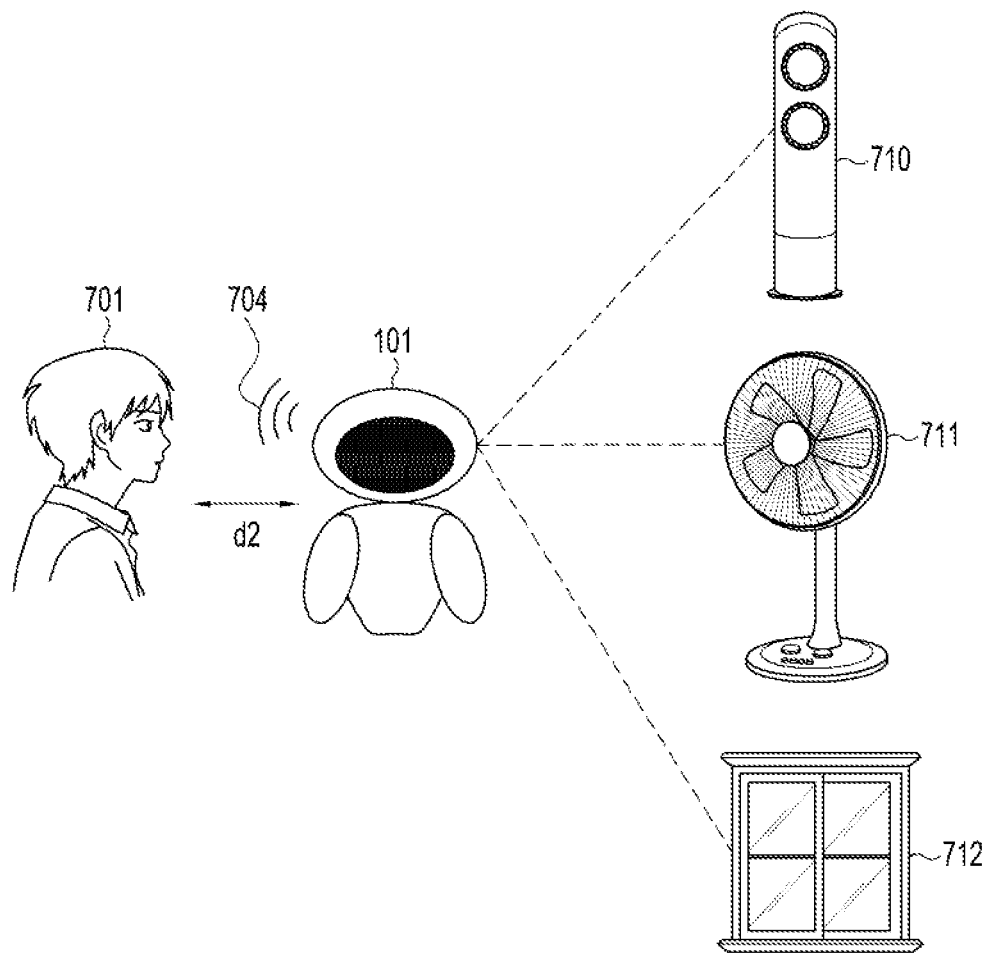

The electronic device 101 may monitor an additional event after determining the operation candidate. Referring to FIG. 7C, the electronic device 101 may detect an approach of the user 701 to the electronic device 101 within distance d2. For example, the electronic device 101 may previously store the "user's approach" as the additional event. The electronic device 101 may obtain the distance between the user 702 and the electronic device 101 using a proximity sensor or depth camera. When the distance between the user 702 and the electronic device 101 is less than predetermined threshold, the electronic device 101 may determine that the additional event "user's approach" is detected. The electronic device 101 may perform a set operation corresponding to the detection of the additional event. For example, as shown in FIG. 7C, the electronic device 101 may provide a voice output 704 including operation candidates. For example, the electronic device 101 may provide a voice output 704, such as "Wanna turn on one of the air conditioner, electric fan, and window open/close device?" The electronic device 101 may output operation candidates in various manners, e.g., by displaying the operation candidates.

Figure 7D:
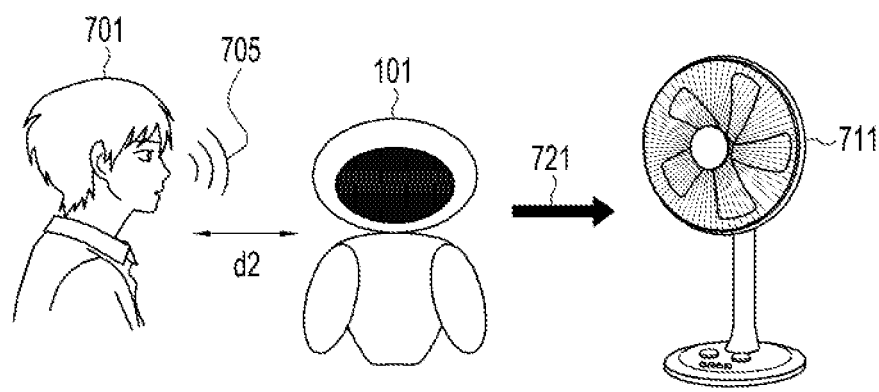

The user 701 may produce/generate a user voice 705 for selecting one operation candidate to the electronic device 101. For example, as shown in FIG. 7D, the user 701 may produce the user voice 705 "Turn on the electric fan." The electronic device 101 may obtain and recognize the user voice 705 and transmit a control signal 721 for turning on the electric fan to the electric fan 711. According to an embodiment of the present disclosure, the electronic device 101 may process the user voice 705 in an additional event and transmit a control signal 721. According to another embodiment, the electronic device 101 may process the user voice 705 at the first response level and transmit the control signal 721.

According to an embodiment of the present disclosure, the electronic device 101 may send the operation candidates to the electronic device worn or carried by the user. The user may select one of the operation candidates through the electronic device he/she is wearing or carrying. The electronic device worn or carried by the user may send the selected information to the electronic device 101, and the electronic device 101 may perform at least one of the operation candidates using the received selected information.

Figure 7E:
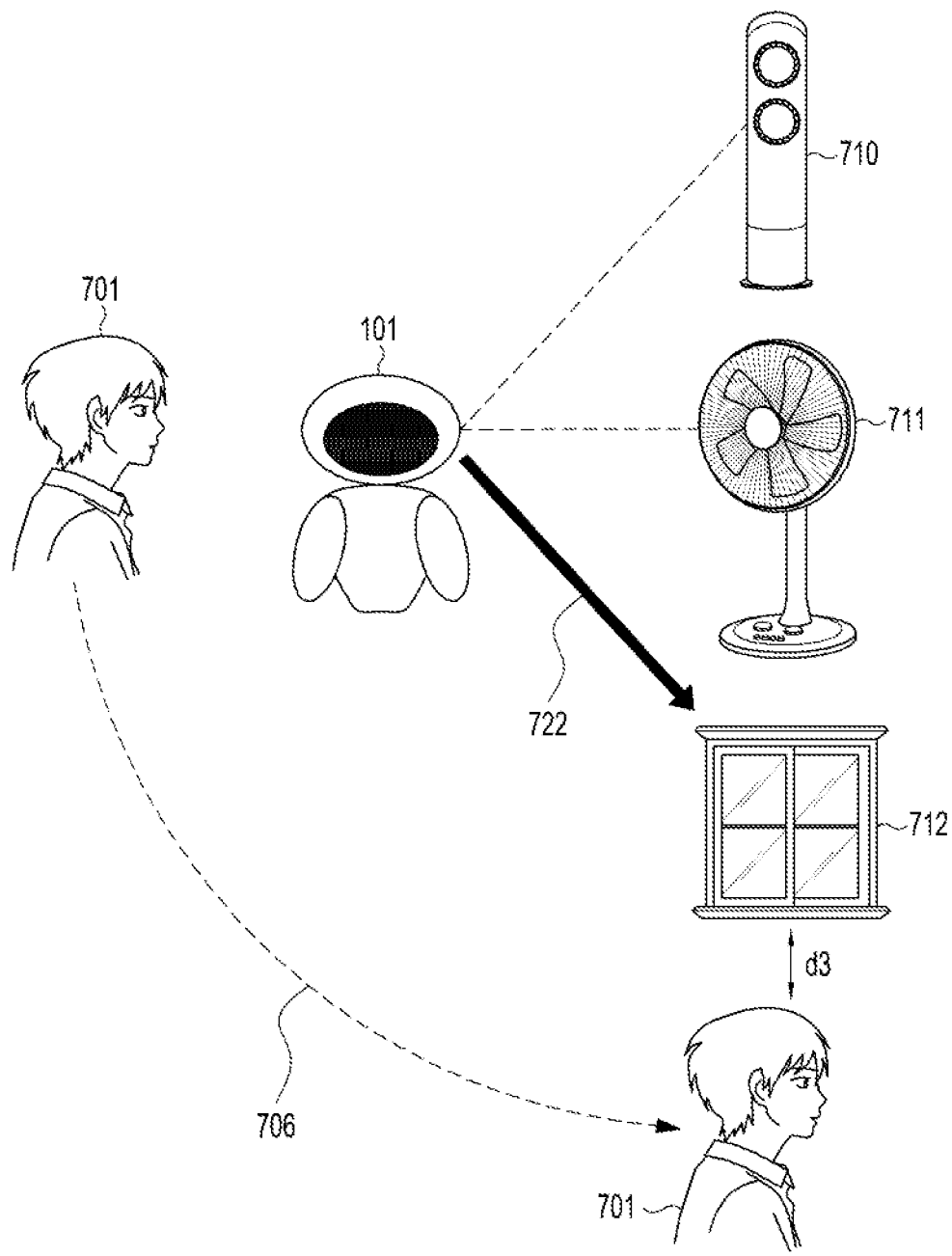

Meanwhile, according to an embodiment of the present disclosure, the electronic device 101 may store an "approach between the user and another electronic device" as an additional event. For example, as shown in FIG. 7E, the user 701 may approach (as noted by broken arrow 706) the window open/close device 712 within distance d3. Upon determining that the distance d3 between the user 701 and the window open/close device 712 is less than a predetermined threshold, the electronic device 101 may determine that the additional event of the "approach between the user and another electronic device" is detected. The electronic device 101 may trace and image-capture the user 701 and detect the additional event of the approach between the user 701 and the window open/close device 712 based on the result of analysis of the captured image. Or, the electronic device 101 may detect the additional event by receiving the information on the approach of the user 701 from the window open/close device 712. Or, the electronic device 101 may detect the additional event by receiving the information on an electronic device (e.g., a camera) image capturing the home network to an object.

The electronic device 101 may transmit a control signal 722 for opening the window open/close device 712 to the window open/close device 712, corresponding to the detection of the additional event. Accordingly, even when the user 701 himself/herself does not open the window, the electronic device 101 may perform an operation consistent with the user's intention.

Figure 7F:
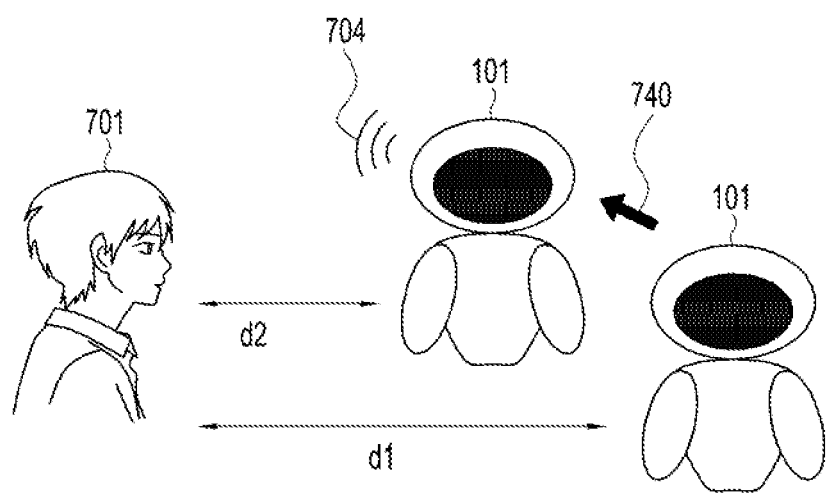

Referring to FIG. 7F, according to an embodiment of the present disclosure, the electronic device 101 may include a driving means for moving, e.g., a motor. Upon determining that the response level corresponding to the user voice is the second response level, the electronic device 101 may move 740. The electronic device 101 may move (as noted by arrow 740) towards the user 701, and accordingly, the distance between the user 701 and the electronic device 101 may decrease from d1 to d2. Upon determining that the distance between the user 701 and the electronic device 101 is d2, the electronic device 101 may output a voice 704 including operation candidates or display a screen including operation candidates. The electronic device 101, upon detecting the selection of one of the operation candidates from the user 701, may perform an operation corresponding to the selection.

As described above, according to an embodiment of the present disclosure, the electronic device 101 may perform an operation set to be different per response level. In particular, even when the user produces a command whose intention is unclear, the electronic device 101 may perform an operation set to fit the user's intention.

Figure 8:
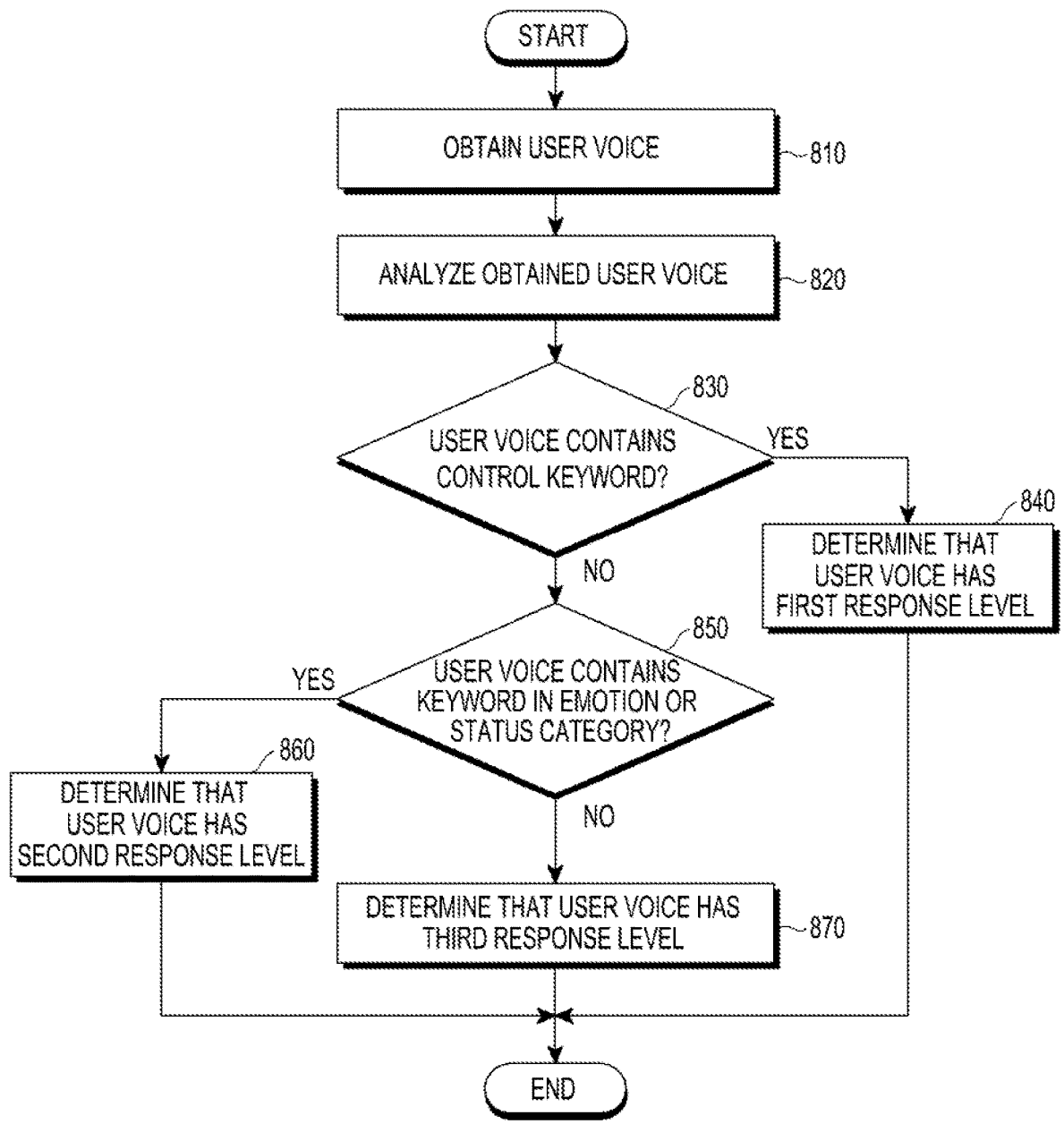
FIG. 8 is a flowchart illustrating a method for controlling a response level according to an embodiment of the present disclosure.

FIG. 8 is a flowchart illustrating a method for controlling a response level according to an embodiment of the present disclosure.

Referring to FIG. 8, in operation 810, the electronic device 101 may obtain the user voice. In operation 820, the electronic device 101 may analyze the user voice. For example, the electronic device 101 may obtain text by applying a voice recognition algorithm to the user voice.

In operation 830, the electronic device 101 may determine whether the user voice contains a control keyword. When the user voice contains the control keyword, the electronic device 101 may determine that the user voice is at the first response level in operation 840. The electronic device 101 may previously store the control keyword. For example, the electronic device 101 may previously store control keywords, such as "turn on," "go," and "start." The electronic device 101, when the user voice contains the control keyword, may determine that the response level of the user voice is the first response level.

In operation 850, the electronic device 101 may determine whether the user voice contains a keyword indicating an emotion or status. Upon determining that the user voice contains a keyword indicating an emotion or status, the electronic device 101 may determine that the response level of the user voice is the second response level in operation 860. The electronic device 101 may previously store the emotion or status keyword. For example, the electronic device 101 may store keywords indicating the user's emotion, such as "boring," "awesome," and "happy," and keywords indicating the status of the environment, such as "hot," "cold," and "freezing." It will be appreciated by one of ordinary skill in the art that the keywords stored by the electronic device 101 to determine that the response level is the second response level are not specifically limited as long as they are keywords requiring the operation of the electronic device to achieve what is desired by the user.

Meanwhile, when no control keywords or no keywords indicating the emotion or status are included, the electronic device 101 may determine that the user voice is at the third response level in operation 870.

Figure 9:
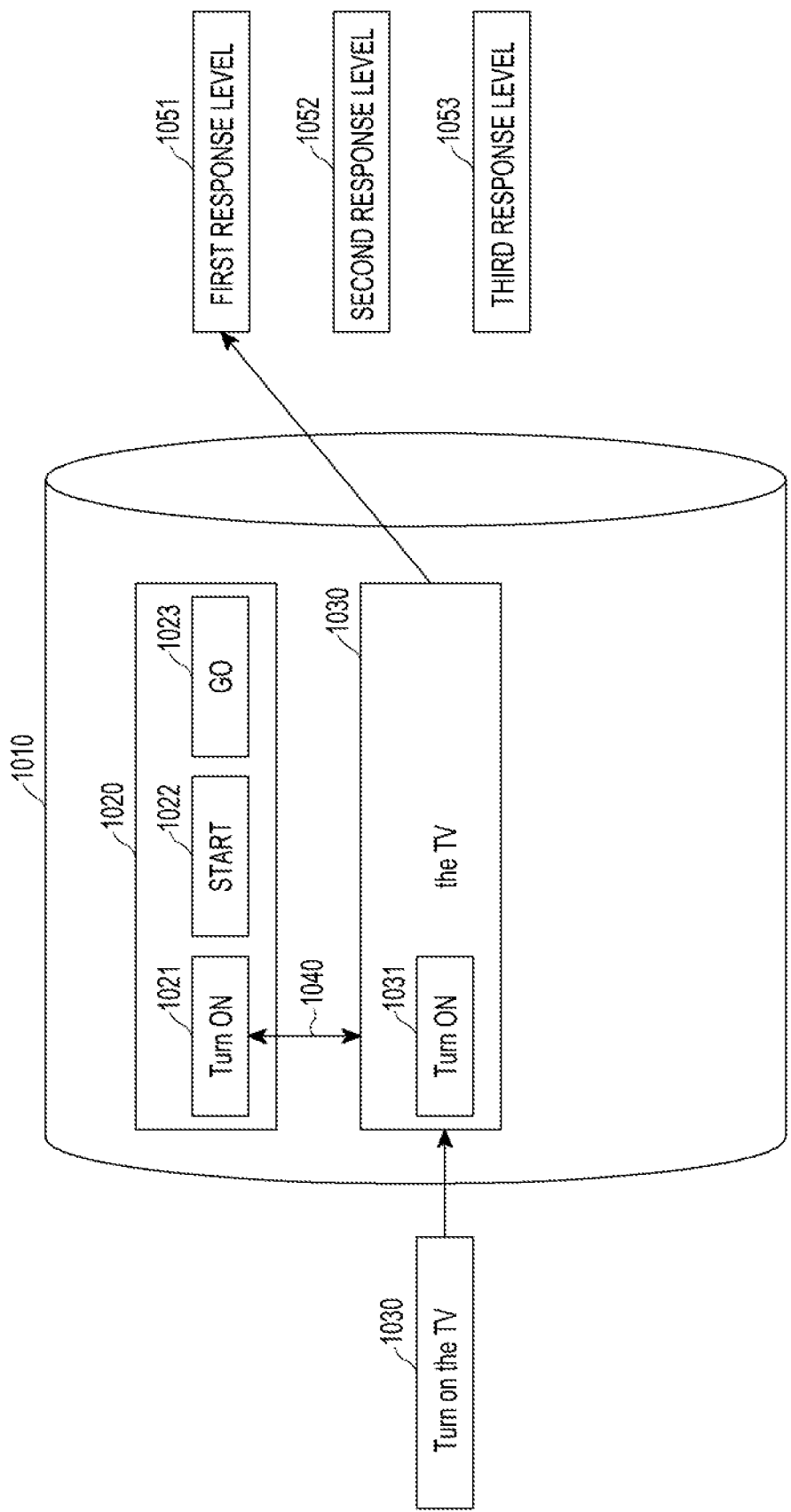
FIG. 9 is a concept view illustrating a process for determining a response level through keyword analysis according to an embodiment of the present disclosure.

FIG. 9 is a concept view illustrating a process for determining a response level through keyword analysis according to an embodiment of the present disclosure.

Referring to FIG. 9, the electronic device 101 may previously store a keyword database 1010. The electronic device 101 may store a control keyword 1020 in the keyword database 1010. The control keyword 1020 may include keywords meaning the control of the electronic device, such as "turn on (1021)," "start (1022)," and "go (1023)." Although in the embodiment of FIG. 9, control keywords for turning on the electronic device are disclosed, this is merely an example (and not limited thereto). The control keywords 1020 are not limited as long as they are keywords that may induce the operation of the electronic device, such as turn off, change channels, or change temperature. According to an embodiment of the present disclosure, the electronic device 101 may store a preset rule. Here, the preset rule may be related to whether a keyword is included in the keyword database 1010.

The electronic device 101 may receive a user voice 1030, compare an included component 1031 with the control keyword 1020, and determine a control keyword 1021 mapped. The electronic device 101 may classify the user voice 1030 having the corresponding keyword 1040 to the control keyword 1020 previously stored in the keyword database 1010 as the first response level 1051. According to an embodiment of the present disclosure, the electronic device 101 may determine whether the included component meets a preset rule. For example, the electronic device 101 may store detection of a control keyword as a rule corresponding to the first response level. For example, the electronic device 101 may store detection of a status keyword as a rule corresponding to the second response level 1052 (or to the third response level 1053). As the electronic device 101 detects the control keyword from the user voice, the electronic device 101 may determine that the rule corresponding to the first response level is met, and it may classify the user voice 1030 as the first response level 1051.

Figure 10A:
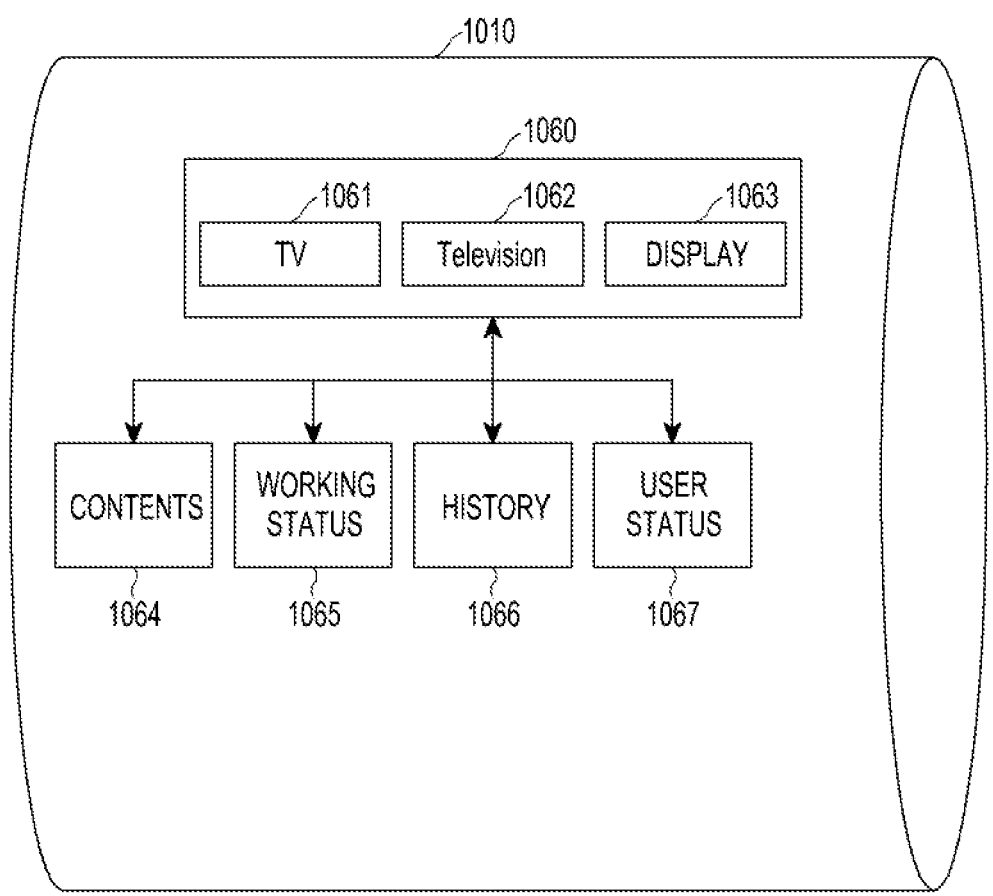
FIGS. 10A to 10C are concept views illustrating the type of databases classified as a first response level according to various embodiments of the present disclosure.
Figure 10B:
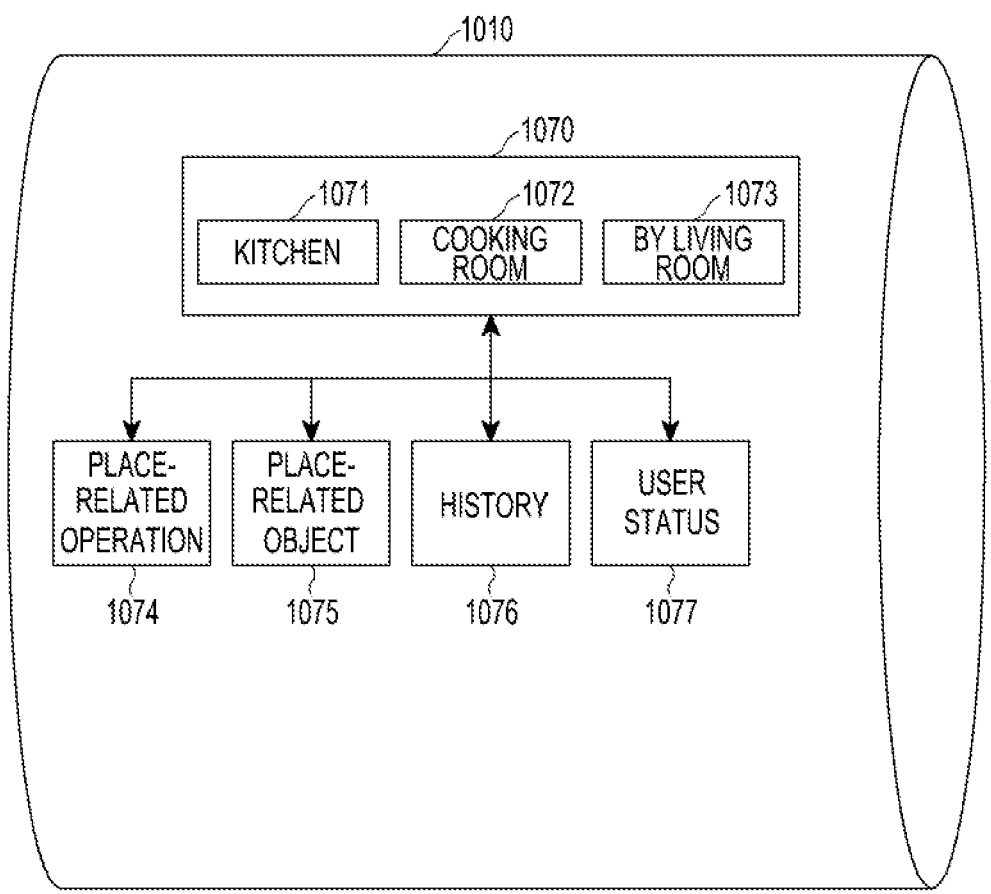
Figure 10C:
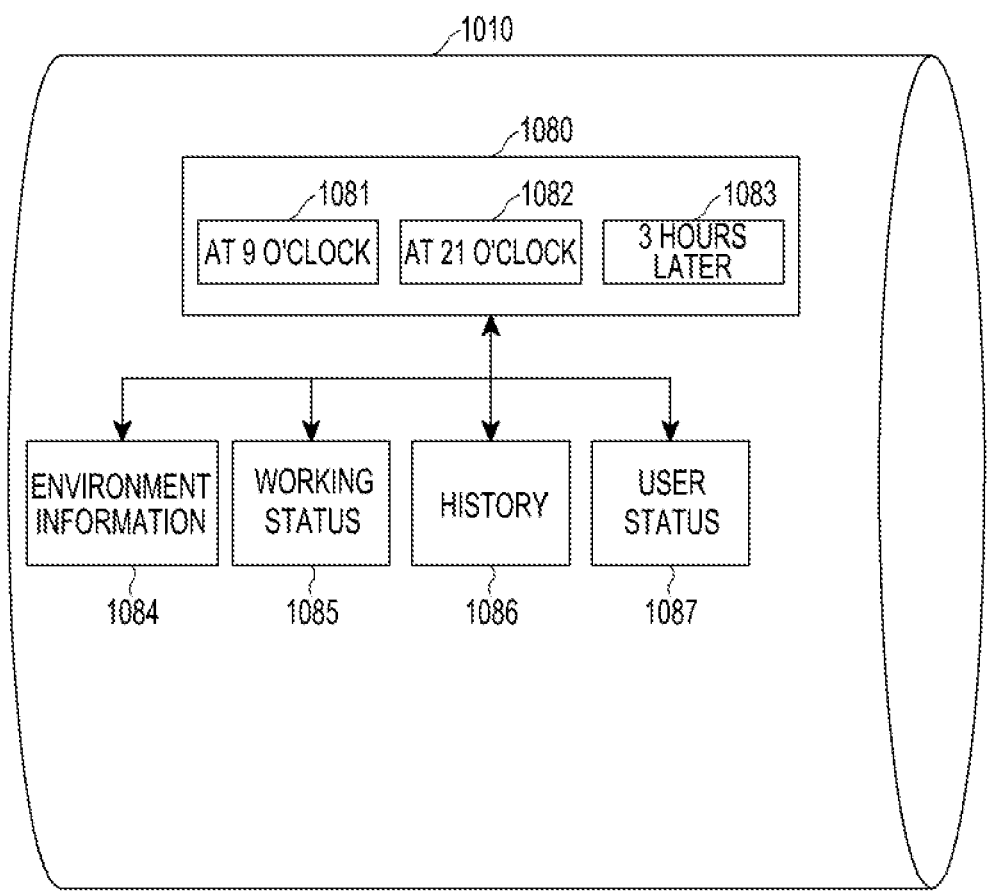

FIGS. 10A to 10C are concept views illustrating the type of databases classified as a first response level according to various embodiments of the present disclosure.

Referring to FIG. 10A, the electronic device 101 may store a keyword 1060 indicating an electronic device, such as "TV (1061)," "television (1062)," or "display (1063)," in the keyword database 1010. The electronic device 101 may classify the user voice including the component corresponding to the keyword 1060 indicating the electronic device as the first response level 1051. Meanwhile, the electronic device 101 may store contents 1064, working status 1065, history 1066, and user status 1067 in association with the keyword 1060 indicating the electronic device as the first response level 1051. Here, the contents 1064 indicates, e.g., a movie or a drama (TV show), and may include lower-level keywords related to the contents. The working status 1065 may include keywords related to the operation of the electronic device. The history 1066 may include keywords indicating information, such as the use history of the electronic device. The user status 1067 may include various keywords indicating the status of the user.

The electronic device 101 may determine an operation or operation candidate corresponding to the user voice using the keywords 1064 to 1067 stored in association. Meanwhile, the electronic device 101 may classify the user voice including the keywords including the keywords 1064 to 1067 stored in association as the second response level 1062.

Referring to FIG. 10B, the electronic device 101 may store a keyword 1070 indicating a place, such as "kitchen (1071)," "cooking room (1072)," or "by living room (1073)," in the keyword database 1010. The electronic device 101 may classify the user voice including the component corresponding to the keyword 1070 indicating the place as the first response level 1051. Meanwhile, the electronic device 101 may store place-related operation 1074, place-related object 1075, history 1076, and user status 1077 in association with the keyword 1070 indicating the place. The place-related operation 1074 may include keywords of operations conductible in various places such as a kitchen, cooking room, or by a living room. The place-related object 1075 may include keywords of objects arranged in the place. The history 1076 may include keywords related to the history performed in the place. The user status 1077 may include keywords indicating the user's status.

The electronic device 101 may determine an operation or operation candidate corresponding to the user voice using the keywords 1074 to 1077 stored in association. Meanwhile, the electronic device 101 may classify the user voice including the keywords including the keywords 1074 to 1077 stored in association as the second response level 1062.

Referring to FIG. 10C, the electronic device 101 may store a keyword 1080 indicating a time, such as "at 9 o'clock (1081)," "at 21 o'clock (1082)," or "three hours later (1083)," in the keyword database 1010. The electronic device 101 may classify the user voice including the component corresponding to the keyword 1080 indicating the time as the first response level 1051. Meanwhile, the electronic device 101 may store keywords, such as environment information 1084, working status 1085, history 1086, or user status 1087 in association with the keyword 1080 indicating the time. The environment information 1084 may include keywords indicating the ambient environment. The working status 1085 may include keywords indicating the operation of the electronic device. The history 1086 may include keywords indicating the operation history of the electronic device. The user status 1087 may include keywords indicating the user's status.

The electronic device 101 may determine an operation or operation candidate corresponding to the user voice using the keywords 1084 to 1087 stored in association. Meanwhile, the electronic device 101 may classify the user voice including the keywords including the keywords 1084 to 1087 stored in association as the second response level 1062.

According to an embodiment of the present disclosure, when various types of keywords are mixed, a weight may be assigned to each keyword, and the response level may be determined according to the sum of the weights.

Figure 11A:
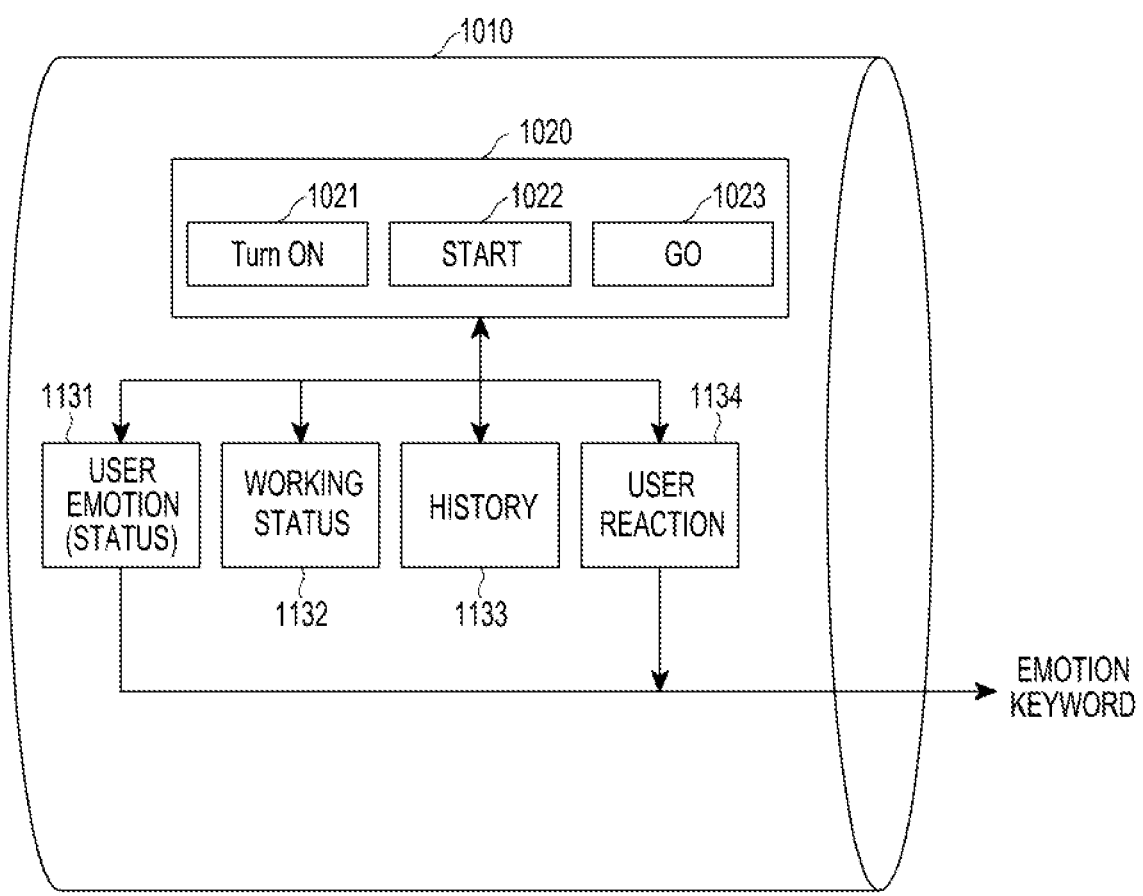
FIGS. 11A and 11B are concept views illustrating a process for classifying into a second response level according to various embodiments of the present disclosure.
Figure 11B:
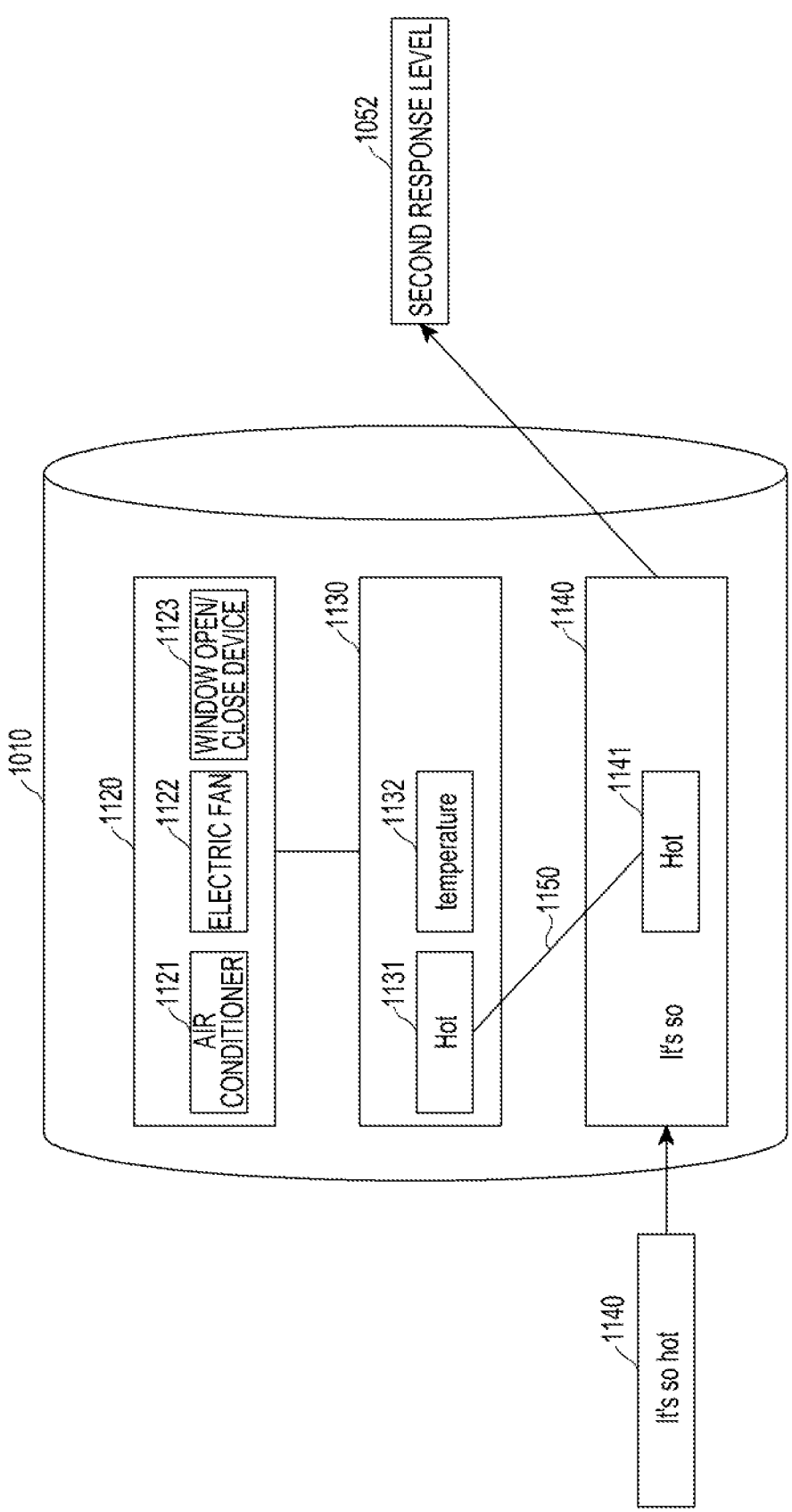

FIGS. 11A and 11B are concept views illustrating a process for classifying into a second response level according to various embodiments of the present disclosure.

Referring to FIG. 11A, the electronic device 101 may store the control keyword 1020 in the keyword database 1010 and may store, in association therewith, key words of the user's emotion (status) 1131, operation or working status 1132, history 1133, or user response/reaction 1134. The electronic device 101 may classify the user voice including a component corresponding to the keywords 1131, 1132, 1133, and 1134 stored in association with the control keyword 1020 as the second response level 1052. For example, as shown in FIG. 11B, the electronic device 101 may obtain the user voice 1140 "It's so hot." The electronic device 101 may store the keyword 1120 indicating a device in the keyword database 1020. The keyword 1120 indicating the device may include the air conditioner 1121, electric fan 1122, or window open/close device 1123. The electronic device 101 may include a keyword 1130 indicating a status in association with the keyword 1120 indicating the device, and the keyword 1130 indicating the status may include, e.g., "hot (1131)" or "temperature (1132)." The electronic device 101 may classify the user voice 1140 including the component "hot (1141)" corresponding to the keyword 1130 indicating the status (1131) as the second response level 1052. Further, the electronic device 101 may determine that the operation corresponding to the user voice 1140 is at least one of operations associated with the key word 1120 associated with the keyword 1130 indicating the status. The electronic device 101 may receive a user voice 1140, compare an included component 1141 with the control keyword 1130, and make a determination 1150 of a connecting status 1131.

Figure 12:
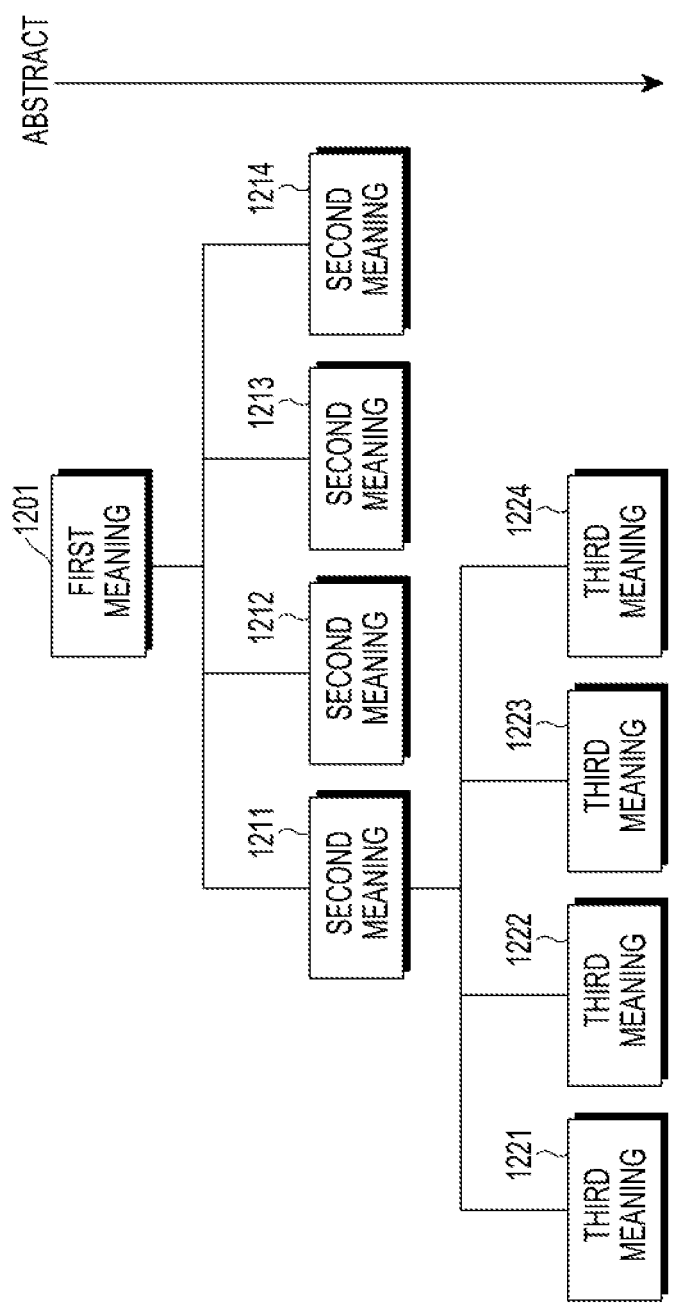
FIG. 12 is a concept view illustrating ontology according to an embodiment of the present disclosure.

FIG. 12 is a concept view illustrating ontology according to an embodiment of the present disclosure.

Referring to FIG. 12, the electronic device 101 may store a keyword 1201 with a first meaning and may store keywords 1211, 1212, 1213, and 1214 with a second meaning associated with the first meaning. Further, the electronic device 101 may store keywords 1221, 1222, 1223, and 1224 with a third meaning associated with the keyword 1211 with the second meaning. For example, as in the above-described example, the first meaning keyword 1201 may be a keyword indicating an electronic device, such as "air conditioner." The second meaning keyword 1211 may be a keyword indicating the status associated with an operational condition of the electronic device, such as "hot." The third meaning keyword 1221 may be a keyword associated with the status, such as "temperature." The electronic device 101 may determine the response level of the user voice using ontology and may determine an operation or operation candidate corresponding to the user voice. The electronic device 101 may learn or update the ontology. The electronic device 101 may learn and update various types of ontology by expanding the correlation between the keywords based on a deep learning or machine learning technology. The electronic device 101 may classify the user voice including, e.g., the first meaning keyword 1201 as the first response level and may classify the user voice including the second meaning keywords 1211 to 1214 or third meaning keywords 1221 to 1224 as the second response level. Further, the electronic device 101 may determine the operation or operation candidate corresponding to the user voice including the second meaning keyword 1211 as an operation including at least one of the first meaning 1201, second meanings 1211 to 1214 or third meanings 1221 to 1224. A configuration for determining an operation or operation candidate corresponding to the user voice by the electronic device 101 is described below in further detail. The first, second, and third meanings of the ontology may be classified depending on the degree of abstraction (e.g., represented by arrow labeled "ABSTRACT"). Here, the degree of abstraction may be a degree set in inverse proportion to whether the intention of the command is clear. For example, the identifier, operation, operation time, and operation place of the electronic device may be keywords relatively clearly indicating the intention of the command and may have a relatively low degree of abstraction. A keyword indicating the condition where an operation of the electronic device is performed, e.g., the user's emotion, user's status, and ambient environment-related information, may be a keyword failing to clearly indicate the intention and may have a relatively high degree of abstraction. As described above, the electronic device 101 may previously store the ontology and expand or update the same depending on the result of learning. The ontology may be used for keyword mapping and may also be used for assigning scores, which is described below in greater detail with reference to FIGS. 14A and 14B.

As described above, according to an embodiment of the present disclosure, the electronic device may determine a response level based on whether the user voice contains a component included in the keyword database.

Figure 13:
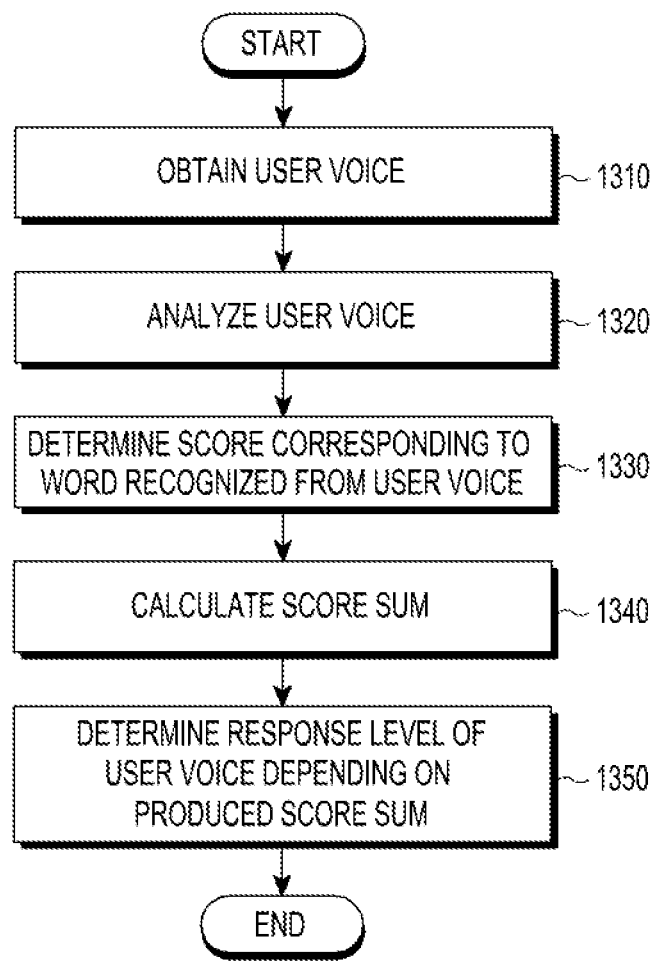
FIG. 13 is a flowchart illustrating a process for determining a response level according to an embodiment of the present disclosure.
Figure 14A:
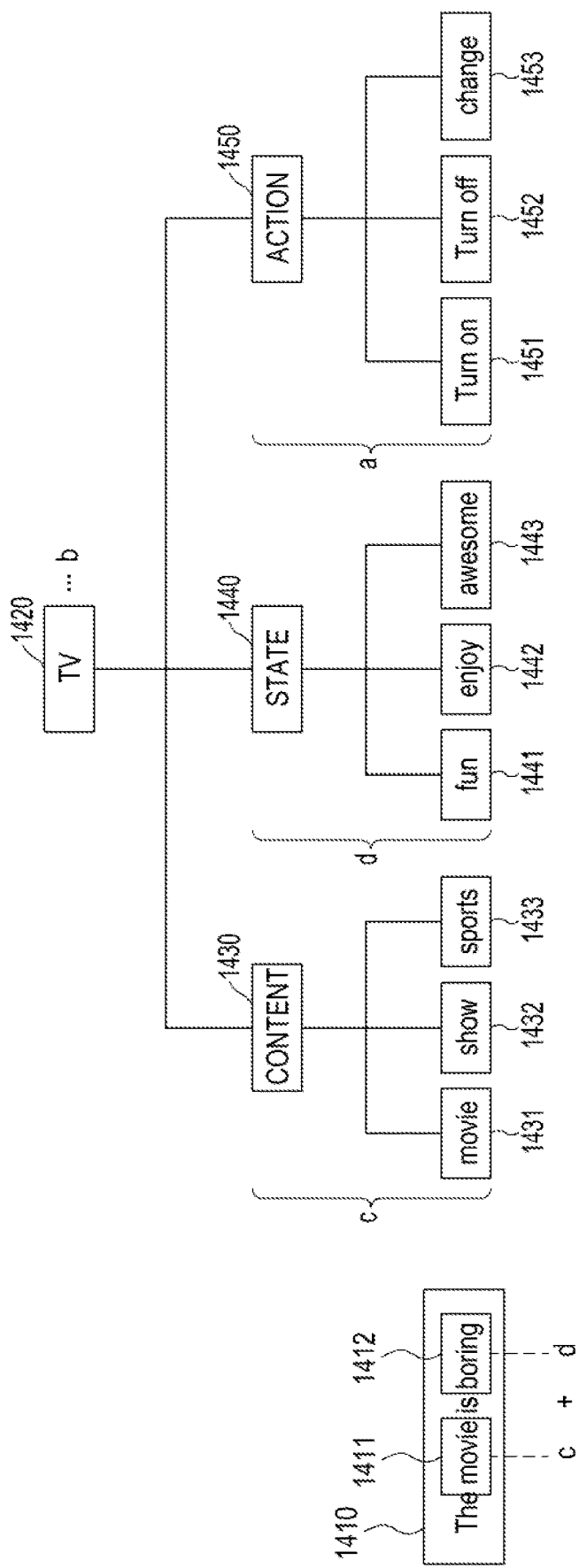
FIGS. 14A and 14B are concept views illustrating an example of presenting and summating scores according to various embodiments of the present disclosure.
Figure 14B:
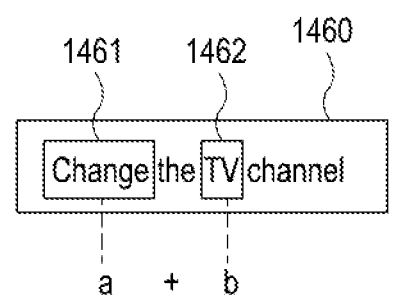

FIG. 13 is a flowchart illustrating a process for determining a response level according to an embodiment of the present disclosure. The embodiment of FIG. 13 is described in further detail with reference to FIGS. 14A and 14B. FIGS. 14A and 14B are concept views illustrating an example of presenting and summating scores according to an embodiment of the present disclosure.

Referring to FIG. 13, in operation 1310, the electronic device 101 may obtain the user voice. In operation 1320, the electronic device 101 may analyze the user voice. In operation 1330, the electronic device 101 may determine a score corresponding to a word recognized in the user voice. Specifically, the electronic device 101 may obtain text by applying a voice recognition algorithm to the user voice. Meanwhile, the electronic device 101 may previously store ontology for assigning scores. For example, as shown in FIG. 14A, the electronic device 101 may store, on the ontology, keywords 1451, 1452, and 1453 related to the first meaning keywords "TV (1420)" and "action (1450)." Although the "TV (1420)" is shown to be disposed on a higher level than that of the "action (1450)" in the ontology levels, this is merely for illustrating the association and may not directly describe the hierarchy. The electronic device 101 may previously set score b for the "TV (1420)" which is the first meaning keyword. The electronic device 101 may previously set score a for the "action (1450)" which is the first meaning keyword. As an example, score d may be set to be higher than score a. The electronic device 101 may set scores c and d for keywords 1431, 1432, and 1433 related to the second meaning keyword "content (1430)" and keywords 1441, 1442, and 1443 related to the "state (1440)." For example, the electronic device 101 may set scores c and d to be relatively lower than score b.

The electronic device 101 may identify the components 1411 and 1412 corresponding to the ontology among the components included in the user voice 1410 and assign scores c and d to the corresponding components 1411 and 1412, respectively. In operation 1340, the electronic device 101 may calculate the sum of the scores. In operation 1350, the electronic device 101 may determine the response level of the user voice depending on the produced sum of scores. According to an embodiment of the present disclosure, the electronic device 101 may allow a range where the score sum exceeds a first threshold to correspond to a first response level, a range where the score sum exceeds a second threshold and not more than the first threshold to correspond to a second response level, and a range where the score sum is not more than the second threshold to correspond to a third response level. The first threshold may be larger than the second threshold. For example, although the score sum c+d in the embodiment of FIG. 14A exceeds the second threshold, the electronic device 101 may determine that it is less than the first threshold and may determine that the response level of the user voice 1410 is the second response level. Further, the electronic device 101 may determine an operation or operation candidate corresponding to the user voice 1410 using ontology. According to an embodiment of the present disclosure, the electronic device 101 may determine an operation or operation candidate using at least one of other keywords on the ontology associated with the components 1411 and 1412 corresponding to the ontology as shown in FIG. 14A. For example, the electronic device 101 may determine an operation or operation candidate, such as "Turn on TV" or "Change TV" using associated keywords.

Referring to FIG. 14B, the electronic device 101 may obtain the user voice 1460 "Change TV channels." The electronic device 101 may assign score a to the component 1461 of the user voice 1460 and score b to the component 1462 using the ontology. The electronic device 101 may determine that the response level of the user voice 1460 is the first response level based on the score sum a+b exceeding the first threshold. Further, the electronic device 101 may immediately change channels which is an operation of the user voice 1460 corresponding to the first response level.

As described above, according to an embodiment of the present disclosure, the electronic device 101 may determine the response level of the user voice in such a manner as to assign and summate scores as per keywords.

Figure 15A:
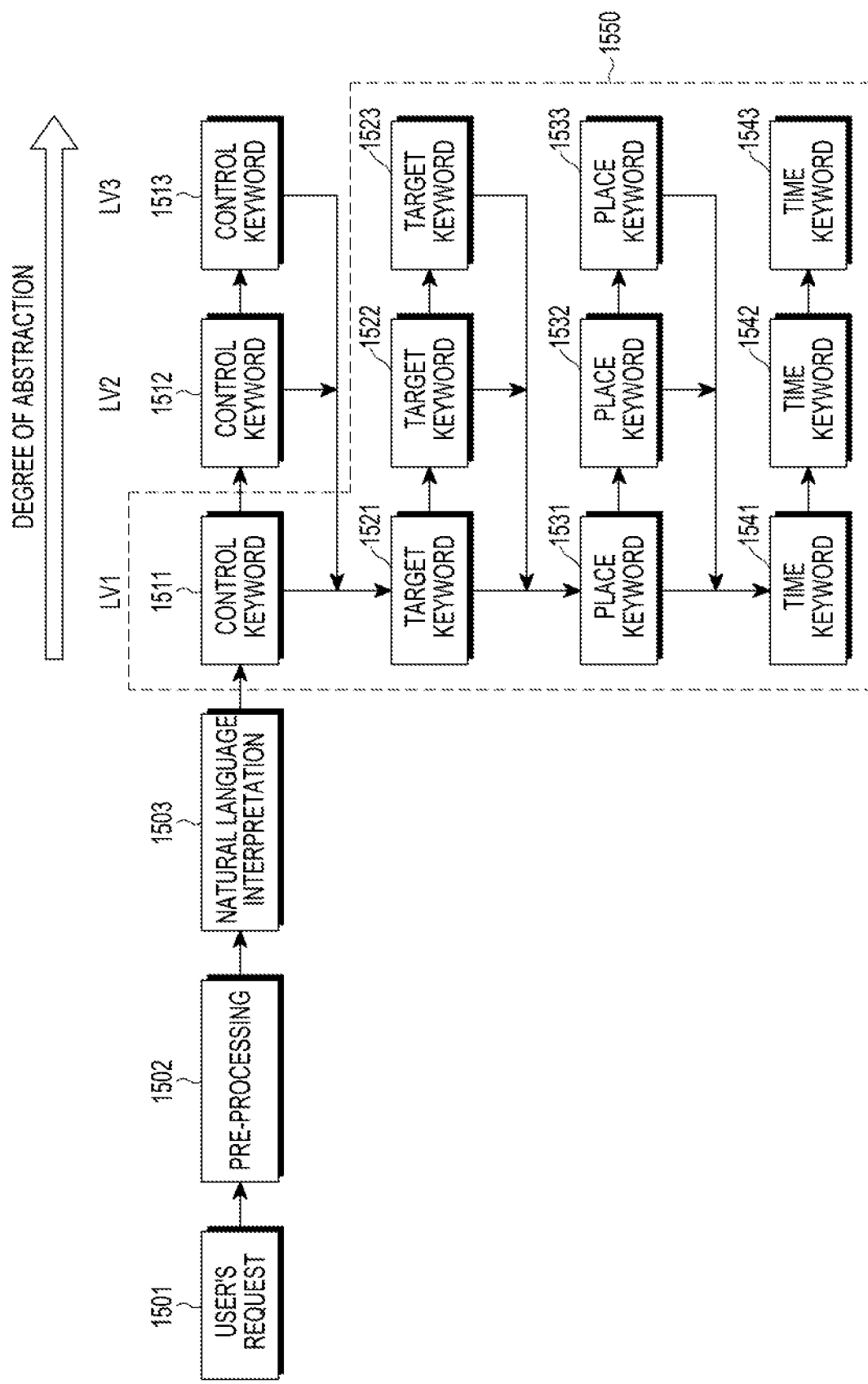
FIGS. 15A and 15B are concept views illustrating a process for determining a response level according to various embodiments of the present disclosure.
Figure 15B:
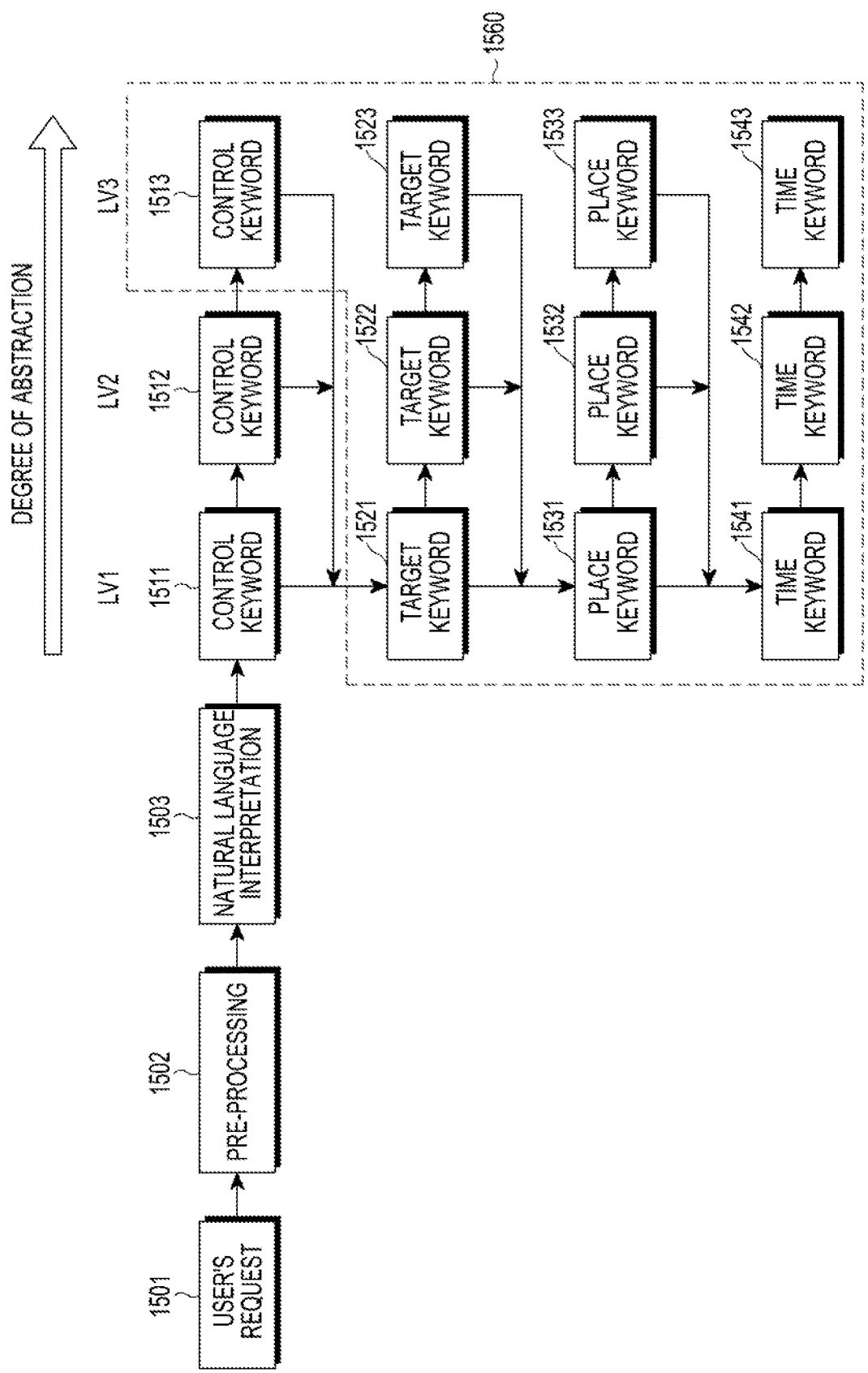

FIGS. 15A and 15B are concept views illustrating a process for determining a response level according to various embodiment of the present disclosure.

Referring to FIG. 15A, the electronic device 101 may pre-process (1502) the user voice (e.g., the user's request) 1501 and convert into text and may output a result obtained by performing natural language interpretation (1503) on the same. The electronic device 101 may determine the role of components or the relation between the components in the text by performing natural language interpretation (1503). For example, as a result of performing natural language interpretation (1503) on the user voice 1501 "Hey, please turn on TV," the electronic device 101 may determine that "Hey" is an address term, "TV" denotes an object or target, "please" is an adverb, and "turn on" is a verb.

Specifically, the electronic device 101 may convert the user voice into text using the Acoustic Sound Recognition (ASR) function. Further, the electronic device 101 may analyze the role of keywords in the text or the relation with other keywords using the natural language unit (NLU) function or dialog management (DM) function.

The electronic device 101 may compare the result of the natural language interpretation (1503) with the keyword database. According to an embodiment of the present disclosure, the electronic device 101 may first perform the comparison on the verb determined from the result of the natural language interpretation or a word corresponding to the command and may determine the response level of the user voice 1501 using the result of comparison. In the embodiment of FIG. 15A, the electronic device 101 may store control keywords 1511, 1512, and 1513, target keywords 1521, 1522, and 1523, place keywords 1531, 1532, and 1533, and time keywords 1541, 1542, and 1543 in ascending order of abstraction.

According to an embodiment of the present disclosure, the electronic device 101 may determine that the verb "turn on" in the user voice 1501 corresponds to the control keyword 1511 with a first degree of abstraction (LV1). The electronic device 101 may determine that the response level of the user voice 1501 is the first response level based on identifying that the verb in the user voice 1501 corresponds to the control keyword 1511 of the first degree of abstraction. The electronic device 101 may additionally determine whether the component corresponding to the target keyword, place keyword, or time keyword is included in the user voice 1501 and may accordingly compare with the database according to the determination route at the lower side of the control keyword 1511. The electronic device 101 may determine an operation or operation candidate corresponding to the user voice 1501 according to the result of comparison according to the determination route at the lower side of the control keyword 1511. As set forth above, after outputting the operation candidate, the electronic device 101 may detect the user's additional selection to determine the operation. Further, the electronic device 101 may set a determination area 1550 according to the determination route at the lower side of the control keyword 1511 as the first response level.

FIG. 15B illustrates an example in which the response level of the user voice 1501 is determined as the second response level. It is assumed in FIG. 15B that the user voice 1501 is, e.g., "The move is boring." The electronic device 101 may determine that the verb "is," which is determined as a result of performing natural language processing (1503) on the user voice 1501, corresponds to the control keyword 1513 of the third degree of abstraction (LV3) and may determine a response level and operation or operation candidate through the determination route at the lower side of the control keyword 1513. The electronic device 101 may determine that the response level of the user voice 1501 is the second response level from a point of view that the verb corresponds to the control keyword 1513 of the third degree of abstraction. The electronic device 101 may set the determination area 1560 at the lower side of the control keyword 1513 as the second response level. The second degree of abstraction is labeled LV2 in FIGS. 15A and 15B.

Figure 16:
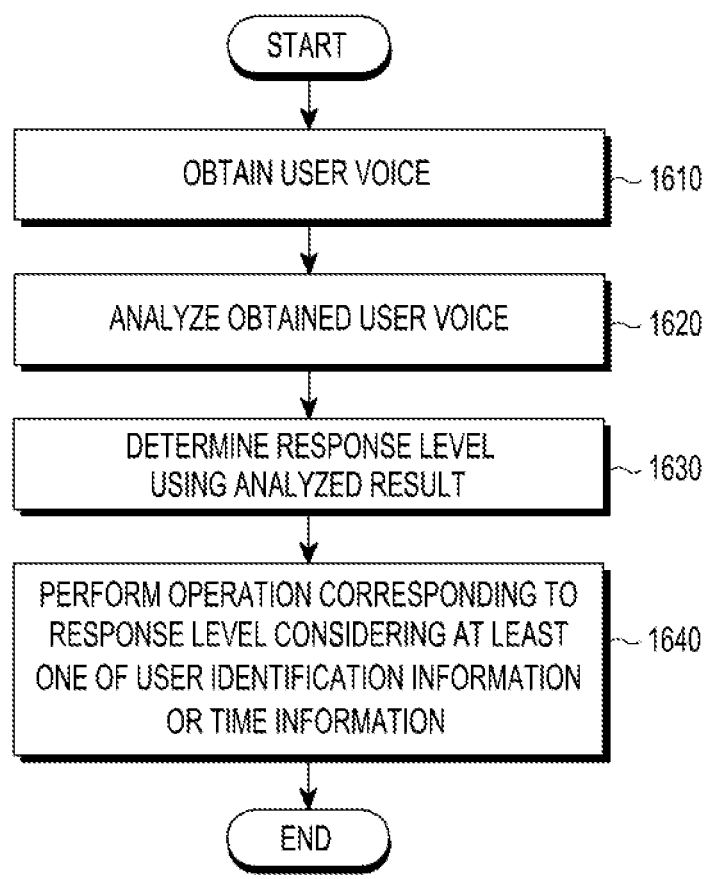
FIG. 16 is a flowchart illustrating a method for controlling an electronic device according to an embodiment of the present disclosure.

FIG. 16 is a flowchart illustrating a method for controlling an electronic device according to an embodiment of the present disclosure.

Referring to FIG. 16, in operation 1610, the electronic device 101 may obtain the user voice. In operation 1620, the electronic device 101 may analyze the obtained user voice. In operation 1630, the electronic device 101 may determine a response level using the result of analysis. In operation 1640, the electronic device 101 may perform an operation corresponding to the response level considering at least one of user identification information or time information. Specifically, the electronic device 101 may determine the response level based on the result of analysis of the user voice, and as set forth above, the electronic device 101 may set an operation corresponding to each response level. The electronic device 101 may perform an operation further considering at least one of user identification information or time information upon performing the operation corresponding to each response level.

Figure 17:
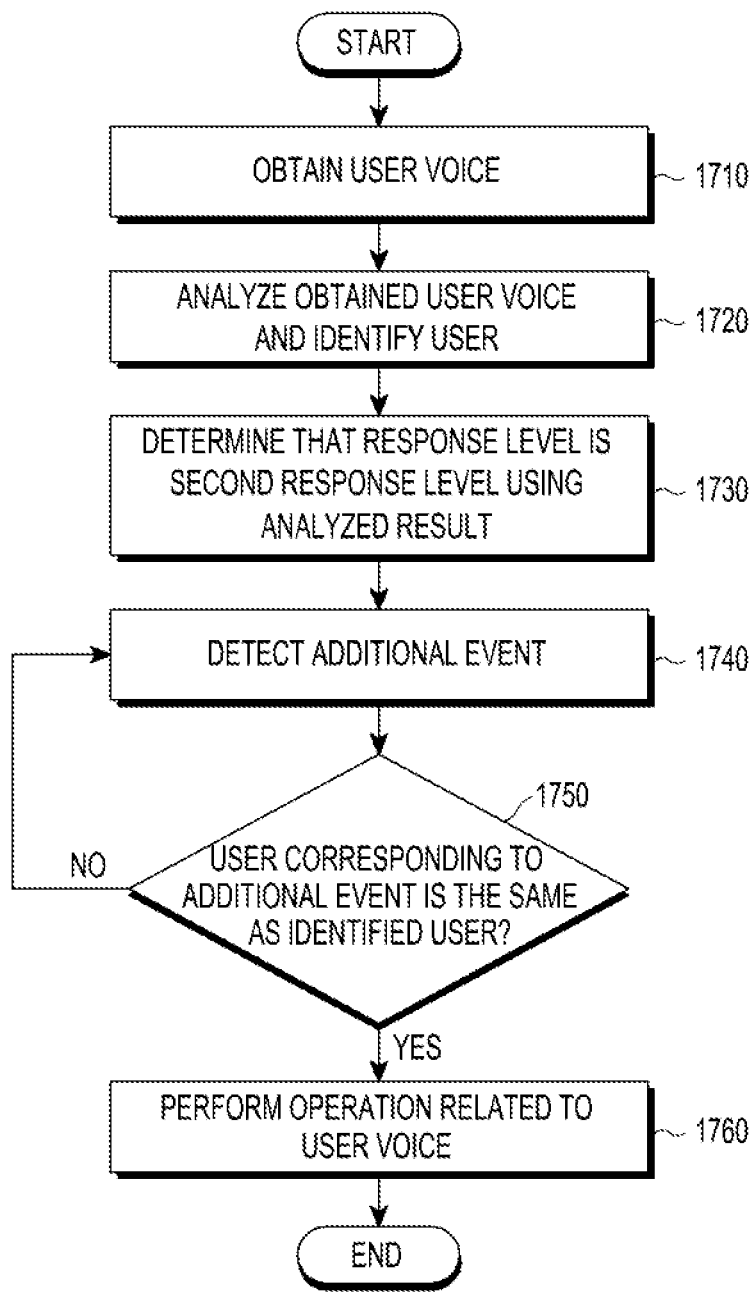
FIG. 17 is a flowchart illustrating a method for performing a per-response level operation using user identification information according to an embodiment of the present disclosure.
Figure 18A:
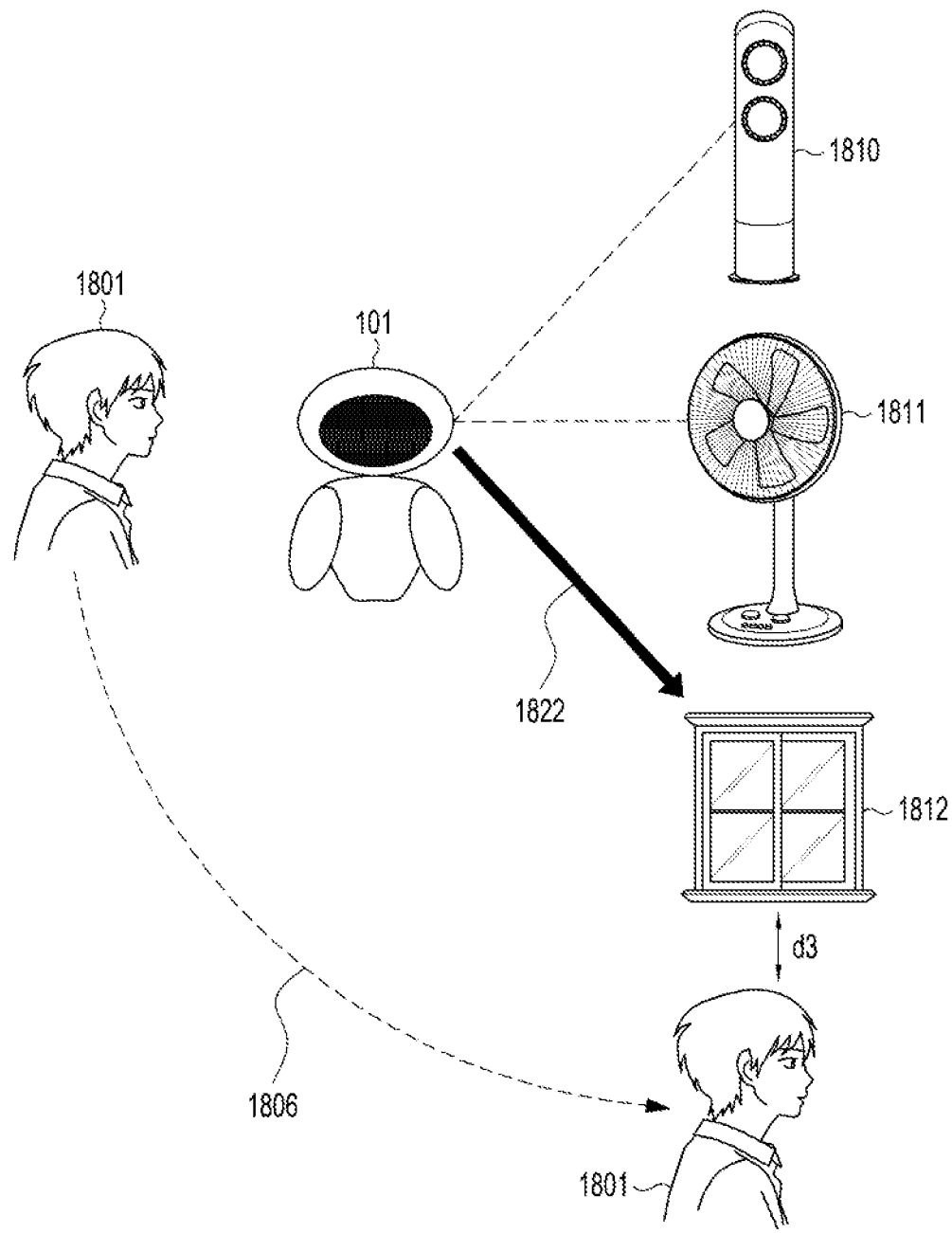
FIGS. 18A and 18B are concept views illustrating an electronic device performing an operation considering user identification information according to various embodiments of the present disclosure.
Figure 18B:
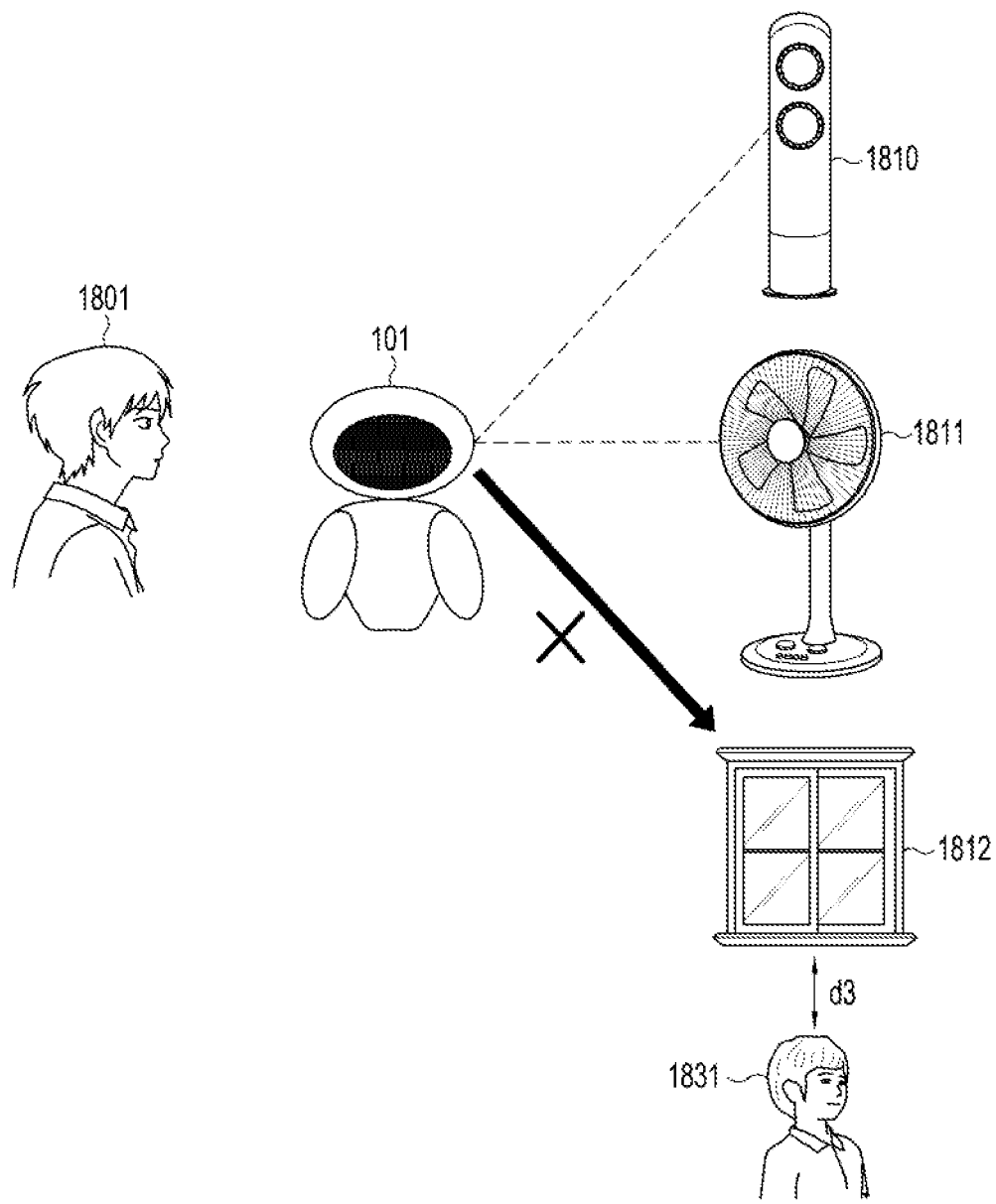

FIG. 17 is a flowchart illustrating a method for performing a per-response level operation using user identification information according to an embodiment of the present disclosure. The embodiment related to FIG. 17 is described in greater detail with reference to FIGS. 18A and 18B. FIGS. 18A and 18B are concept views illustrating an electronic device performing an operation considering user identification information according to an embodiment of the present disclosure.

In operation 1710, the electronic device 101 may obtain the user voice. In operation 1720, the electronic device 101 may analyze the obtained user voice and identify the user. The electronic device 101 may compare the voice print with a previously stored voice print using the result of the analysis of the user voice and identify the user based on the result of comparison. Or, the electronic device 101 may identify the user who produced the user voice in various manners, such as image analysis or entered user identification information.

In operation 1730, the electronic device 101 may determine that the response level is the second response level using the result of the analysis of the user voice. For example, it is assumed that as the result of the analysis of the user voice a keyword indicating the status or emotion is included or a sum of scores assigned to the user voice are less than a preset threshold.

In operation 1740, the electronic device 101 may monitor an additional event while delaying immediately performing an operation and may determine the additional event later. For example, it is assumed that the additional event is set to "approach between the user and another electronic device." For example, as shown in FIG. 18A, the user 1801 may approach (as noted by broken arrow 1806) the window open/close device 1812 within distance d3. Upon determining that the distance d3 between the user 1801 and the window open/close device 1812 is less than a predetermined threshold, the electronic device 101 may determine that the additional event of the "approach between the user and another electronic device" is detected. The electronic device 101 may trace and image-capture the user 1801 and detect the additional event of the approach between the user 1801 and the window open/close device 1812 based on the result of analysis of the captured image. Or, the electronic device 101 may detect the additional event by receiving the information on the approach of the user 1801 from the window open/close device 1812. Or, the electronic device 101 may detect the additional event by receiving the information on an electronic device (e.g., a camera) image capturing the home network to an object.

In operation 1750, the electronic device 101 may determine whether the user corresponding to the additional event is the same as the identified user. For example, in the embodiment of FIG. 18A, the electronic device 101 may determine that the user 1801 approaching the window open/close device 1812 is the same as the user 1801 who produced the user voice. Upon determining that the user corresponding to the additional event is the same as the identified user, the electronic device 101 may perform an operation related to the user voice in operation 1760. The electronic device 101 may transmit a control signal 1822 for opening the window open/close device 1812 to the window open/close device 1812, corresponding to the detection of the additional event. Accordingly, even when the user 1801 himself/herself does not open the window, the electronic device 101 may perform an operation consistent with the user's intention.

Meanwhile, as shown in FIG. 18B, the electronic device 101 may determine that the user corresponding to the additional event, i.e., the user 1831 approaching the window open/close device 1812 is different from the identified user 1801. Upon determining that the user corresponding to the additional event is different from the identified user, the electronic device 101 may continue to monitor the additional event or disregard the user voice. In this state, the electronic device 101 does not transmit a control signal for opening the window open/close device 1812 to the window open/close device 1812, as shown in FIG. 18B.

As described above, according to an embodiment of the present disclosure, the electronic device 101 may perform an operation using the user identification information while performing an operation according to response level.

Figure 19A:
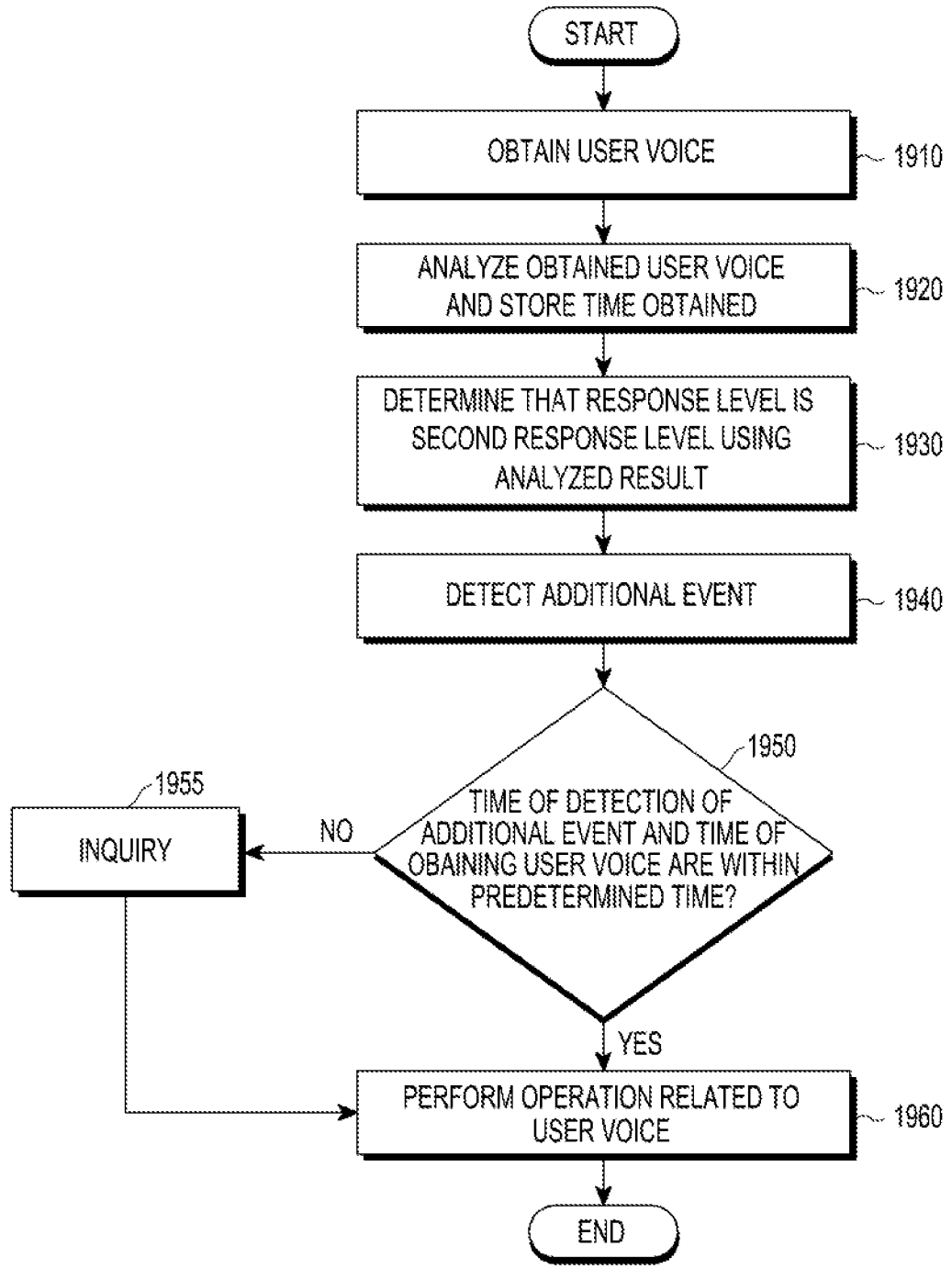
FIGS. 19A and 19B are flowcharts illustrating a method for performing a per-response level using time information according to various embodiments of the present disclosure.
Figure 19B:
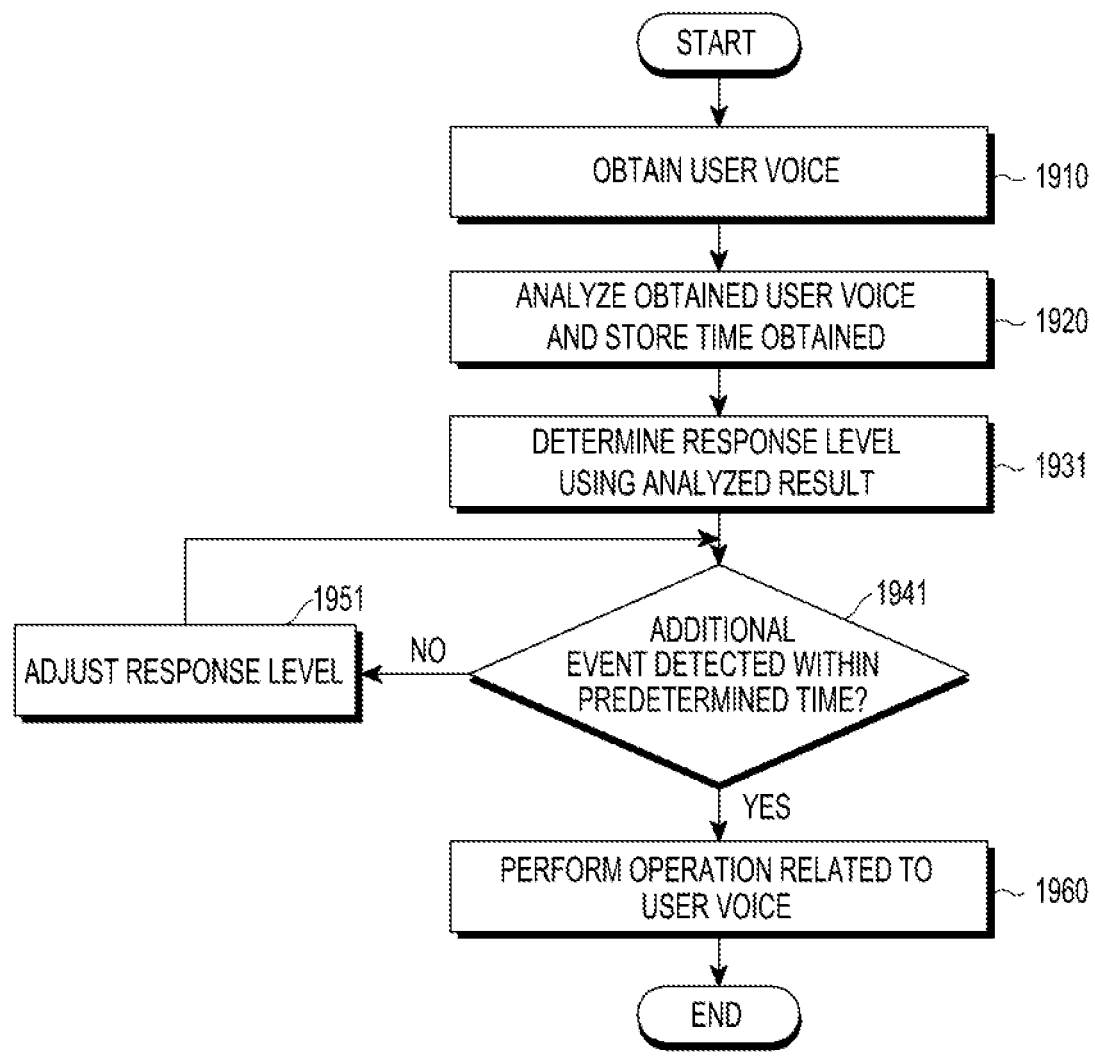

FIGS. 19A and 19B are flowcharts illustrating a method for performing a per-response level using time information according to various embodiments of the present disclosure.

Referring to FIG. 19A, the electronic device 101 may obtain a user voice in operation 1910. In operation 1920, the electronic device 101 may analyze the obtained user voice and store the time of obtaining the user voice.

In operation 1930, the electronic device 101 may determine that the response level is the second response level using the result of the analysis. For example, it is assumed that as the result of the analysis of the user voice a keyword indicating the status or emotion is included or a sum of scores assigned to the user voice are less than a preset threshold.

In operation 1940, the electronic device 101 may detect an additional event. In operation 1950, the electronic device 101 may determine whether the time of detection of the additional event and the time of obtaining the user voice are within a preset time. Upon determining that the time of detection of the additional event and the time of obtaining the user voice are within the preset time, the electronic device 101 may perform an operation related to the user voice in operation 1960. Upon determining that the time of detection of the additional event and the time of obtaining the user voice are not less than the preset time, the electronic device 101 may send an inquiry to the user as to whether to perform an operation related to the user voice, and upon detecting the user's confirmation, it may perform an operation related to the user voice in operation 1955. For example, even when the user approaches the window open/close device a relatively long time after he produces the user voice "It's so hot," it may first inquire about whether to additionally open the window, and upon receiving a confirmation, open the window based on the detection of the additional event, rather than immediately opening the window. Accordingly, a voice command function may be provided which may comply with the user's intention.

Referring to FIG. 19B, the electronic device 101 may obtain a user voice in operation 1910. In operation 1920, the electronic device 101 may analyze the obtained user voice and store the time of obtaining the user voice.

In operation 1931, the electronic device 101 may determine the response level using the result of the analysis. In operation 1941, the electronic device 101 may determine whether an additional event is determined within a preset time. The preset time may be set to be different per response level.

When no additional event is determined to be detected within the preset time, the electronic device 101 may adjust the response level in operation 1951. For example, the electronic device 101 may reduce the response level of the user voice from the second response level to the third response level to disregard the user voice processing. When an additional event is determined to be detected within the preset time, the electronic device 101 may perform an operation related to the user voice in operation 1960.

Figure 20:
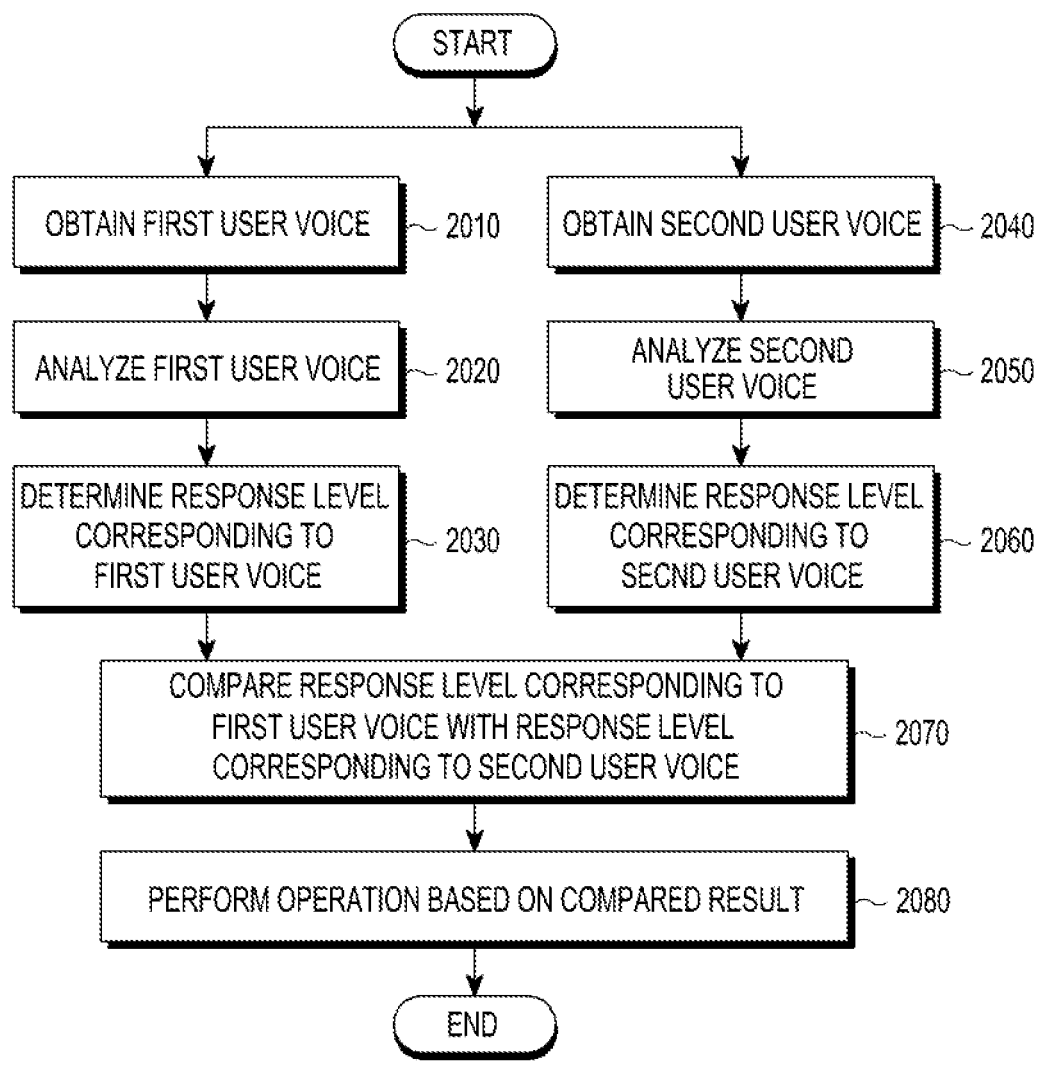
FIG. 20 is a flowchart illustrating a method for controlling an electronic device according to an embodiment of the present disclosure.

FIG. 20 is a flowchart illustrating a method for controlling an electronic device according to an embodiment of the present disclosure.

Referring to FIG. 20, in operation 2010, the electronic device 101 may obtain a first user voice. In operation 2020, the electronic device 101 may analyze the first user voice. In operation 2030, the electronic device 101 may determine the response level corresponding to the first user voice. In operation 2040, the electronic device 101 may obtain a second user voice. In operation 2050, the electronic device 101 may analyze the second user voice. In operation 2060, the electronic device 101 may determine the response level corresponding to the second user voice.

In operation 2070, the electronic device 101 may compare the response level corresponding to the first user voice with the response level corresponding to the second user voice. In operation 2080, the electronic device 101 may perform an operation based on the result of the comparison. For example, the first user may produce the first user voice "Open the window," and the second user may produce the second user voice "It's so cold." The electronic device 101 may determine that the response level of the first user voice is the first response level and that the response level of the second user voice is the second response level. The electronic device 101 may perform the operation "Transmit a window open signal" relatively corresponding to the response level.

Figure 21:
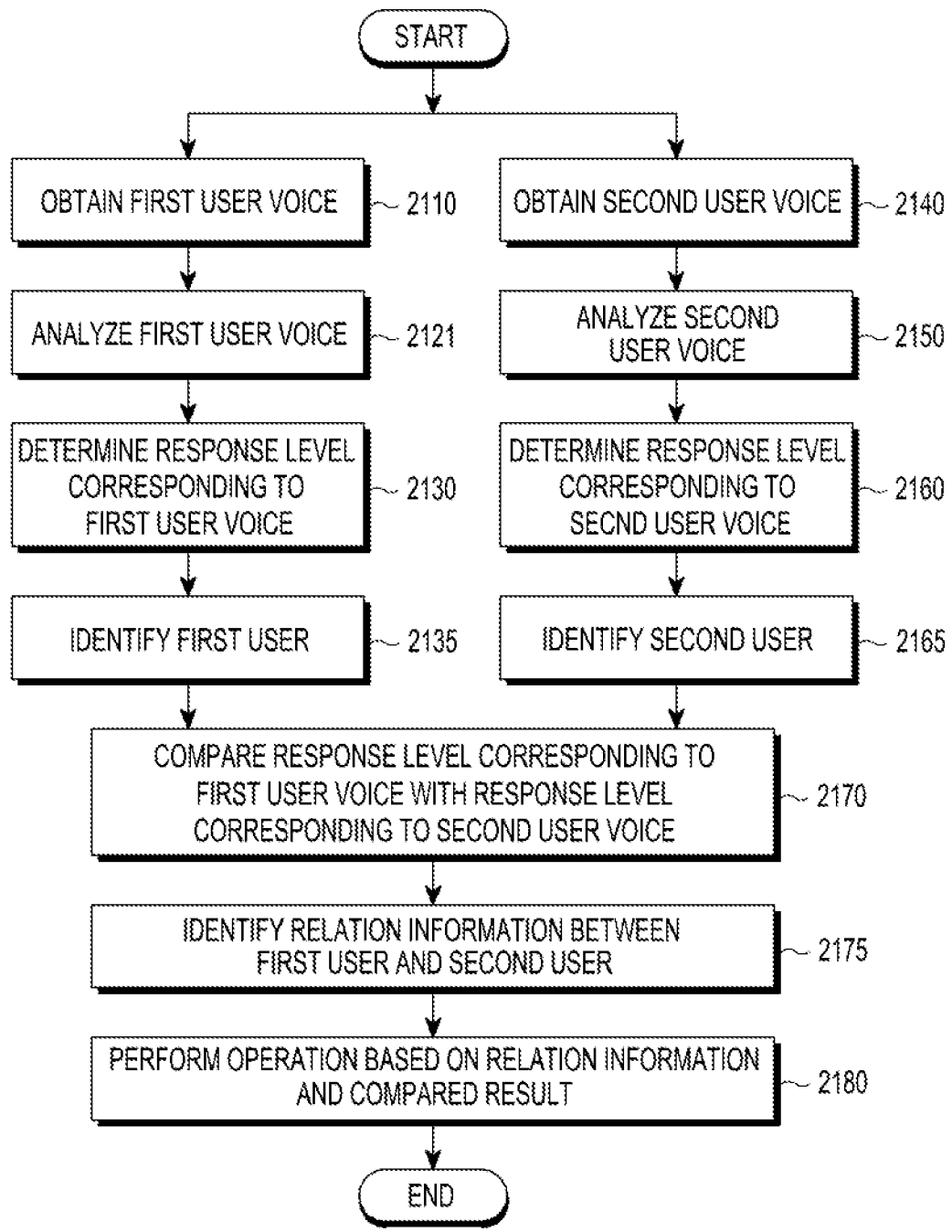
FIG. 21 is a flowchart illustrating a method for controlling an electronic device according to an embodiment of the present disclosure.

FIG. 21 is a flowchart illustrating a method for controlling an electronic device according to an embodiment of the present disclosure.

In operation 2110, the electronic device 101 may obtain a first user voice. In operation 2121, the electronic device 101 may analyze the first user voice. In operation 2130, the electronic device 101 may determine the response level corresponding to the first user voice. In operation 2135, the electronic device 101 may identify the first user. As described above, the electronic device 101 may identify the first user using various information, such as a voice print, analysis on a captured image, or entered user identification information. In operation 2140, the electronic device 101 may obtain a second user voice. In operation 2150, the electronic device 101 may analyze the second user voice. In operation 2160, the electronic device 101 may determine the response level corresponding to the second user voice. In operation 2165, the electronic device 01 may identify the second user.

In operation 2170, the electronic device 101 may compare the response level corresponding to the first user voice with the response level corresponding to the second user voice. In operation 2175, the electronic device 101 may identify the relation information between the first user and the second user. In operation 2180, the electronic device 101 may perform an operation based on the result of comparison and the relation information. According to an embodiment of the present disclosure, the electronic device 101 may perform an operation corresponding to the user voice with a higher response level. Meanwhile, when the response levels are the same, the electronic device 101 may perform an operation corresponding to the user voice produced by the user with a higher priority based on preset inter-user relation information. For example, it is assumed that the first user may produce the first user voice "It's so cold," and the second user produces the second user voice "It's so hot." The electronic device 101 may determine that the response levels of the first user voice and the second user voice are the second response level. In such case, the electronic device 101 may determine the relation information between the first user and the second user. For example, the priority of the first user may be higher than the priority of the second user. The electronic device 101 may operate corresponding to the first user voice and response level. The electronic device 101 may monitor an additional event corresponding to the first user voice, and upon detecting an additional event, it may perform an operation corresponding to the first user voice.

As described above, with reference to FIG. 21, even when receiving different commands from a plurality of users, the electronic device 101 may perform a command matching the user's intention. Meanwhile, according to an embodiment of the present disclosure, the electronic device 101 may perform an operation based on the relation information between the user and the electronic device 101. According to an embodiment of the present disclosure, the electronic device 101 may previously store a per-user familiarity with respect to the electronic device 101, and when receiving user voices from a plurality of users, it may perform an operation corresponding to the user voice of any one user using the per-user familiarity.

Figure 22:
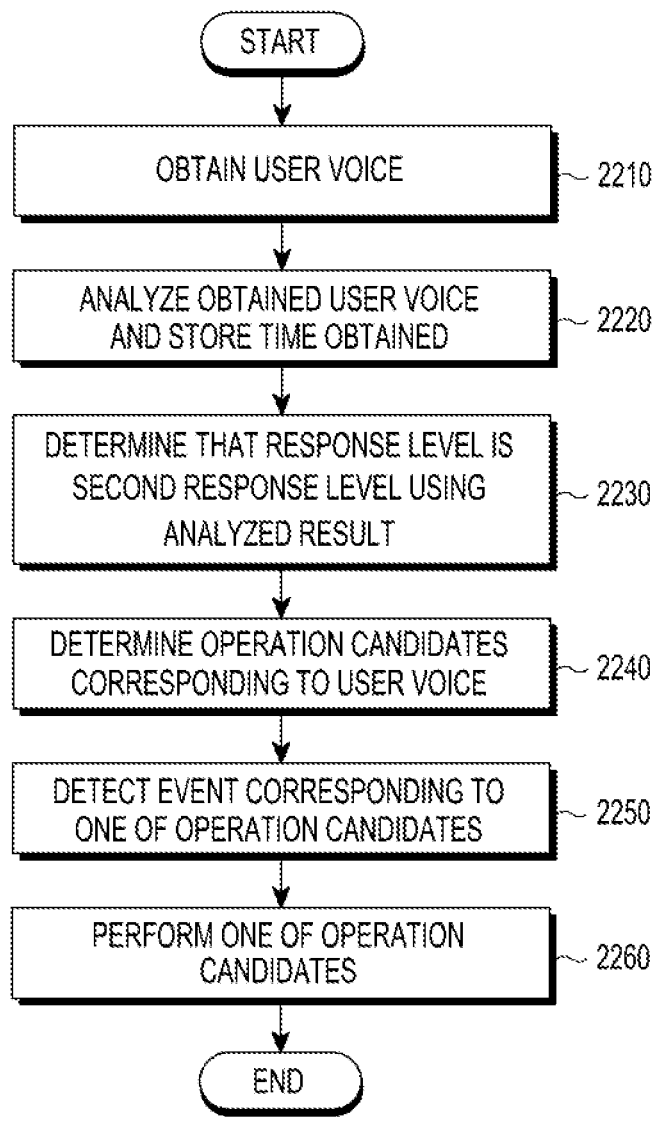
FIG. 22 is a flowchart illustrating a method for controlling an electronic device according to an embodiment of the present disclosure.
Figure 23A:
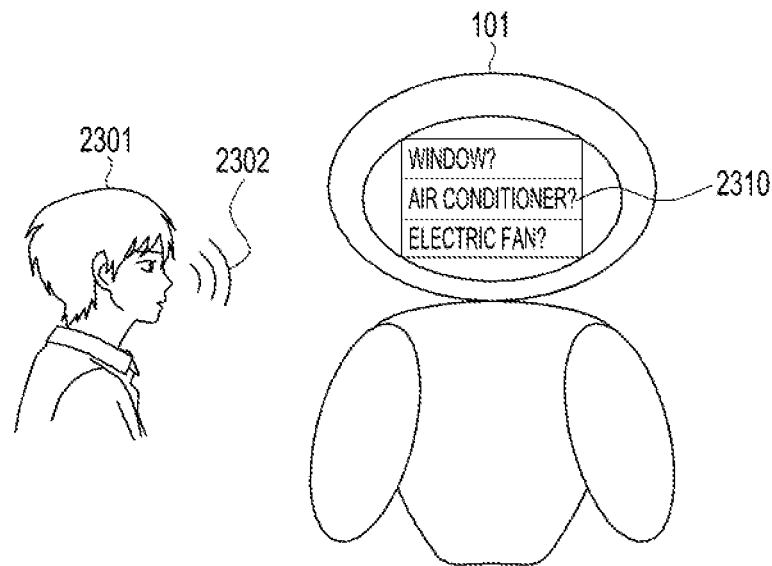
FIGS. 23A and 23B are concept views illustrating an operation of an electronic device according to various embodiments of the present disclosure.
Figure 23B:
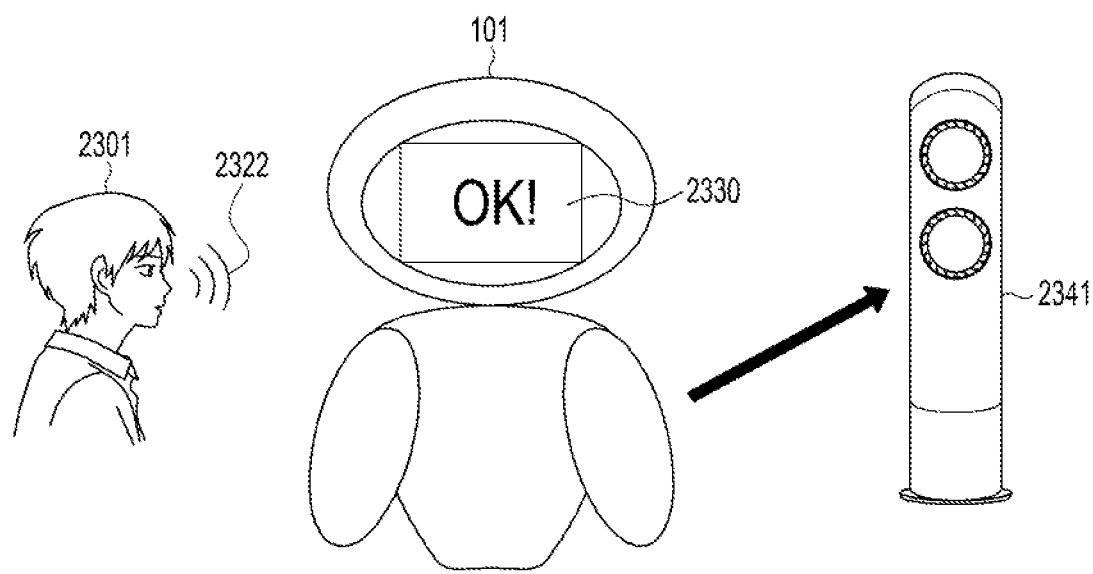

FIG. 22 is a flowchart illustrating a method for controlling an electronic device according to an embodiment of the present disclosure. The embodiment of FIG. 22 is described in greater detail with reference to FIGS. 23A and 23B. FIGS. 23A and 23B are concept views illustrating an operation of an electronic device according to an embodiment of the present disclosure.

Referring to FIG. 22, in operation 2210, the electronic device 101 may obtain the user voice. In operation 2220, the electronic device 101 may analyze the obtained user voice.

In operation 2230, the electronic device 101 may determine that the response level is the second response level using the result of the analysis. For example, it is assumed that as the result of the analysis of the user voice a keyword indicating the status or emotion is included or a sum of scores assigned to the user voice are less than a preset threshold.

In operation 2240, the electronic device 101 may determine operation candidates corresponding to the user voice. In operation 2250, the electronic device 101 may detect an event corresponding to one of the operation candidates. In operation 2260, the electronic device 101 may perform one of the operation candidates corresponding to the detected event. For example, as shown in FIG. 23A, the electronic device 101 may obtain a user voice 2302 from the user 2301. The user voice 2302 may be, e.g., "It's so hot." The electronic device 101 may analyze the user voice 2302 to determine that the response level of the user voice 2302 is the second response level. The electronic device 101 may determine that the response level of the user voice 2302 is the second response level by detecting the keyword "hot" corresponding to the status or using a score corresponding to "hot." The electronic device 101 may determine operation candidates based on the result of analysis of the user voice 2302. For example, the electronic device 101 may determine operation candidates by combining words associated with the keyword included in the user voice 2302. For example, the electronic device 101 may associate the keyword "hot" with "window open/close device," "air conditioner," and "electric fan" and store them and may associate them with the control keyword "turn on" and store them. The electronic device 101 may determine operation candidates, such as "Transmit a turn on signal to the air conditioner", "Transmit a turn on signal to the electric fan" and "Transmit a window open signal" using the combination of the words stored in association. The electronic device 101 may display a graphic user interface 2310 displaying the operation candidates. As shown in FIG. 23B, the electronic device 101 may detect a feedback 2322 for selecting one of the operation candidates from the user 2301. The feedback 2322 may be a user voice, e.g., "Turn on the air conditioner." The electronic device 101 may run one of the operation candidates corresponding to the feedback 2322. Accordingly, the electronic device 101 may perform the operation "Transmit a turn on signal to the air conditioner" to transmit a turn on signal to the air conditioner 2341. Further, the electronic device 101 may also display a graphic user interface 2330 for identifying the feedback 2322.

Figure 24:
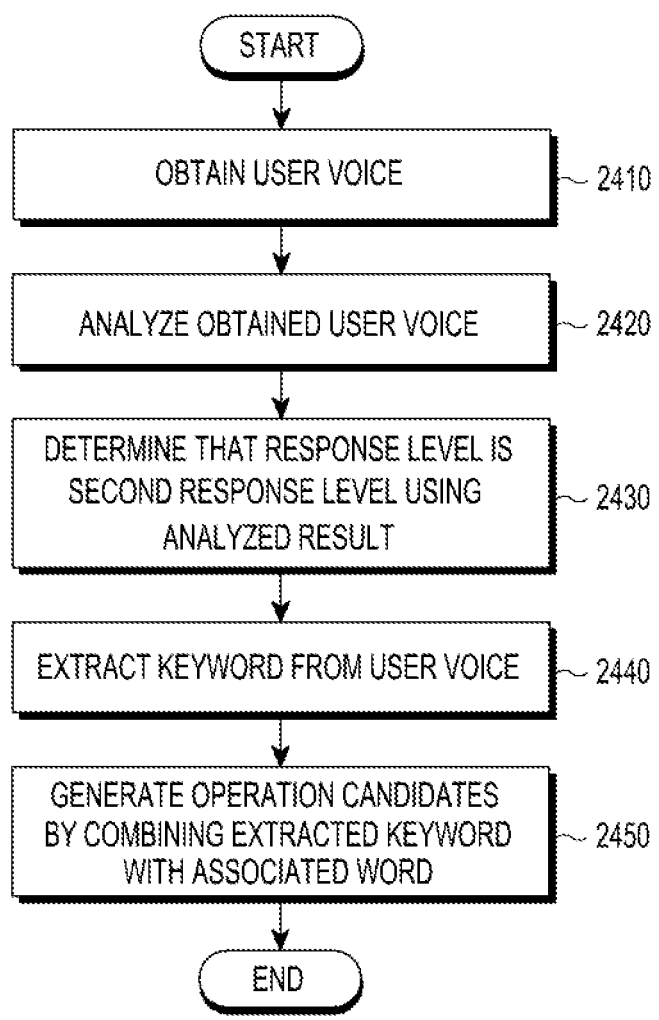
FIG. 24 is a flowchart illustrating a method for controlling an electronic device according to an embodiment of the present disclosure.
Figure 25A:
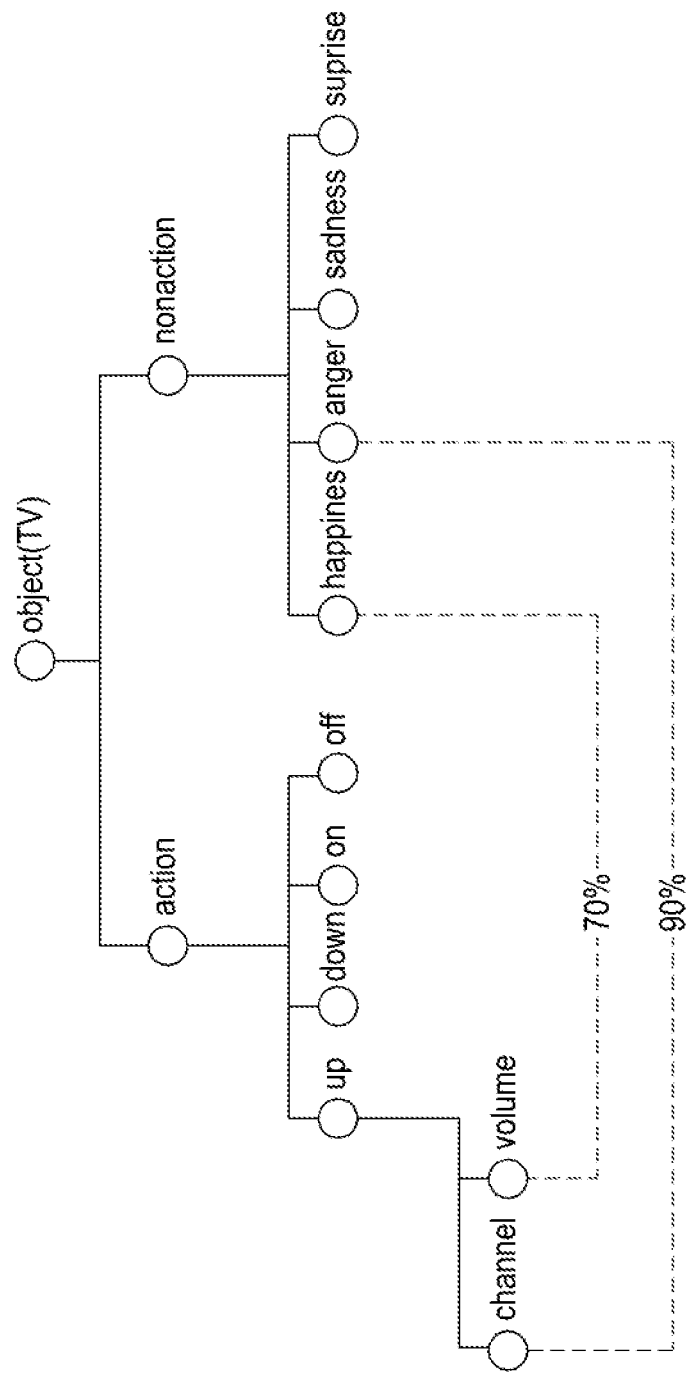
FIGS. 25A to 25C are concept views illustrating ontology according to various embodiments of the present disclosure.
Figure 25B:
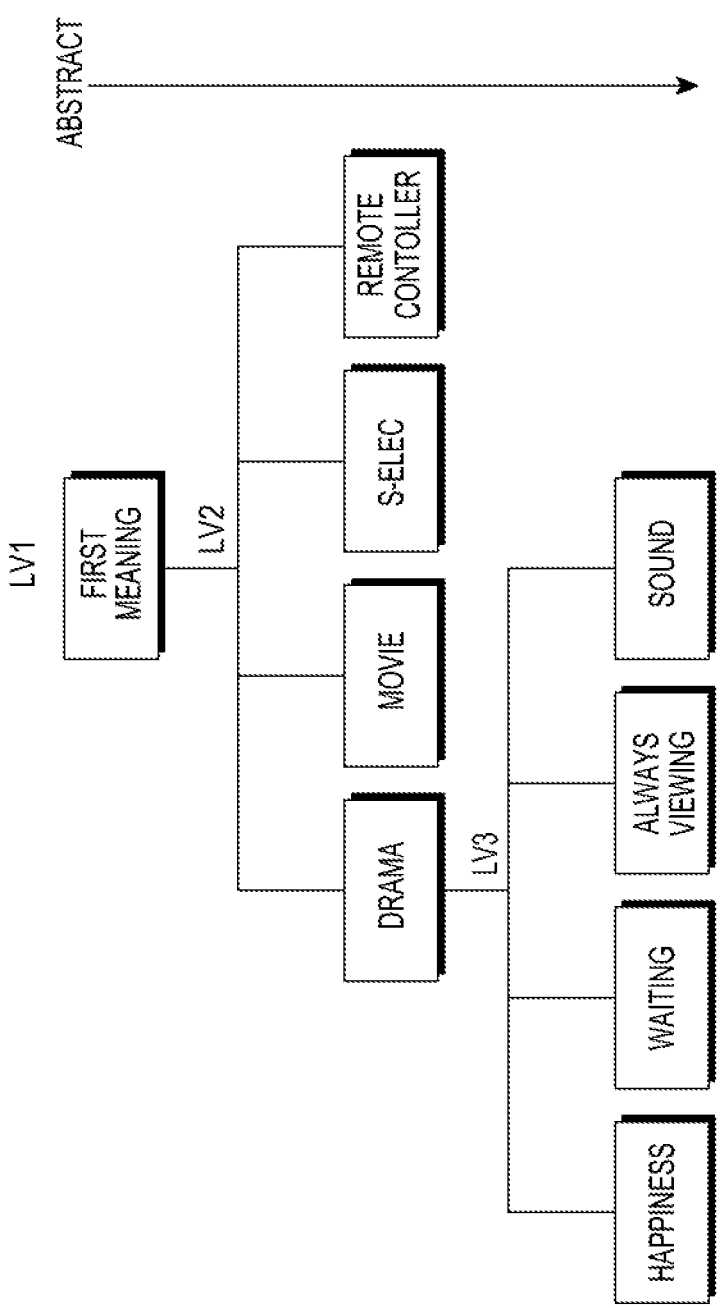
Figure 25C:
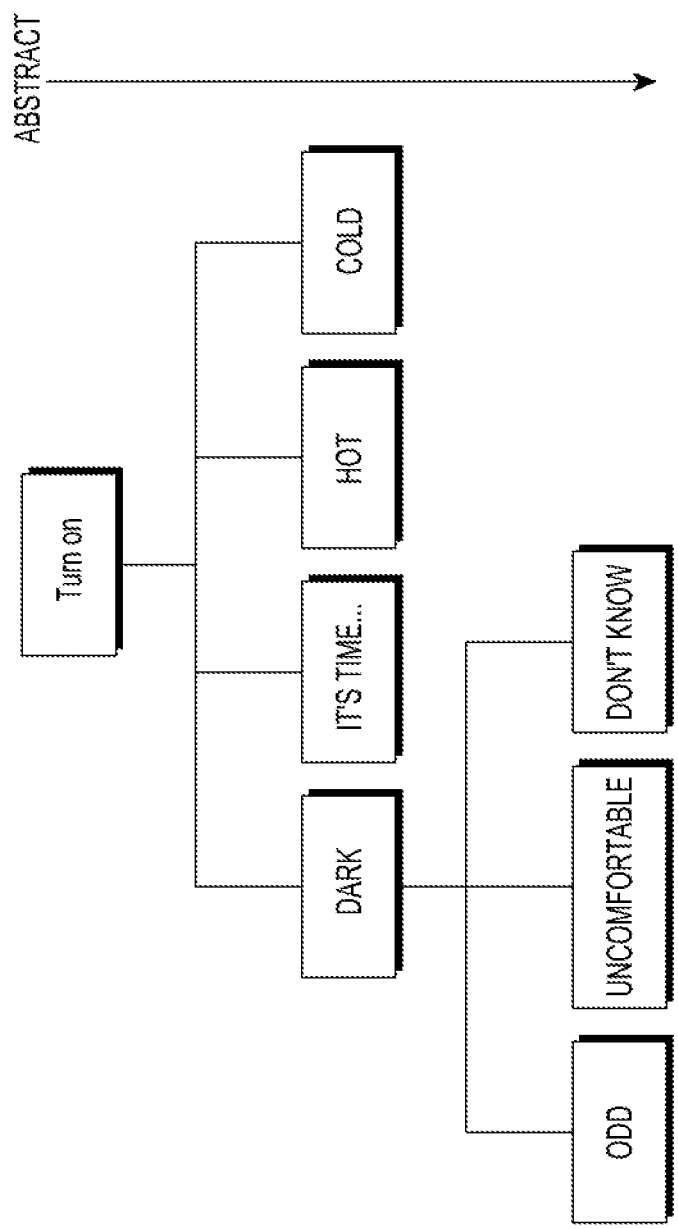

FIG. 24 is a flowchart illustrating a method for controlling an electronic device according to an embodiment of the present disclosure. The embodiment related to FIG. 24 is described in greater detail with reference to FIGS. 25A, 25B, and 25C. FIGS. 25A to 25C are concept views illustrating ontology according to various embodiments of the present disclosure.

Referring to FIG. 24, in operation 2410, the electronic device 101 may obtain the user voice. In operation 2420, the electronic device 101 may analyze the obtained user voice. In operation 2430, the electronic device 101 may determine that the response level is the second response level using the result of the analysis.

In operation 2440, the electronic device 101 may extract a keyword from the user voice. For example, the electronic device 101 may extract the keywords "TV" and "angry" from the user voice "The TV makes me angry." In operation 2450, the electronic device 101 may generate operation candidates by combining words associated with the extracted keywords. For example, the electronic device 101 may store ontology for generating an operation or operation candidates as shown in FIG. 25A. Referring to FIG. 25A, keywords indicating emotion (happiness, anger, sadness, and surprise) may be included in the nonaction category. Further, the keywords indicating emotion may be associated with a word of an object "TV." Meanwhile, the object "TV" may be stored in association with the action category, and the action category may include control keywords, such as up, down, on, and off, and the up control keywords may include keywords, such as channel and volume.

The electronic device 101 may determine operation candidates, such as, e.g., channel up, volume up, channel down, and volume down, by combining keywords associated with "TV" and "angry" using the ontology as shown in FIG. 25A. Meanwhile, in the embodiment of FIG. 25A, a numerical value may be assigned to the possibility of corresponding with a keyword matching per keyword. For example, in the embodiment of FIG. 25A, the possibility of correspondence between the keyword "happiness" and the keyword "volume" may be set to 70%, and the possibility of correspondence between the keyword "anger" and the keyword "channel" may be set to 90%. The electronic device 101 may select a keyword of a channel with a relatively high possibility of correspondence with the anger keyword and may determine channel up or channel down as operation candidates. In such case, operations set to have a relatively low possibility of correspondence may be excluded from the operation candidates.

FIGS. 25B and 25C illustrate ontology according to various embodiments of the present disclosure.

Referring to FIG. 25B, the electronic device 101 may configure a database that has an abstraction level depending on the degree of abstraction of the keyword and hierarchical levels as they expand from a direct meaning to an ambiguous meaning. The electronic device 101 may determine a response level or operation by the level.

Referring to FIG. 25B, the word "TV" which is at the uppermost level may be linked with, e.g., a drama (TV show) or a movie as a lower word which may be displayed through the TV as a next abstracted level and may be linked with the brand of the TV or object related to the TV. The second-level objects may also have lower-level abstracted keywords. Accordingly, the electronic device may make comparison as to the abstraction level of the KEYWORD of the recognized voice command and determine the ACTIVITY level depending on the level of each component of the voice command. For example, when the abstraction levels of target, time and place keywords are within two steps, the number of cases by the user is not many, and a confirmation of the component may be requested by a voice, and when the abstraction levels are three steps or more, the number of cases is many, and thus, other interfaces may be provided which, e.g., may make selection through a touch input. The first, second, and third degrees of abstraction are labeled LV1, LV2 and LV3.

For example, the electronic device 101 may obtain the user voice "Hey! if the drama is on air, please turn on TV." The electronic device 101 may recognize the keyword "drama" and may summate scores by referencing the abstraction level of the database regarding the level of the target keyword in the obtained user voice. Here, the electronic device may determine a response level depending on a reference for the sum of the respective levels of the components in the overall natural language sentence. Further, it may determine that the operation is "Turn on TV" based on the keyword association information. Further, the electronic device 101 may refer to the user history and may reflect the same to the operation to provide a feedback such as "Wanna turn on the TV in the living room at seven o'clock when the drama you watched yesterday starts?"

Referring to FIG. 25C, the electronic device 101 may store the ontology for associating keywords for conditions for running control keywords at the lower level of the "turn on" control keyword. Further, the electronic device 101 may associate and store a keyword for describing the running conditions at the lower level of the keywords for the running conditions. For example, the electronic device 101 may obtain the user voice "It's the time the drama starts." The electronic device 101 may extract the control keyword "turn on" as the keyword "It's the time." Further, the electronic device 101 may extract the "TV" keyword from the "drama" keyword utilizing the ontology shown in FIG. 25B. Accordingly, the electronic device 101 may determine an operation corresponding to the user voice "turn on the TV." In other words, the electronic device 101 may determine an operation corresponding to a user voice using a plurality of ontologies. The electronic device 101 may provide a feedback, such as "Wanna turn on the TV?" and upon detecting an additional confirmation from the user, it may send a turn on signal to the TV.

As described above, according to an embodiment of the present disclosure, the electronic device 101 may determine the response level of the user voice using one or more ontologies and may determine an operation or operation candidate corresponding to the user voice. As described above, the electronic device 101 may receive entry of various ontologies or may receive ontologies from another electronic device. Further, the electronic device 101 may expand or update the ontology by learning ontologies using information from the other electronic device or information obtained on its own.

Figure 26:
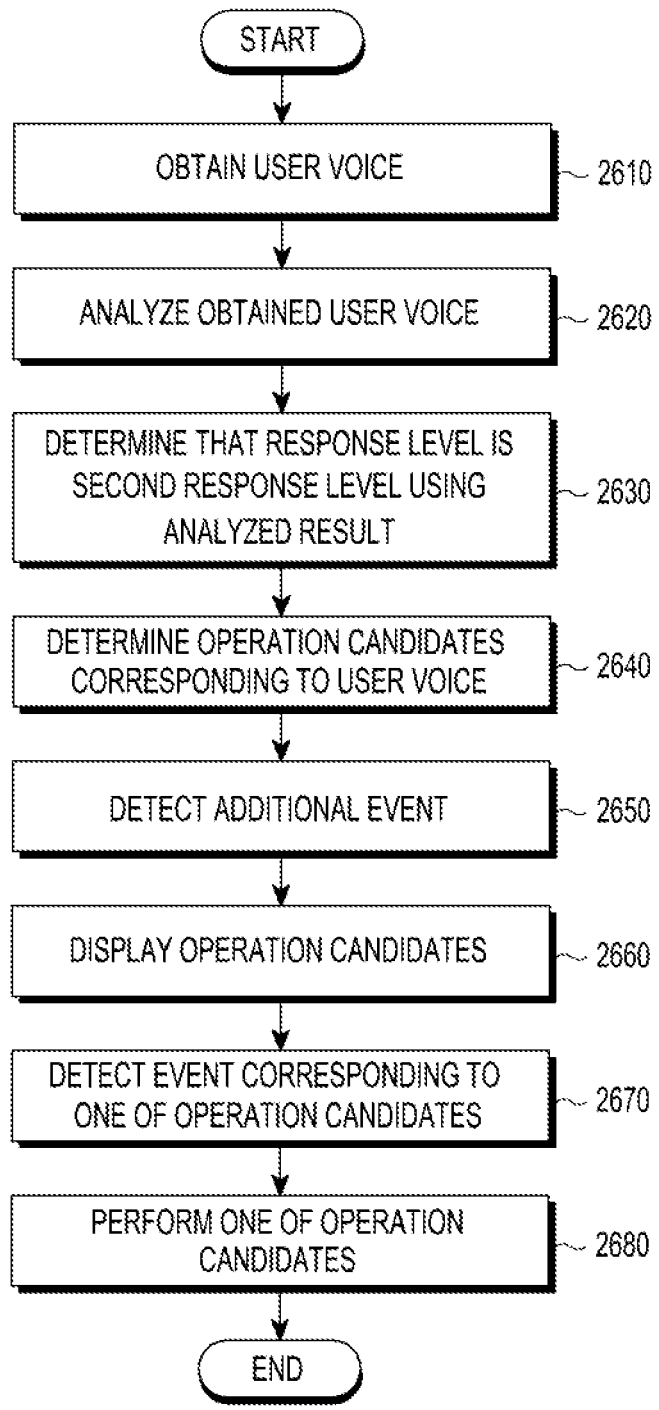
FIG. 26 is a flowchart illustrating a method for controlling an electronic device according to an embodiment of the present disclosure.
Figure 27:
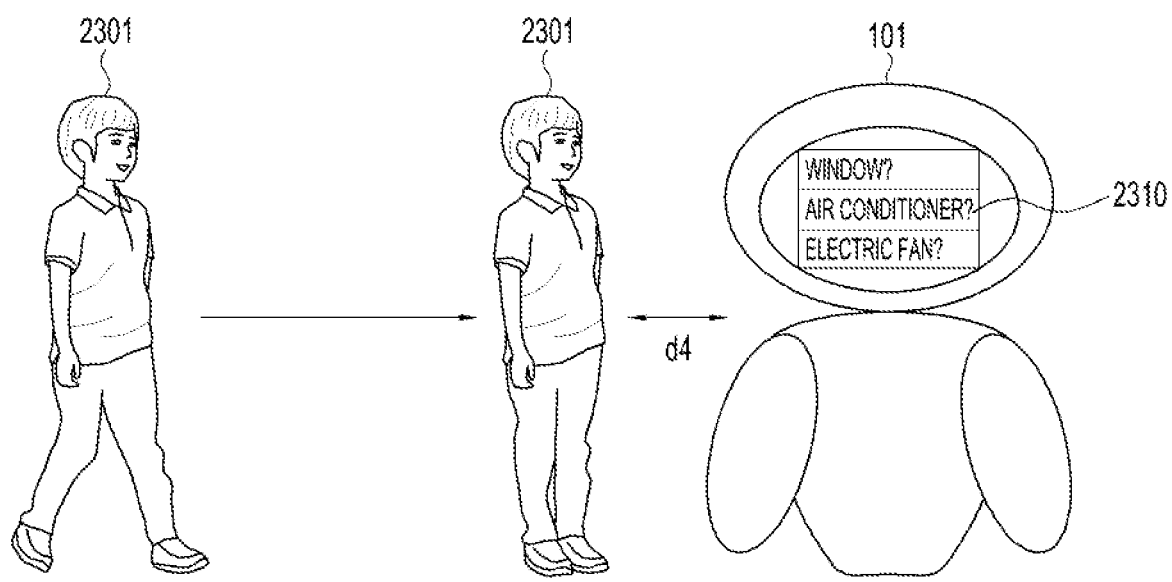
FIG. 27 is a concept view illustrating an operation of an electronic device according to an embodiment of the present disclosure.

FIG. 26 is a flowchart illustrating a method for controlling an electronic device according to an embodiment of the present disclosure. The embodiment shown in FIG. 26 is described in greater detail with reference to FIG. 27. FIG. 27 is a concept view illustrating an operation of an electronic device according to an embodiment of the present disclosure.

Referring to FIG. 26, in operation 2610, the electronic device 101 may obtain the user voice. In operation 2620, the electronic device 101 may analyze the obtained user voice. In operation 2630, the electronic device 101 may determine that the response level is the second response level using the result of the analysis. In operation 2640, the electronic device 101 may determine operation candidates corresponding to the user voice. The electronic device 101 may determine operation candidates using a combination of words stored in association with, e.g., keywords included in a user voice.

In operation 2650, the electronic device 101 may detect an additional event. Here, it is assumed that the user's approach is set to the additional event. For example, as shown in FIG. 27, the electronic device 101 may detect an approach of the user 2301. The electronic device 101 may determine the distance d4 from the user 2301 based on information from the proximity sensor or analysis on a captured image. When the distance d4 from the user 2301 is less than a preset threshold, the electronic device 101 may determine that the additional event set as the user's approach is detected.

In operation 2660, the electronic device 101 may display operation candidates. As shown in FIG. 27, the electronic device 101 may display a graphic user interface 2310 including operation candidates. Meanwhile, the electronic device 101 may generate an inquiry-type sentence including operation candidates and text-to-speech (TTS) the inquiry-type sentence and output in a voice. In operation 2670, the electronic device 101 may detect an event corresponding to one of the operation candidates. For example, the electronic device 101 may detect a user voice or touch designating one of the operation candidates. In operation 2680, the electronic device 101 may perform one of the operation candidates.

Figure 28:
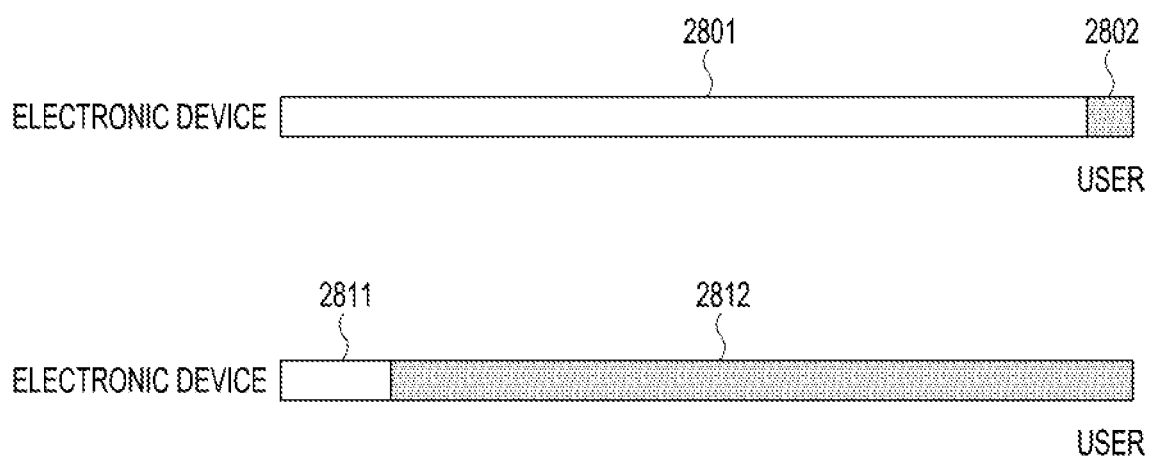
FIG. 28 is a concept view illustrating an operation of an electronic device according to an embodiment of the present disclosure.

FIG. 28 is a concept view illustrating an operation of an electronic device according to an embodiment of the present disclosure.

Referring to FIG. 28, the electronic device 101 may classify factors by which an operation corresponding to a user voice may be determined as a factor 2801 by the electronic device and a factor 2802 by the user. In the electronic device 101, as the response level increases, the factor 2801 by the electronic device may occupy a relatively larger portion, and the factor 2802 by the user may occupy a relatively smaller portion. Meanwhile, when the response level is relatively low, the factor 2811 by the electronic device may occupy a relatively smaller portion, and the factor 2812 by the user may occupy a relatively larger portion. This may mean that when the response level is relatively low, the electronic device 101 need obtain relatively more information from the user in order to determine and perform an operation.

Figure 29:
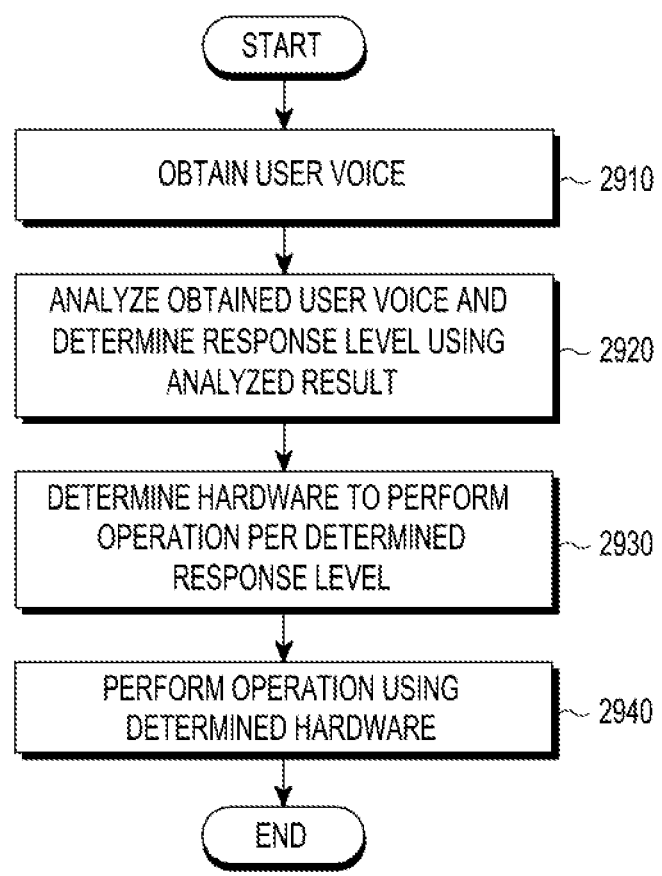
FIG. 29 is a flowchart illustrating a method for controlling an electronic device according to an embodiment of the present disclosure.
Figure 30A:
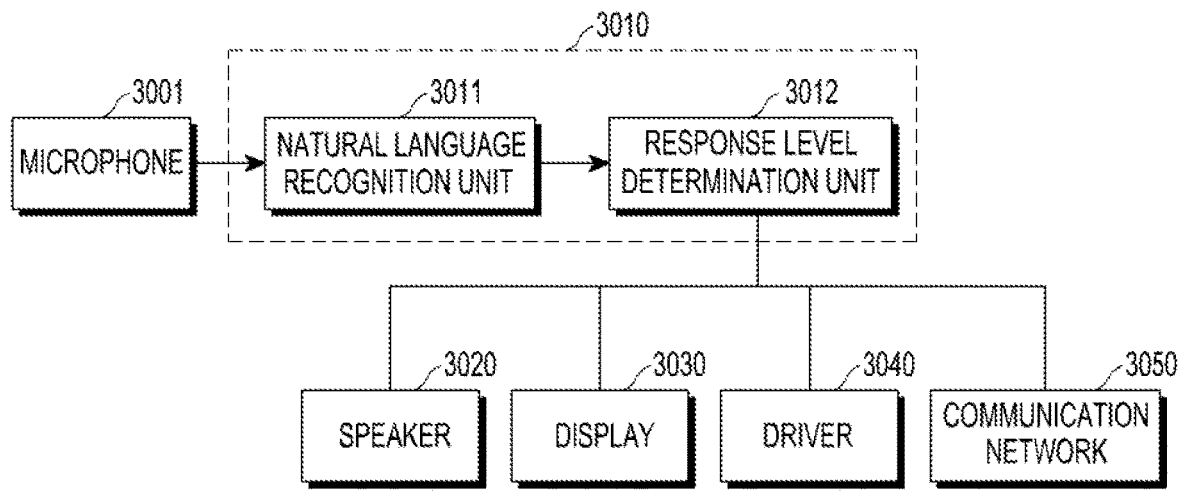
FIGS. 30A to 30C are concept views illustrating an example of selecting hardware according to various embodiments of the present disclosure.
Figure 30B:
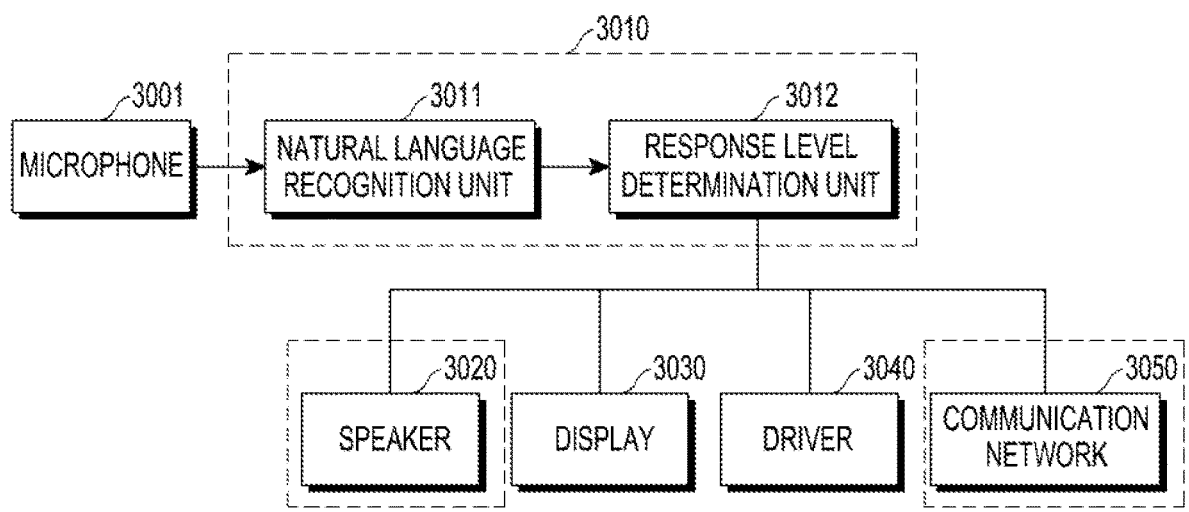
Figure 30C:
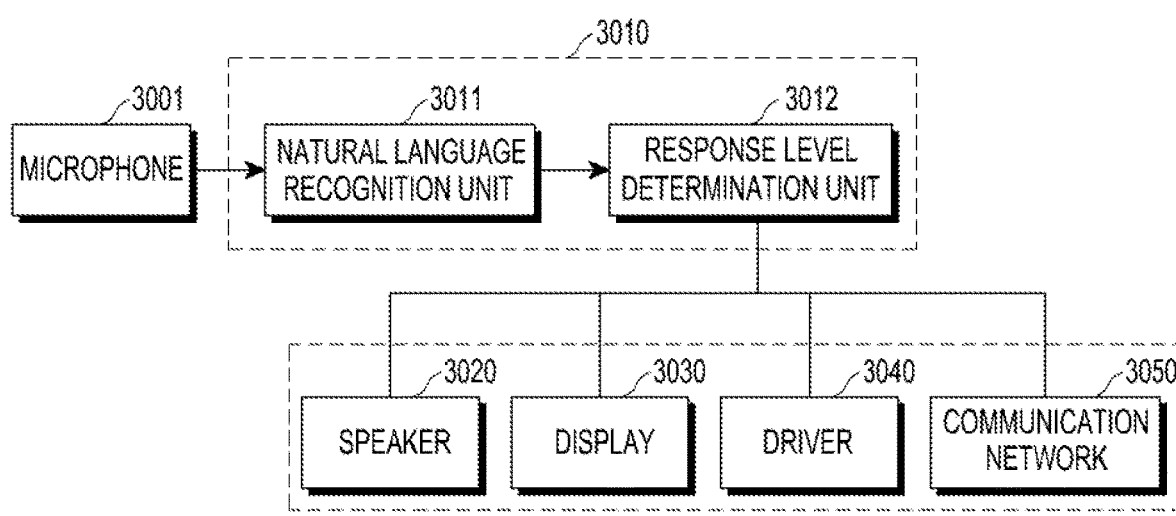

FIG. 29 is a flowchart illustrating a method for controlling an electronic device according to an embodiment of the present disclosure. The embodiment related to FIG. 29 is described in greater detail with reference to FIGS. 30A, 30B, and 30C. FIGS. 30A to 30C are concept views illustrating an example of selecting hardware according to an embodiment of the present disclosure.

Referring to FIG. 29, in operation 2910, the electronic device 101 may obtain the user voice. In operation 2920, the electronic device 101 may analyze the obtained user voice and determine the response level using the result of analysis. For example, as shown in FIG. 30A, the electronic device 101 may obtain a user voice through a microphone 3001. A natural language recognition unit 3011 and response level determination unit 3012 of a processor 3010 may recognize the user voice in natural language and determine a response level.

In operation 2930, the electronic device 101 may determine hardware to perform an operation for each determined response level. For example, when the response level of the user voice is the first response level as shown in FIG. 30B, the electronic device 101 may determine that a speaker 3020 and communication network 3050 are hardware for use. Further, when the response level of the user voice is the second response level as shown in FIG. 30C, the electronic device 101 may determine the speaker 3020, display 3030, driver 3040, and communication network 3050 as hardware for use. That is, according to an embodiment of the present disclosure, the electronic device 101 may determine different hardware per response level as hardware for use.

In operation 2940, the electronic device 101 may perform an operation using the determined hardware.

Figure 31:
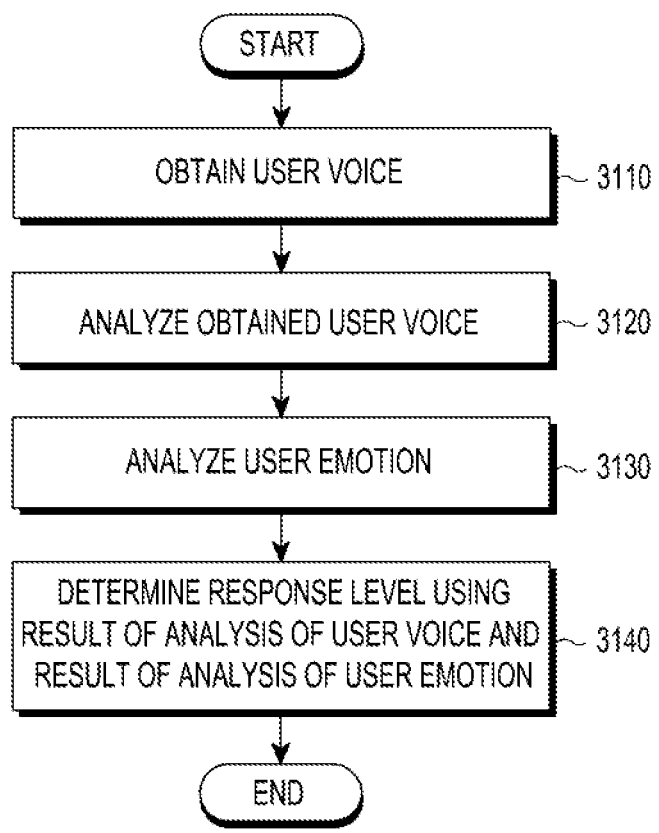
FIG. 31 is a flowchart illustrating a method for controlling an electronic device according to an embodiment of the present disclosure.
Figure 32:
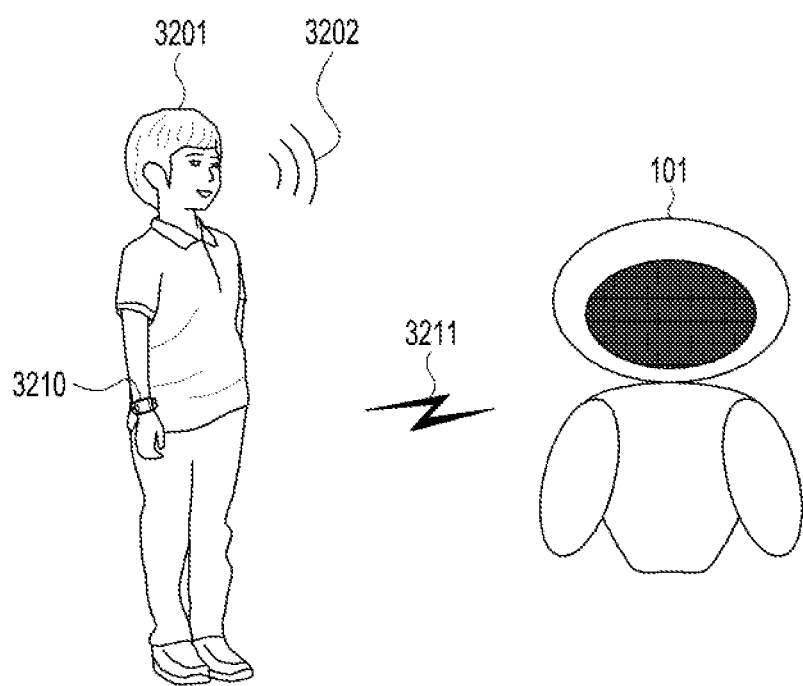
FIG. 32 is a concept view illustrating an operation of an electronic device according to an embodiment of the present disclosure.

FIG. 31 is a flowchart illustrating a method for controlling an electronic device according to an embodiment of the present disclosure. The embodiment related to FIG. 31 is described in greater detail with reference to FIG. 32. FIG. 32 is a concept view illustrating an operation of an electronic device according to an embodiment of the present disclosure.

Referring to FIG. 31, in operation 3110, the electronic device 101 may obtain the user voice. In operation 3120, the electronic device 101 may analyze the obtained user voice.

In operation 3130, the electronic device 101 may analyze the user's emotion. According to an embodiment of the present disclosure, the electronic device 101 may analyze the user's emotion from the result of analysis of the user voice. For example, the electronic device 101 may previously store information on the characteristic of voice that varies depending on the user's emotional status. The information on the voice characteristic may include various information, such as waveform or frequency of voice, pause, or keywords. The electronic device 101 may compare the obtained voice characteristic of the user voice with a voice characteristic stored per emotion and may analyze the user's emotional status based on the result of comparison.

In operation 3140, the electronic device 101 may determine a response level using the result of analysis of the user voice and the result of analysis of the user's emotion. For example, the electronic device 101 may obtain the user voice "What is on the TV." The electronic device 101 may extract the keyword "TV" by analyzing the user voice. For example, the electronic device 101 may determine that the user's emotion is boring by analyzing the user voice. When the user's emotion being boring is detected along with the identification information on the electronic device, the electronic device 101 may be previously configured to classify the user voice as the first response level. The electronic device 101 may immediately send a control signal for turning on the TV to the TV corresponding to the user voice having the first response level. Meanwhile, the electronic device 101 may determine that the user's emotion is happiness by analyzing the user voice. When the user's emotion being happiness is detected along with the identification information on the electronic device, the electronic device 101 may be previously configured to classify the user voice as the second response level. The electronic device 101 may provide a feedback inquiring whether to turn on the TV corresponding to the user voice with the second response level, and when the user's confirmation is detected responsive to the feedback, it may then send a turn on control signal to the TV. That is, as described above, the electronic device 101 may assign a different response level per user emotion even for the same user voice.

Further, the electronic device 101 may determine an operation corresponding to the user voice using the result of analysis of the user's emotion. For example, when the user's emotion is boring, the electronic device 101 may determine that "Transmit a control signal for selecting the show channel after turning on the TV to the TV" as an operation or operation candidate. When the user's emotion is happiness, the electronic device 101 may determine that "Transmit a control signal for selecting the sports channel after turning on the TV to the TV" as an operation or operation candidate. That is, the electronic device 101 may perform a different operation per user emotion even for the same user voice.

According to an embodiment of the present disclosure, as shown in FIG. 32, the electronic device 101 may determine the user's emotion based on information 3211 transmitted from another electronic device 3210 (e.g., a smart watch/band). That is, the electronic device 101 may analyze the user voice 3202 produced from the user 3201, and independently from the same, may determine the user's emotion based on information 3211 transmitted from the other electronic device 3210. The other electronic device 3210 may obtain bio information and obtain the user's emotion using the same. The other electronic device 3210 may obtain bio information. The bio information may include at least one of a brain wave signal, electroencephalogram (EEG) signal, electrocardiogram (ECG) signal, electromyograph (EMG) signal, electrooculogram (EOG) signal, blood pressure, and body temperature, and is not limited as long as it is information that may indicate the body condition. The electronic device 101 may receive bio information from the other electronic device 3210 or receive the user's emotion analyzed using the bio information.

Figure 33:
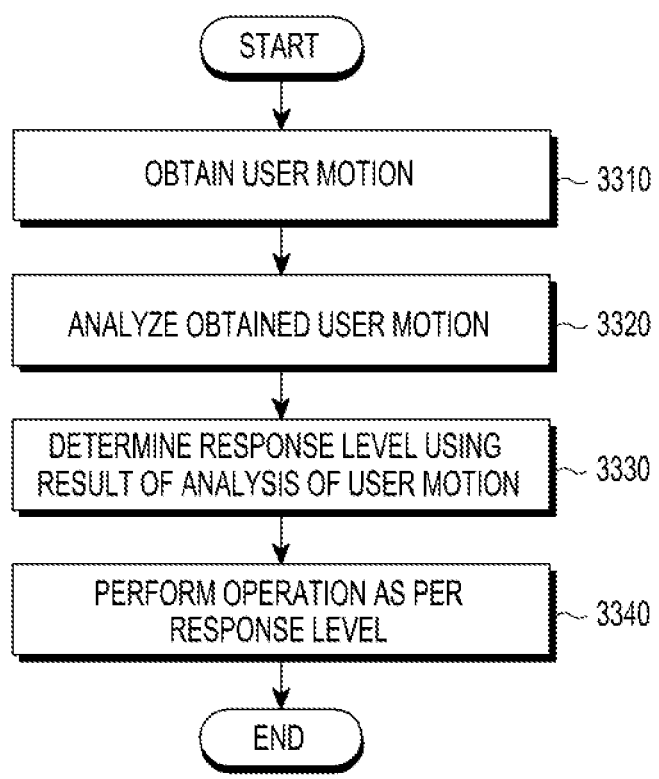
FIG. 33 is a flowchart illustrating a method for controlling an electronic device according to an embodiment of the present disclosure.
Figure 34A:
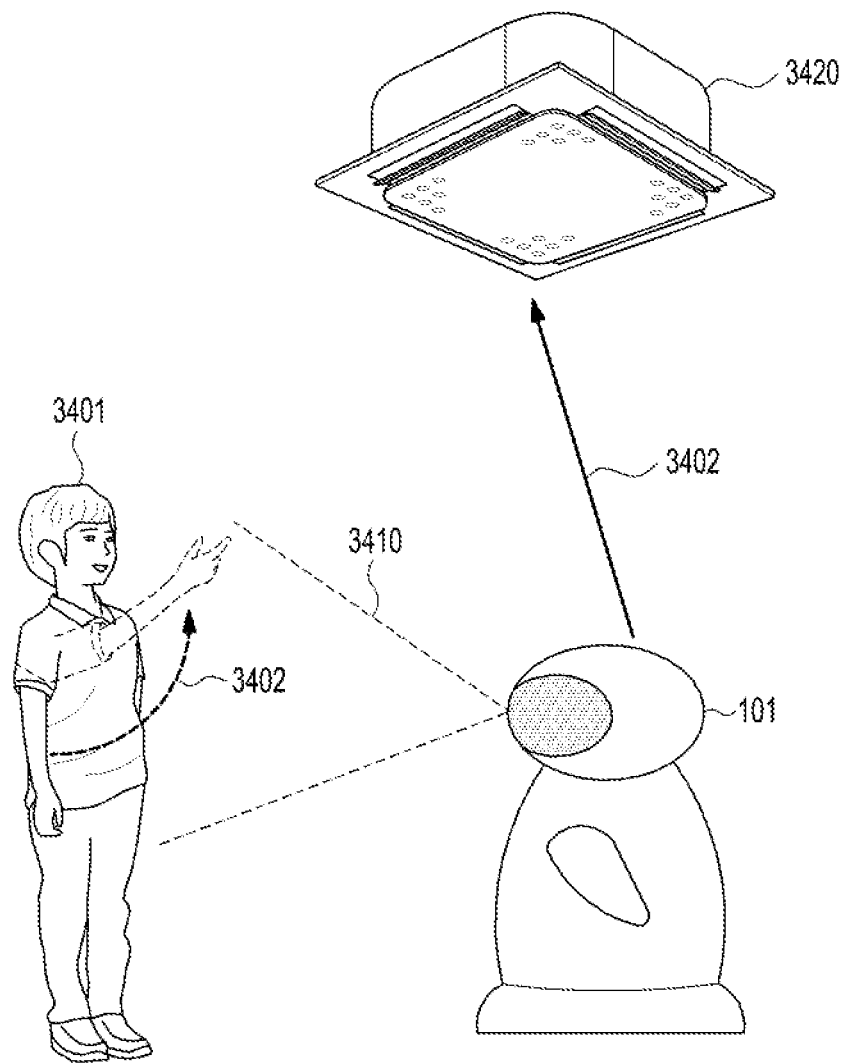
FIGS. 34A to 34C are concept views illustrating operations of an electronic device according to various embodiments of the present disclosure.
Figure 34B:
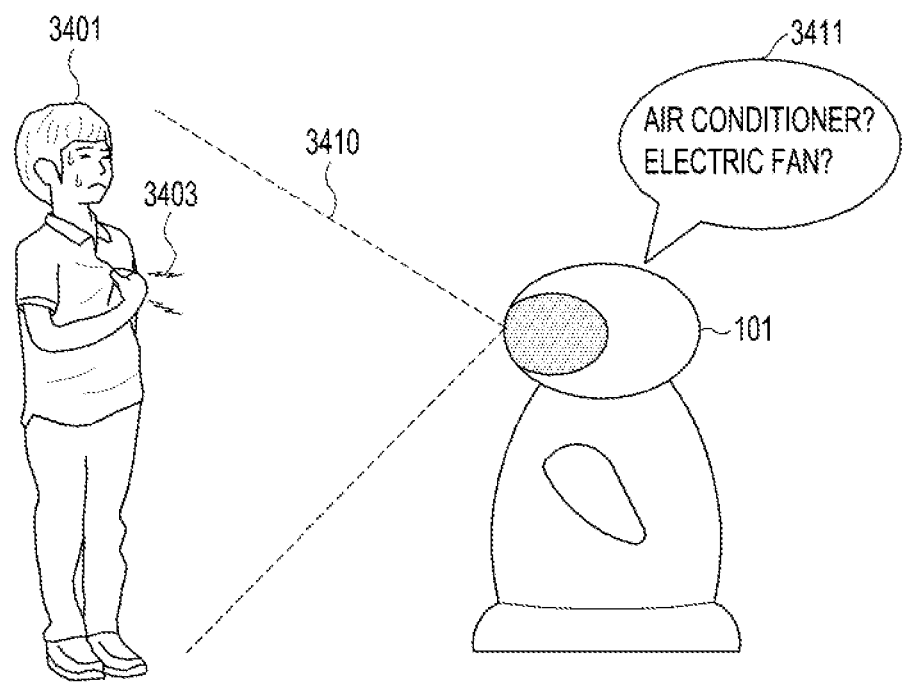
Figure 34C:
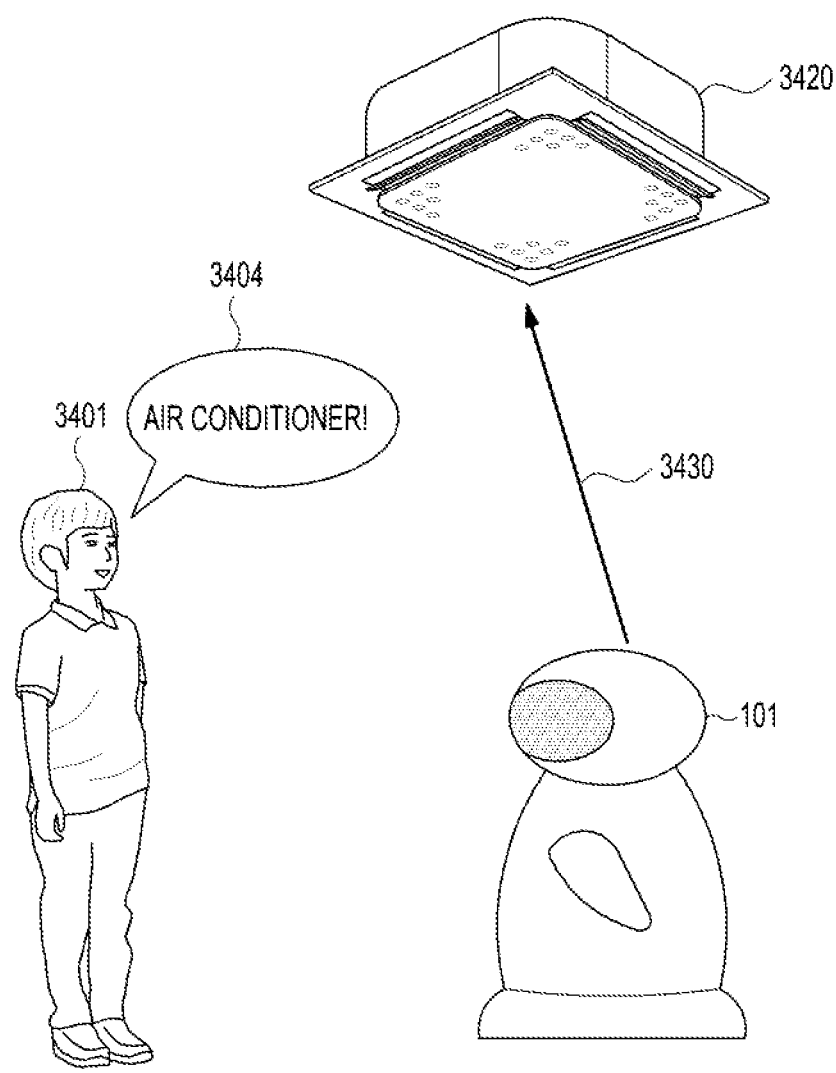

FIG. 33 is a flowchart illustrating a method for controlling an electronic device according to an embodiment of the present disclosure. The embodiment related to FIG. 33 is described in greater detail with reference to FIGS. 34A, 34B, and 34C. FIGS. 34A, and 34C are concept views illustrating operations of an electronic device according to embodiments of the present disclosure.

Referring to FIG. 33, in operation 3310, the electronic device 101 may obtain a user motion. According to an embodiment of the present disclosure, the electronic device 101 may include a camera, depth camera, or user motion sensor capable of obtaining the user motion. The electronic device 101 may obtain the user motion using a result of analysis of a two-dimensional (2D) image captured by the camera, a three-dimensional (3D) image captured by the depth camera, or an output from the user motion sensor.

In operation 3320, the electronic device 101 may analyze the obtained user motion. According to an embodiment of the present disclosure, the electronic device 101 may associate the user motion with an operation of the electronic device 101 and store them. For example, upon obtaining the user motion of finger pointing, the electronic device 101 may be configured to perform the operation of transmitting a signal for operating an electronic device positioned in the direction pointed by the finger. For example, as shown in FIG. 34A, the electronic device 101 may image-capture (3410) the user 3401 and obtain a user motion. For example, the electronic device 101 may obtain the motion 3402 of the user 3401 raising his right hand and pointing at the air conditioner 3420, as illustrated in FIG. 34A. The electronic device 101 may determine that the electronic device positioned in the direction pointed by the user motion 3402 is the air conditioner 3420. The electronic device 101 may previously store an arrangement environment of electronic devices in the network and may identify an electronic device corresponding to the user motion 3402 using the user's location and user motion. The electronic device 101 may send a turn on signal 3430 to the air conditioner 3420.

In operation 3330, the electronic device 101 may determine the response level using the result of the analysis of the user motion. In operation 3340, the electronic device 101 may perform an operation as per the response level. The electronic device 101 may obtain a user motion unclear for its intention. The electronic device 101 may assign a relatively high response level, e.g., the first response level, to a user motion relatively clear for its intention, i.e., a user motion whose similarity with a pre-stored user motion exceeds a threshold. In such case, the electronic device 101 may immediately perform an operation corresponding to the user motion of the first response level. The electronic device 101 may assign a relatively low response level, e.g., the second response level, to a user motion relatively unclear for its intention, i.e., a user motion whose similarity with a pre-stored user motion is not more than the threshold. In such case, the electronic device 101 may delay the operation corresponding to the user motion of the second response level, and upon detecting an additional event, it may perform the delayed operation. According to an embodiment of the present disclosure, the electronic device 101 may display operation candidates, and upon detecting the user's confirmation, it may perform a selected operation.

According to an embodiment of the present disclosure, the electronic device 101 may previously store association information between the user motion and the operation of the electronic device and may later expand or update the association information through learning. For example, the electronic device 101 may learn the history that the air conditioner or electric fan operates after the user 3401 makes such a motion as to hold and shake the clothes around his neck (e.g., indicating that the user 3401 is sweating) as shown in FIG. 34B, and it may accordingly store the association information between the motion 3403 of holding and shaking the clothes around the neck and the operation of the air conditioner or electric fan. Meanwhile, the electronic device 101 may store information indicating that it is unclear which one of the air conditioner and the electric fan the motion 3403 of holding and shaking the clothes around the neck indicates. Thus, upon obtaining the motion 3403 of holding and shaking the clothes around the neck, the electronic device 101 may determine that the response level of the motion 3403 of holding and shaking the clothes around the neck is the second response level. Further, the electronic device 101 may determine that transmitting a turn on signal to the air conditioner or electric fan is an operation candidate corresponding to the motion 3403 of holding and shaking the clothes around the neck. As shown in FIG. 34B, the electronic device 101 may output (3411) operation candidates. In FIG. 34C, the electronic device 101 may obtain a user feedback 3404 for selecting one of the operation candidates and may perform the selected operation. The electronic device 101 may send a turn on signal 3430 to the air conditioner 3420.

As described above, according to an embodiment of the present disclosure, the electronic device 101 may determine a response level for a command by a user motion as well as a command by a user voice and may perform an operation per response level. The electronic device 101 may immediately perform an operation corresponding to a user motion having the first response level, and the electronic device 101 may perform an operation corresponding to a user motion having the second response level after detecting an additional event.

Figure 35:
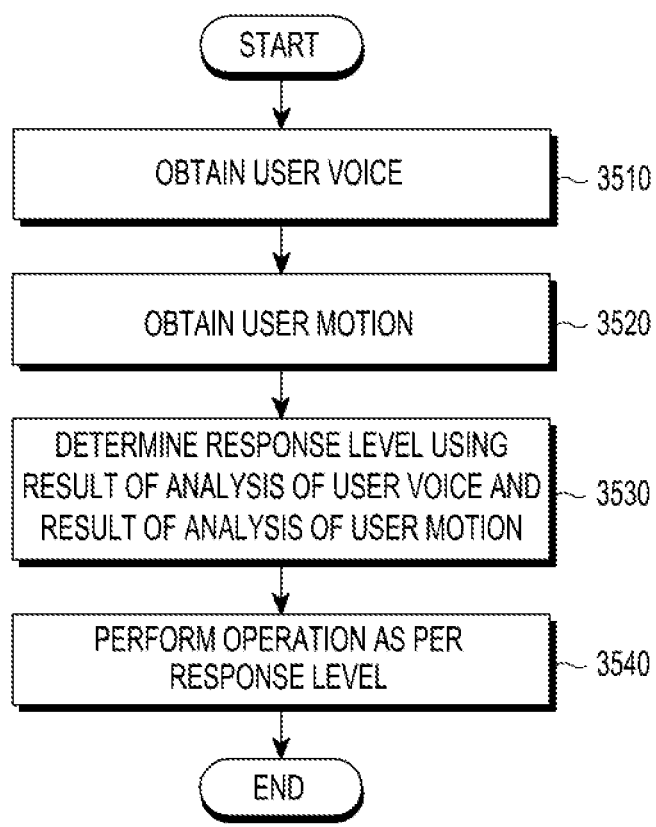
FIG. 35 is a flowchart illustrating a method for controlling an electronic device according to an embodiment of the present disclosure.
Figure 36A:
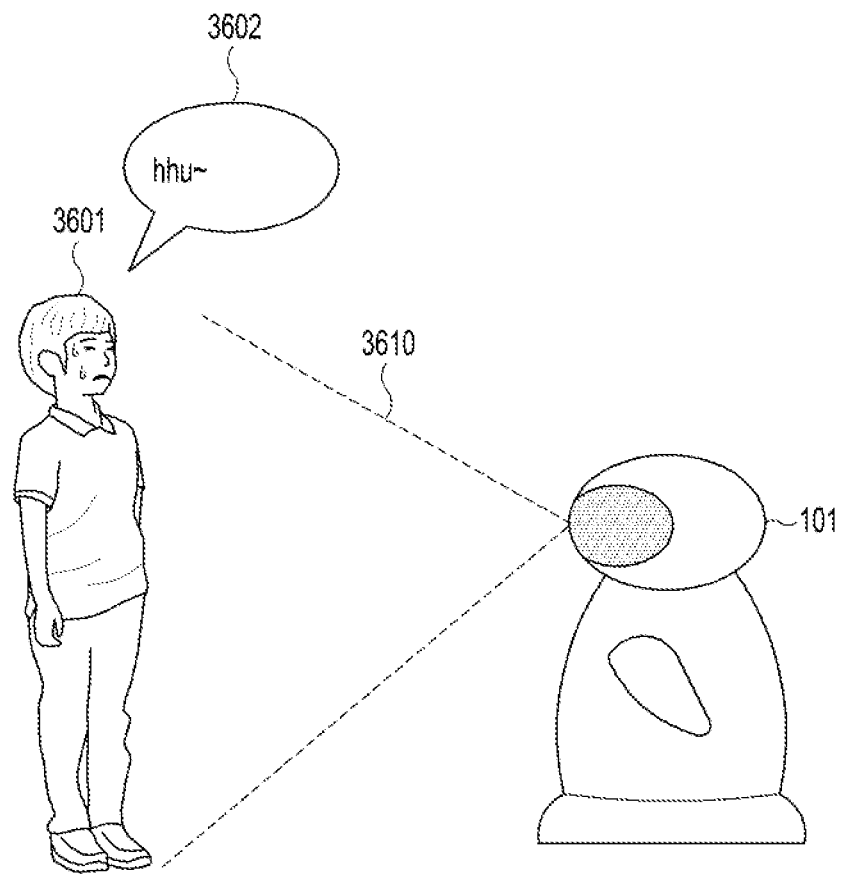
FIGS. 36A and 36B are concept views illustrating operations of an electronic device according to various embodiments of the present disclosure.
Figure 36B:
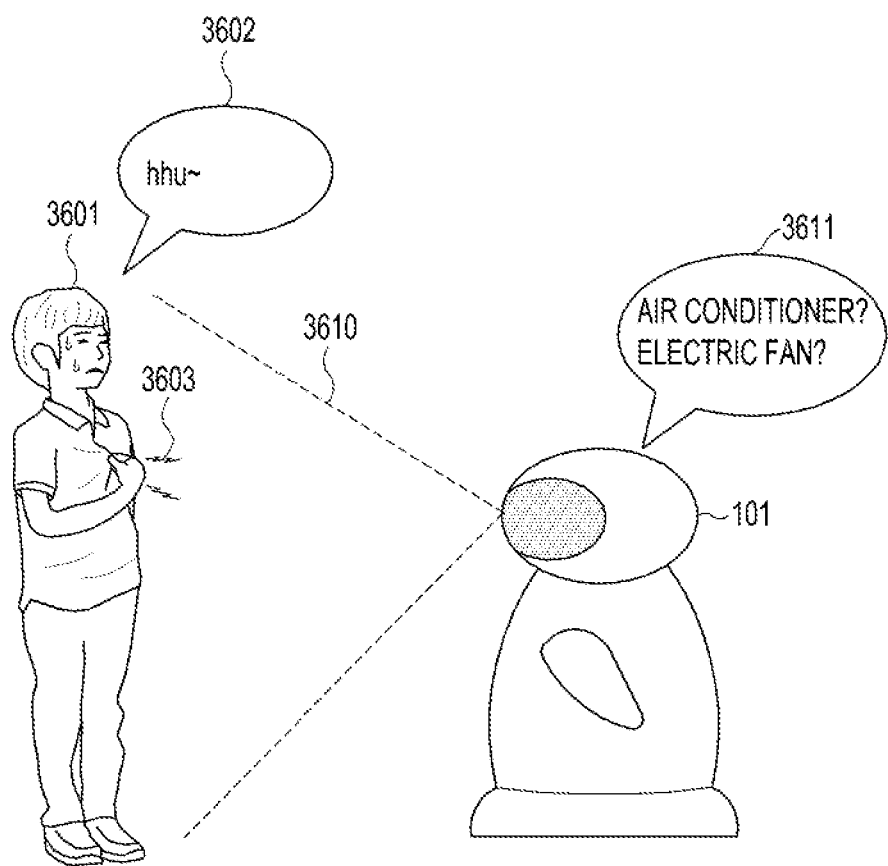

FIG. 35 is a flowchart illustrating a method for controlling an electronic device according to an embodiment of the present disclosure. The embodiment of FIG. 35 is described in greater detail with reference to FIGS. 36A and 36B. FIGS. 36A and 36B are concept views illustrating operations of an electronic device according to embodiments of the present disclosure.

Referring to FIG. 35, in operation 3510, the electronic device 101 may obtain the user voice. In operation 3520, the electronic device 101 may obtain a user motion. In operation 3530, the electronic device 101 may determine a response level using the result of analysis of the user voice and the result of analysis of the user motion. In operation 3540, the electronic device 101 may perform an operation as per the response level. That is, the electronic device 101 may determine a response level using both the user voice and the user motion.

FIGS. 36A and 36B are concept views illustrating operations of an electronic device according to various embodiments of the present disclosure.

Referring to FIG. 36A, the electronic device 101 may obtain a user voice 3602 produced from the user 3601. The electronic device 101 may not obtain a user motion. The electronic device 101 may obtain the user voice 3602

"hhu~" and determine that the response level of the user voice 3602 is the third response level.

Referring to FIG. 36B, the electronic device 101 may obtain a user voice 3602 produced from the user 3601. The electronic device 101 may obtain (3610) the motion 3603 of holding and shaking the clothes around the neck. The electronic device 101 may set up the second response level for both the user voice 3602 and the user motion 3603 and may output (3611) operation candidates corresponding thereto. The electronic device 101 may associate the user voice 3602 with the operation candidates and store them through learning, and even when detecting the user voice 3602, such as "hhu~," alone as shown in FIG. 36A, it may set up the second response level.

Figure 37:
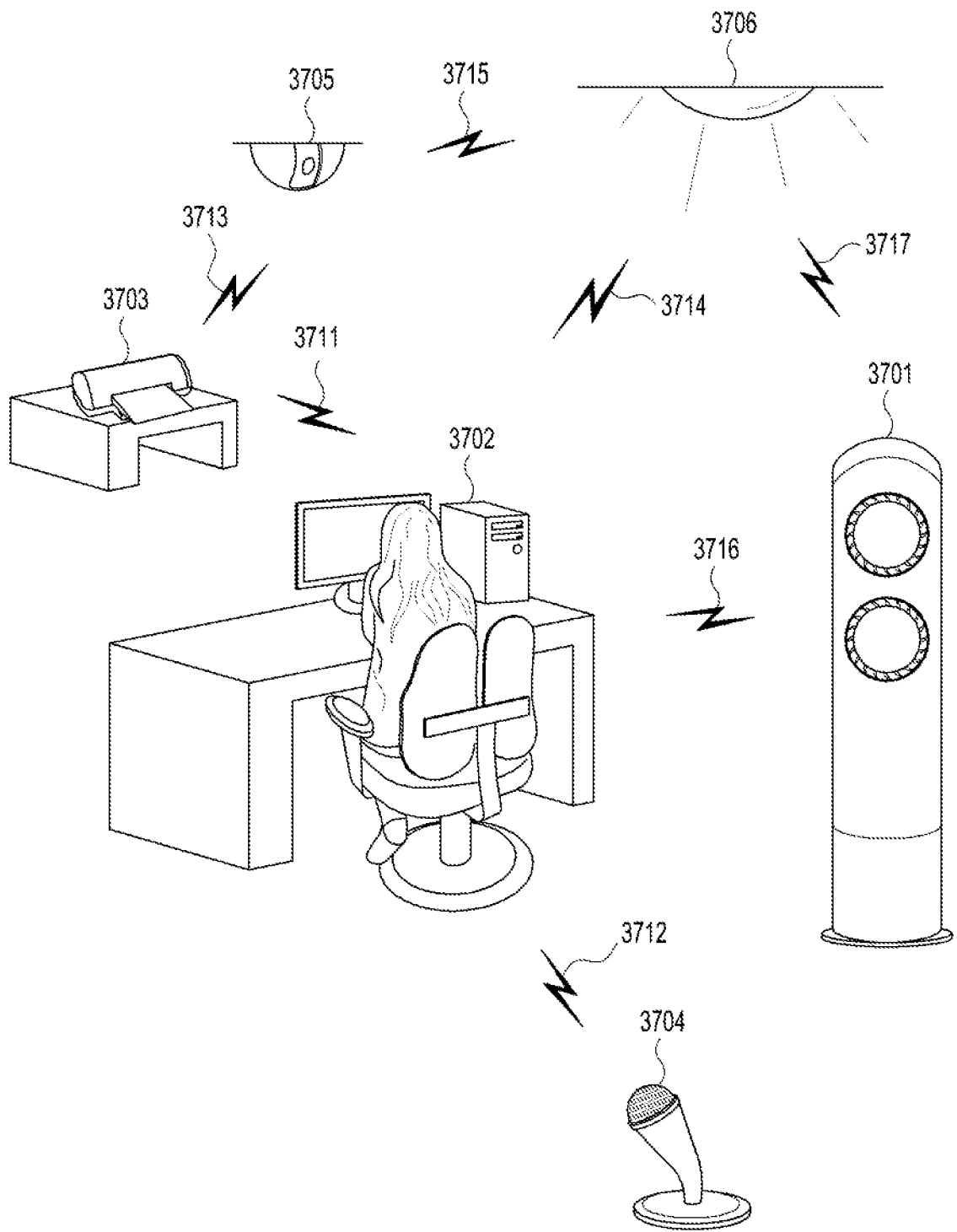
FIG. 37 is a concept view illustrating an operation environment of an electronic device according to an embodiment of the present disclosure.

FIG. 37 is a concept view illustrating an operation environment of an electronic device according to an embodiment of the present disclosure.

Referring to FIG. 37, according to an embodiment of the present disclosure, electronic devices 3701, 3702, 3703, 3704, 3705, and 3706 may be electronic devices configuring an office environment. Further, the electronic devices 3701, 3702, 3703, 3704, 3705, and 3706 may mutually communicate information 3711, 3712, 3713, 3714, 3715, 3716, and 3717. The electronic devices 3701, 3702, 3703, 3704, 3705, and 3706 may be implemented as entities configuring an IoT environment, and they may transmit information 3711, 3712, 3713, 3714, 3715, 3716, and 3717 periodically or when a particular event occurs. The electronic devices 3701, 3702, 3703, 3704, 3705, and 3706 may mutually communicate the information 3711, 3712, 3713, 3714, 3715, 3716, and 3717 based on various communication schemes that are not limited to particular ones.

Figure 38:
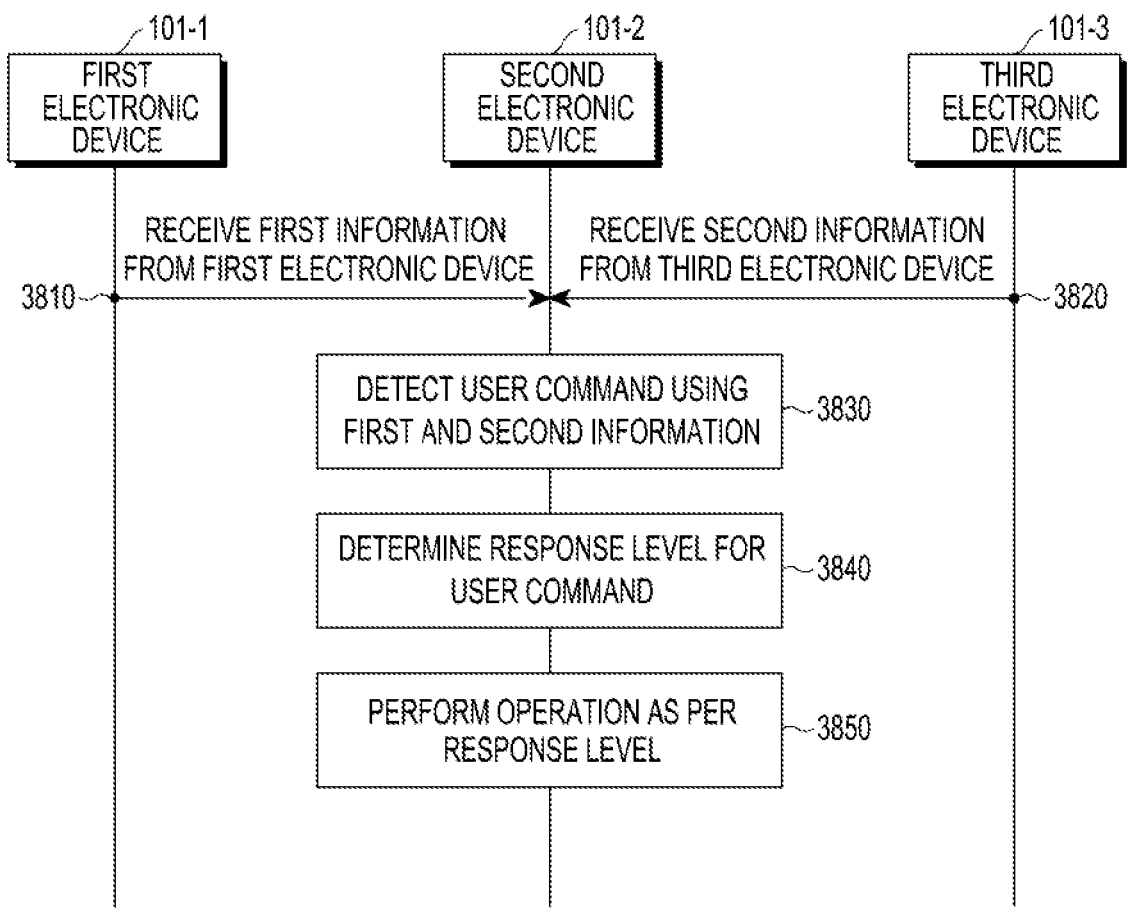
FIG. 38 is a flowchart illustrating an operation of an electronic device under an internet of things (IoT) environment according to an embodiment of the present disclosure.

FIG. 38 is a flowchart illustrating an operation of an electronic device under an IoT environment according to an embodiment of the present disclosure.

Referring to FIG. 38, in operation 3810, a second electronic device 101-2 may receive first information from a first electronic device 101-1. In operation 3820, the second electronic device 101-2 may receive second information from a third electronic device 101-3.

In operation 3830, the second electronic device 101-2 may detect a user command using the first information and the second information. For example, in the office environment as shown in FIG. 37, the second electronic device 101-2 may be an air conditioner, the first electronic device 101-1 may be a microphone, and the third electronic device 101-3 may be a camera. In such case, the second electronic device 101-2 may receive a user voice from the first electronic device 101-1 and a user motion from the third electronic device 101-3. The second electronic device 101-2 may determine the user command using the user voice and the user motion.

In operation 3840, the second electronic device 101-2 may determine a response level for the user command. In operation 3850, the second electronic device 101-2 may perform an operation as per the response level. As described above in connection with FIGS. 34A to 34C, the second electronic device 101-2 may receive the user voice "hhu~" from the first electronic device 101-1 and the user motion indicating that the user remains at rest from the third electronic device 101-3. In such case, the second electronic device 101-2 may determine that the response level of the user command by the user voice and user motion is the third response level and disregard the user command. Alternatively, the second electronic device 101-2 may receive the user voice "huu~" from the first electronic device 101-1 and the user motion indicating that the user points at the second electronic device 101-2 from the third electronic device 101-3. In such case, the second electronic device 101-2 may determine that the response level of the user command by the user voice and user motion is the second response level and output operation candidates. For example, the second electronic device 101-2 may send the operation candidates to an electronic device determined to be positioned near the user, e.g., a desktop computer in the office environment as shown in FIG. 37. The electronic device determined to be positioned near the user may be determined by information gathered from an electronic device, such as a camera. When the user is determined to be positioned near the printer, the air conditioner may send the operation candidates to the printer, and the printer may print out the operation candidates. The desktop computer may display the received operation candidates and may receive selection of one of the operation candidates from the user. For example, the operation candidates may include turning on the air conditioner or turning off the light. When the user selects the operation of turning off the light, the desktop computer may send a light off signal to the light. As described above, under the IoT environment, the electronic device may obtain a user command by information gathered from various electronic devices and determine the response level of the obtained user command. Further, the electronic device may send a signal for controlling another electronic device rather than itself performing the operation corresponding to the user command. Further, the entity displaying the operation candidates may not be the electronic device having detected the user command and determined the response level but another electronic device, and the electronic device performing the selected operation may be a third electronic device, but neither the entity displaying the operation candidates nor the entity detecting the user command.

Figure 39:
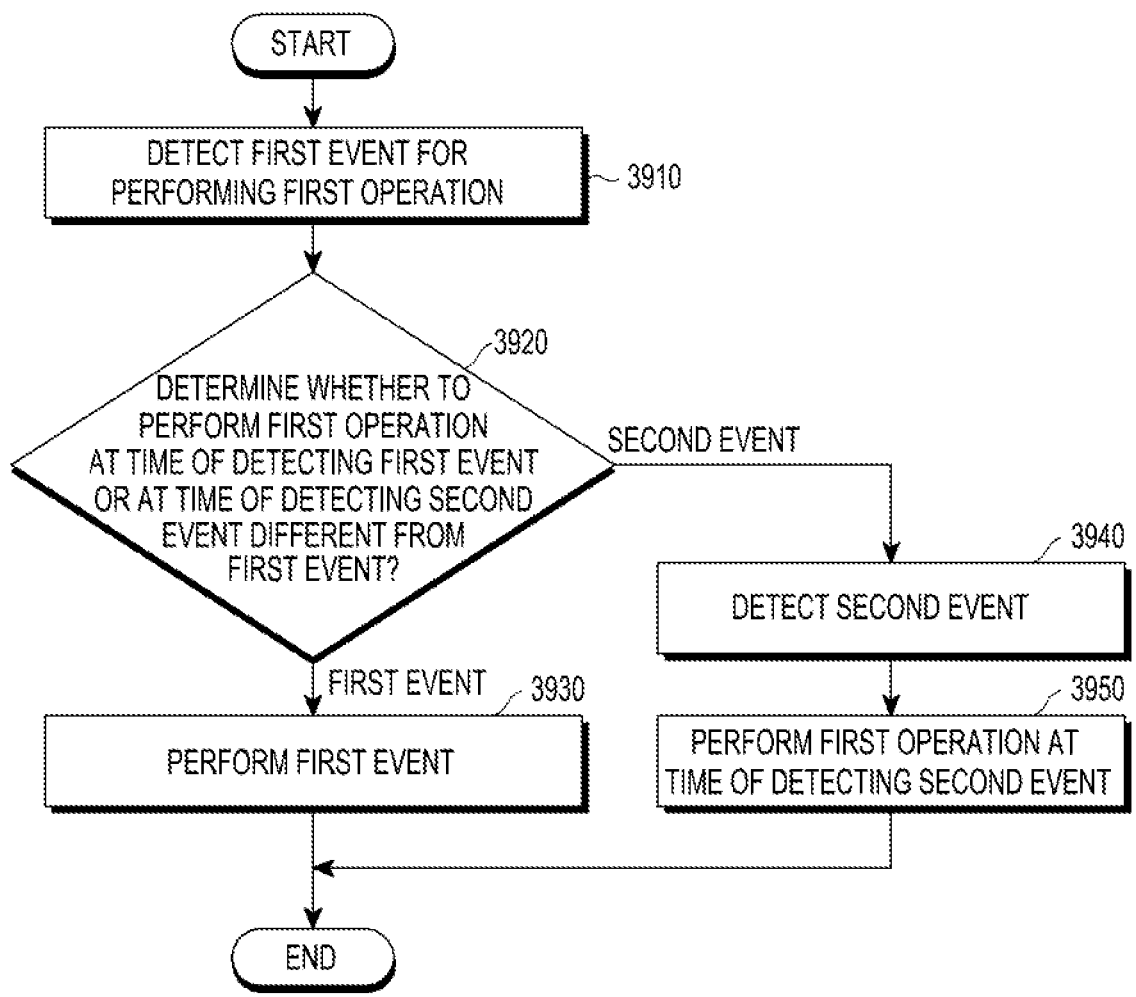
FIG. 39 is a flowchart illustrating a method for controlling an electronic device according to an embodiment of the present disclosure.

FIG. 39 is a flowchart illustrating a method for controlling an electronic device according to an embodiment of the present disclosure.

Referring to FIG. 39, in operation 3910, the electronic device 101 may detect a first event for performing a first operation. In operation 3920, the electronic device 101 may determine whether to perform the first operation at the time of detecting the first event or at the time of detecting a second event different from the first event. That is, according to an embodiment of the present disclosure, the electronic device 101 may immediately perform the first operation corresponding to the detection of the first event or may delay performing the first operation and perform the first operation when the second event is detected.

When the first operation is determined to be performed at the time of detection of the first event, the electronic device 101 may perform the first event in operation 3930. When the second operation is determined to be performed at the time of detection of the first event, the electronic device 101 may detect the second event in operation 3940 and perform the first operation at the time of detection of the second event in operation 3950.

Figure 40:
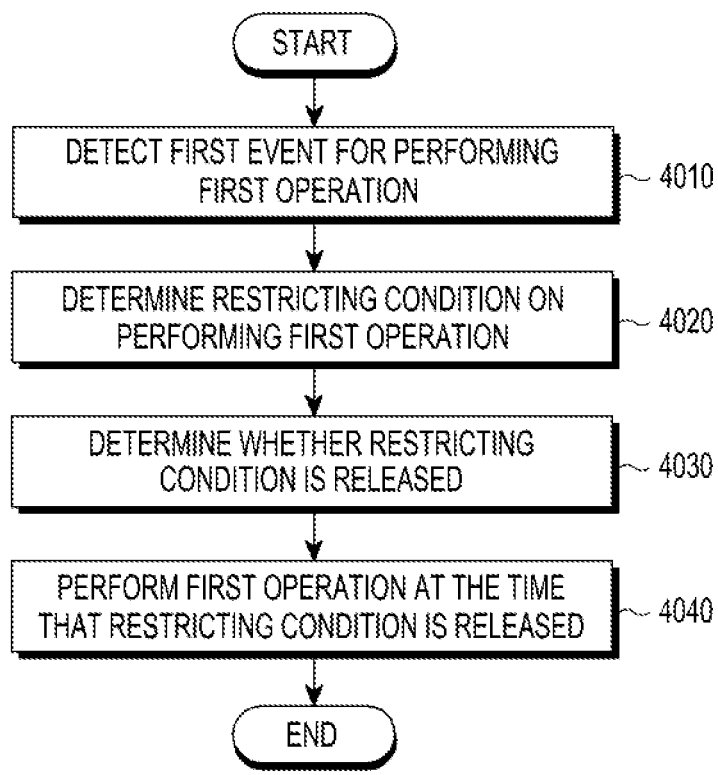
FIG. 40 is a flowchart illustrating a method for controlling an electronic device according to an embodiment of the present disclosure.
Figure 41A:
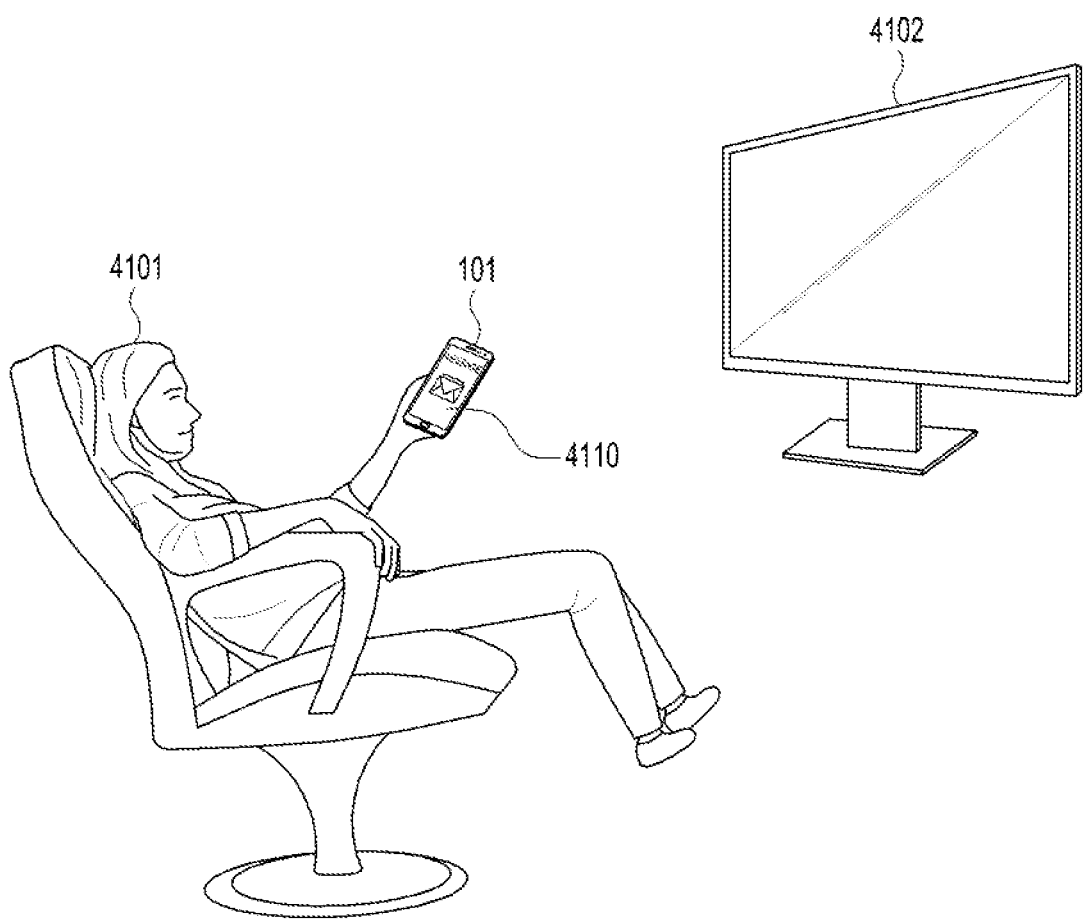
FIGS. 41A and 41B are concept views illustrating operations of an electronic device according to various embodiments of the present disclosure.
Figure 41B:
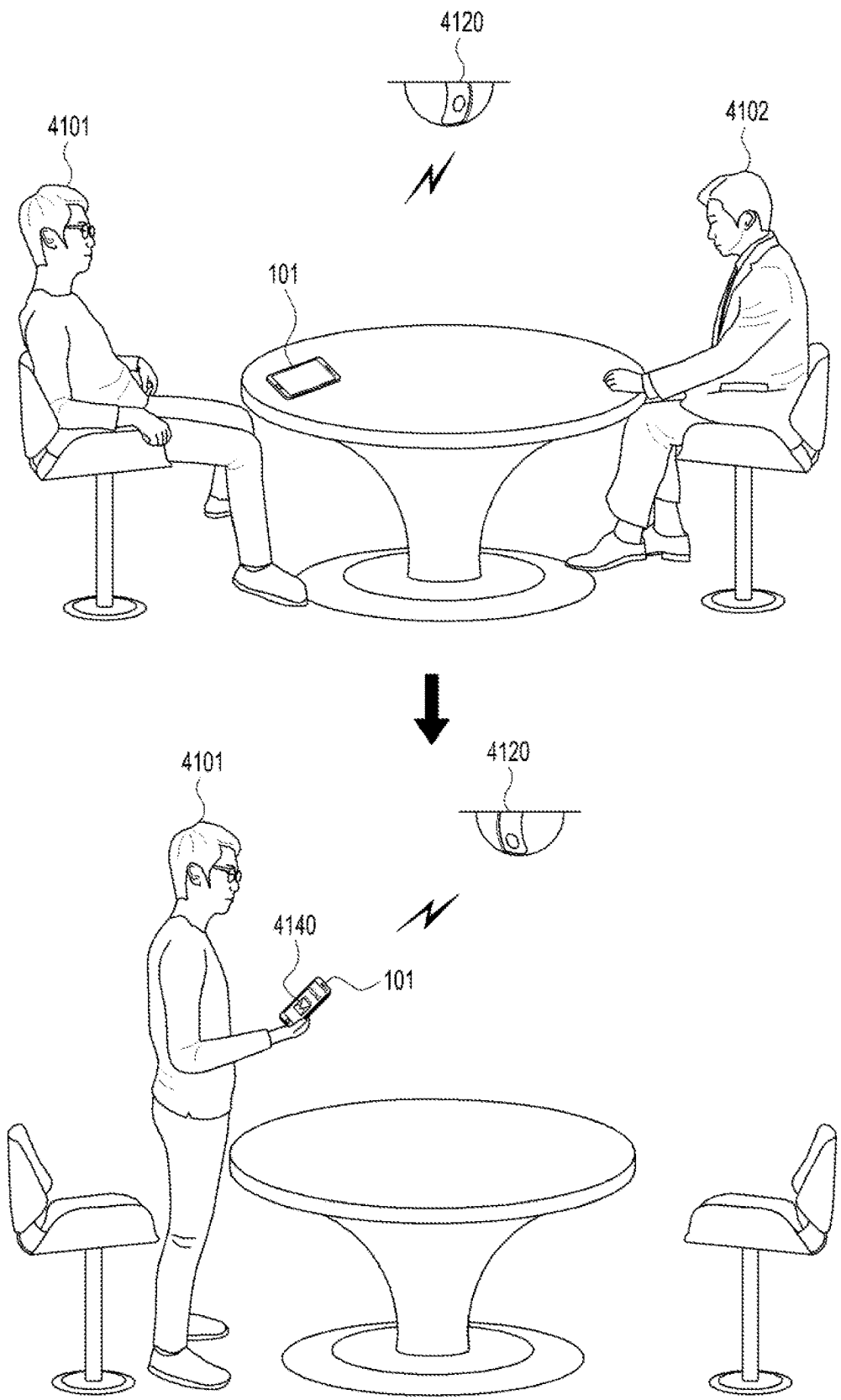

FIG. 40 is a flowchart illustrating a method for controlling an electronic device according to an embodiment of the present disclosure. The embodiment related to FIG. 40 is described in greater detail with reference to FIGS. 41A and 41B. FIGS. 41A and 41B are concept views illustrating operations of an electronic device according to various embodiments of the present disclosure.

Referring to FIG. 40, in operation 4010, the electronic device 101 may detect a first event for performing a first operation. For example, as shown in FIG. 41A, the electronic device 101 may detect a first event of reception of a text message. The electronic device 101 may be configured to provide an output 4110 indicating that the text message is received at the time of reception of the text message. That is, the first operation may be the indication of the reception of the text message.

In operation 4020, the electronic device 101 may determine a restricting condition for performing the first operation. For example, the electronic device 101 may set up a conference environment as the restricting condition for performing the indication of the reception of the text message which is the first operation.

In operation 4030, the electronic device 101 may determine whether the restricting condition is released. In operation 4040, the electronic device 101 may perform the first operation at the time that the restricting condition is released. That is, the electronic device 101 may delay performing the first operation while the restricting condition is met. For example, in FIG. 41A, the electronic device 101 may determine that the restricting condition is not met. The electronic device 101 may receive a signal indicating a turn-on status from the TV 4102, and it may correspondingly determine that it is not in the conference environment, thereby determining that the restricting condition is not met. In such case, the electronic device 101 may provide an output 4110 indicating the reception of the text message by performing the first operation at the time of detection of the first event.

Referring to FIG. 41B, the electronic device 101 may determine that the restricting condition is met. For example, the electronic device 101 may determine that the schedule corresponding to the current time is a conference session by comparing the current time with its embedded scheduling application and may accordingly determine that the restricting condition for the conference environment is met. Or, the electronic device 101 may determine that the current environment is the conference environment using information received from an external electronic device, such as the camera 4120. For example, the electronic device 101 may previously store an environment determination algorithm determining that the environment where a party 4102 other than the user 4101 attends and talks in the same place for a predetermined time or more is the conference environment and may determine the conference environment based on the result of applying the algorithm.

The electronic device 101 may delay the first operation, i.e., outputting the indication of the text message while the restricting condition is met. The electronic device 101 may perform the first operation when the restricting condition is determined to be released. For example, the electronic device 101 may determine that the conference environment is terminated using data from the scheduling application or using data from the external electronic device 1420. The electronic device 101 may provide an output 4140 of the indication of the text message.

That is, according to an embodiment of the present disclosure, the electronic device may perform an operation by an event immediately or upon detecting an additional event, e.g., the release of the restricting condition even when it processes the operation by the event, but not by the user command.

Figure 42:
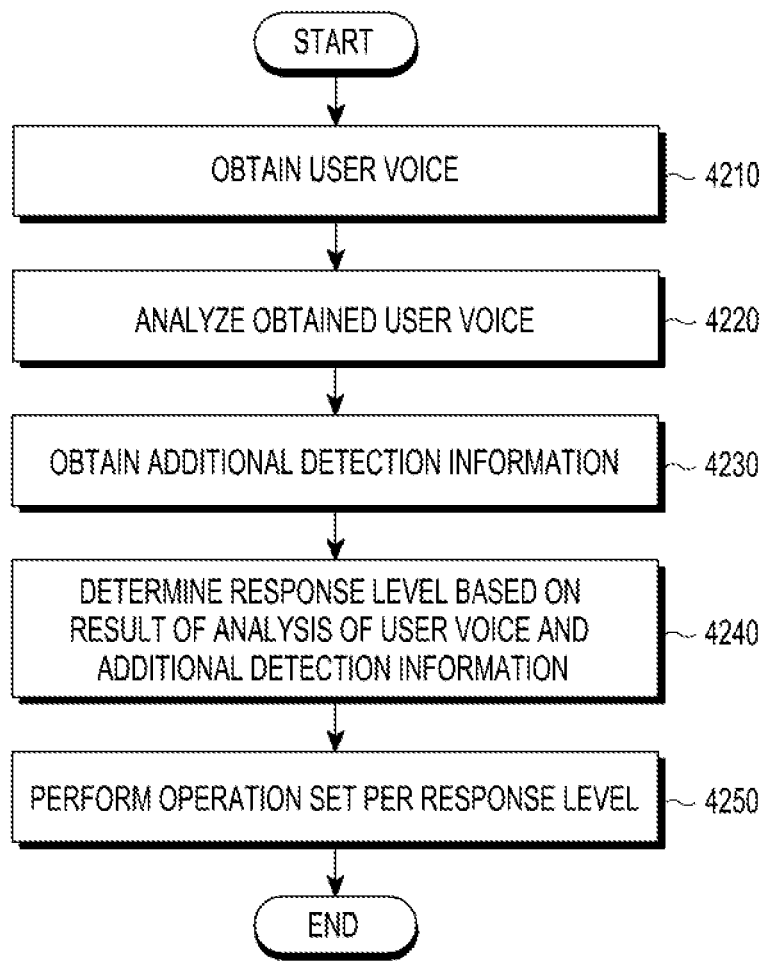
FIG. 42 is a flowchart illustrating a method for controlling an electronic device according to an embodiment of the present disclosure.

FIG. 42 is a flowchart illustrating a method for controlling an electronic device according to an embodiment of the present disclosure.

Referring to FIG. 42, in operation 4210, the electronic device 101 may obtain the user voice. In operation 4220, the electronic device 101 may analyze the obtained user voice. In operation 4230, the electronic device 101 may obtain additional detection information. For example, the electronic device 101 may obtain an image obtained by capturing an outside as the additional detection information. Or, the electronic device 101 may obtain an external temperature as the additional detection information. The electronic device 101 may obtain the additional detection information from its containing hardware or additional detection information transmitted from another electronic device.

In operation 4240, the electronic device 101 may determine a response level based on the result of analysis of the user voice and the additional detection information. In operation 4250, the electronic device 101 may perform an operation according to response level. The above-described embodiment is described in greater detail with reference to FIGS. 43A, 43B, 44B, and 44B.

Figure 43A:
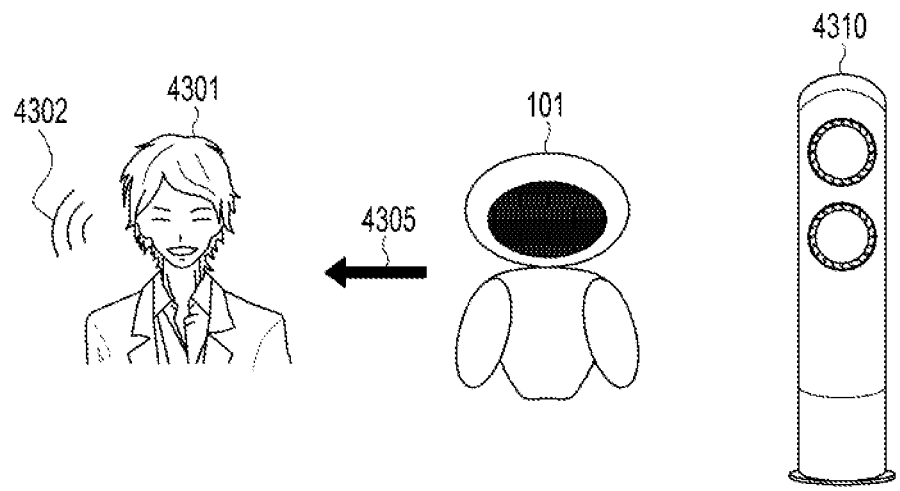
FIGS. 43A and 43B are concept views illustrating operations of an electronic device according to various embodiments of the present disclosure.
Figure 43B:
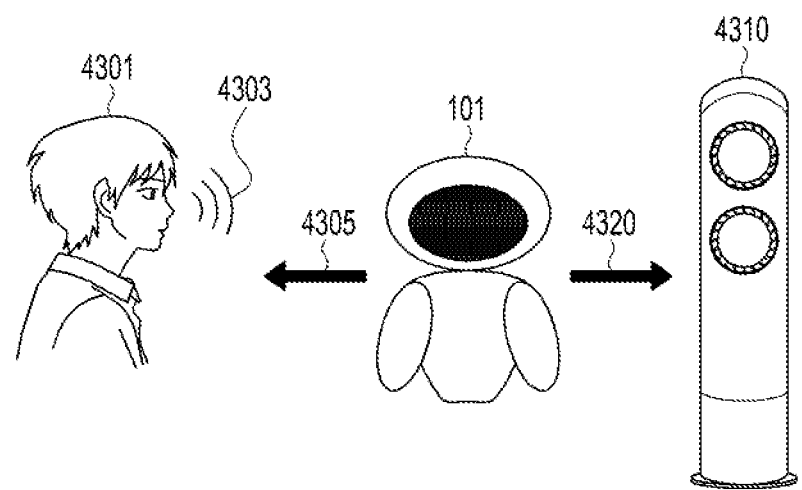

FIGS. 43A and 43B are concept views illustrating operations of an electronic device according to various embodiments of the present disclosure.

Referring to FIG. 43A, the electronic device 101 may obtain a user voice 4302 from the user 4301. The electronic device 101 may obtain the additional detection information obtained by capturing the user 4301. For example, the electronic device 101 may obtain the information indicating that the user 4301 does not look at the electronic device 101 from the image-captured result 4305. The electronic device 101 may obtain "It's hot" as the user voice 4302. The electronic device 101 may determine that the response level is the second response level through the analysis of the user voice "It's hot." Further, the electronic device 101 may maintain the response level as the second response level using the information indicating that the user 4301 does not look at the electronic device 101. For example, the electronic device 101 may set the additional detection information indicating that the user 4301 looks at the electronic device 101 as a condition for increasing the response level.

Referring to FIG. 43B, the electronic device 101 may obtain a user voice 4303 from the user 4301. The electronic device 101 may obtain the additional detection information obtained by capturing the user 4301. For example, the electronic device 101 may obtain the information indicating that the user 4301 looks at the electronic device 101 from the image-captured result 4305. The electronic device 101 may obtain "It's hot" as the user voice 4303. The electronic device 101 may determine that the response level is the second response level through the analysis of the user voice "It's hot." Further, the electronic device 101 may adjust the response level to the first response level using the information indicating that the user 4301 looks at the electronic device 101. For example, the electronic device 101 may set the additional detection information indicating that the user 4301 looks at the electronic device 101 as a condition for increasing the response level and may adjust the response level corresponding to the satisfaction of the set condition. The electronic device 101 may transmit a driving signal 4320 to the air conditioner 4310 based on the first response level.

As described above, the electronic device 101 may determine that the user voice has different response levels depending on different pieces of additional detection information even for the same user voice.

Figure 44A:
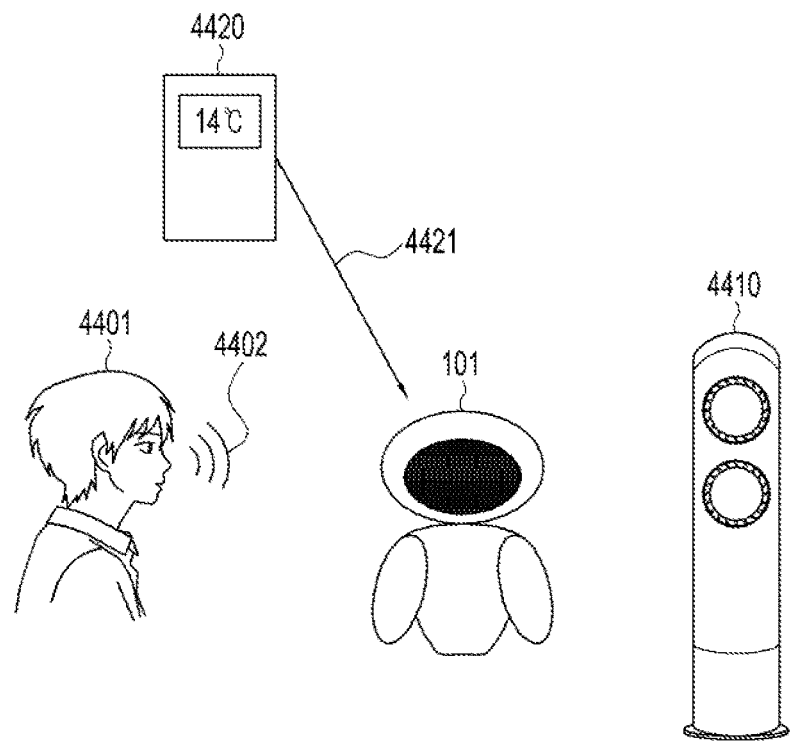
FIGS. 44A and 44B are concept views illustrating operations of an electronic device according to various embodiments of the present disclosure.
Figure 44B:
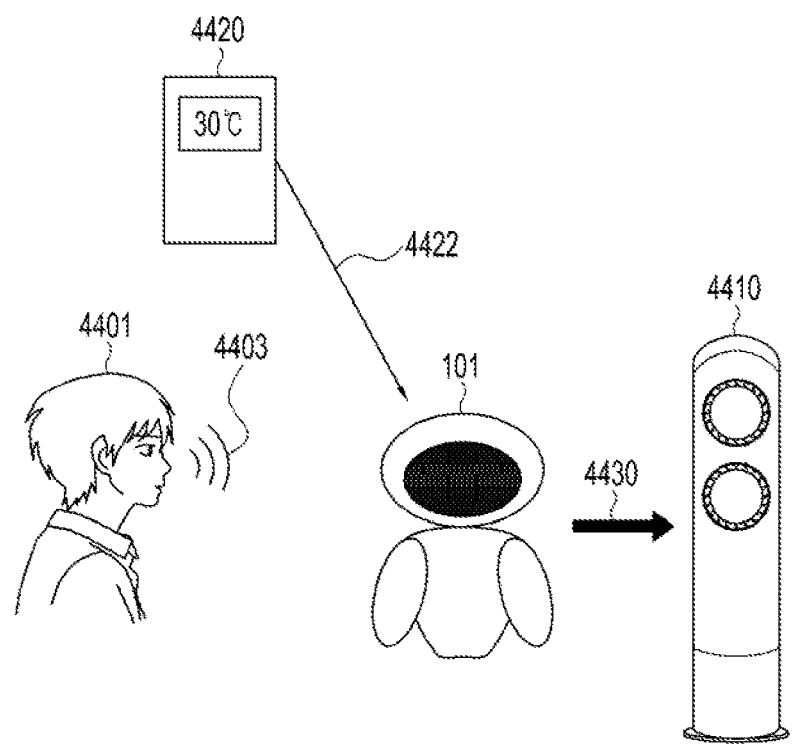

FIGS. 44A and 44B are concept views illustrating operations of an electronic device according to various embodiments of the present disclosure.

Referring to FIG. 44A, the electronic device 101 may obtain a user voice 4402 from the user 4401. The electronic device 101 may receive the additional detection information 4421 including the current temperature from the thermometer 4420. For example, the electronic device 101 may receive the additional detection information 4421 indicating that the current temperature is 14 degrees Celsius. The electronic device 101 may obtain "It's hot" as the user voice 4402. The electronic device 101 may determine that the response level is the second response level through the analysis of the user voice "It's hot." Further, the electronic device 101 may maintain the response level as the second response level using the additional detection information 4421 indicating that the current temperature is 14 degrees Celsius. For example, the electronic device 101 may set the additional detection information indicating that the current temperature is 28 degrees Celsius or higher as a condition for increasing the response level.

Referring to FIG. 44B, the electronic device 101 may obtain a user voice 4403 from the user 4401. The electronic device 101 may obtain the additional detection information obtained by capturing the user 4401. The electronic device 101 may receive the additional detection information 4422 including the current temperature from the thermometer 4420. For example, the electronic device 101 may receive the additional detection information 4422 indicating that the current temperature is 30 degrees Celsius. The electronic device 101 may obtain "It's hot" as the user voice 4403. The electronic device 101 may determine that the response level is the second response level through the analysis of the user voice "It's hot." Further, the electronic device 101 may adjust the response level to the first response level using the additional detection information 4422 indicating that the current temperature is 30 degrees Celsius. For example, the electronic device 101 may set the additional detection information indicating that the current temperature is 28 degrees Celsius or higher as a condition for increasing the response level and may adjust the response level corresponding to the satisfaction of the set condition. The electronic device 101 may transmit a driving signal 4430 to the air conditioner 4410 based on the first response level.

As described above, the electronic device 101 may determine that the user voice has different response levels depending on different pieces of additional detection information even for the same user voice.

According to an embodiment of the present disclosure, a method for controlling an electronic device may comprise obtaining a user voice, determining a response level of the user voice, when the response level of the user voice is a first response level, performing an operation corresponding to the user voice based on a time point of obtaining the user voice, and when the response level of the user voice is a second response level, performing the operation corresponding to the user voice based on a time point of detecting an additional event.

According to an embodiment of the present disclosure, the determining of the response level of the user voice may include obtaining text obtained by recognizing the user voice and determining the response level of the user voice based on whether a keyword included in the text meets a predetermined rule.

According to an embodiment of the present disclosure, the determining of the response level of the user voice may include, when the keyword included in the text meets a rule corresponding to the first response level, determining that the response level of the user voice is the first response level.

According to an embodiment of the present disclosure, the rule corresponding to the first response level may include detecting at least one of a control keyword indicating control of the electronic device, a keyword indicating the electronic device performing an operation, a keyword indicating a place where the operation is performed, or a keyword indicating a time to perform the operation.

According to an embodiment of the present disclosure, the determining of the response level of the user voice may include, when the keyword included in the text meets a rule corresponding to the second response level, determining that the response level of the user voice is the second response level.

According to an embodiment of the present disclosure, the rule corresponding to the second response level may include detecting at least one of a keyword indicating a user's emotion or status, a keyword indicating a status of an environment, a keyword indicating a history of the electronic device, a keyword indicating a content of an operation of the electronic device performing the operation, or a keyword indicating an operation status of the electronic device performing the operation.

According to an embodiment of the present disclosure, the rule may include an ontology having layers classified depending on abstraction levels related to accuracy for grasping an intention of a command and including association information between the layers or association information between the included keywords.

According to an embodiment of the present disclosure, the determining of the response level of the user voice may include comparing the keyword included in the text with the ontology, assigning a score to each keyword included in the text according to a result of the comparison, and comparing a sum of assigned scores with a predetermined threshold to determine the response level of the user voice.

According to an embodiment of the present disclosure, the determining of the response level of the user voice may include, when the sum of the assigned scores exceeds a first threshold, determining that the response level of the user voice is the first response level, and when the sum of the assigned scores exceeds a second threshold and not more than the first threshold, determining that the response level of the user voice is the second response level.

According to an embodiment of the present disclosure, the method may further comprise expanding or updating the rule based on obtained information.

According to an embodiment of the present disclosure, the determining of the response level of the user voice may include interpreting the text in natural language and determine first whether a keyword classified as a verb as a result of the interpretation of the natural language meets the rule.

According to an embodiment of the present disclosure, the determining of the response level of the user voice may include obtaining the user's emotion using a result of analysis of the user voice or using additional information from another electronic device and determining the response level of the user voice using the user's emotion and whether the predetermined rule is met.

According to an embodiment of the present disclosure, the method may further comprise, when the response level of the user voice is the second response level, determining operation candidates corresponding to the user voice.

According to an embodiment of the present disclosure, the method may further comprise outputting the determined operation candidates and upon detecting the additional event of selecting any one of the operation candidates, performing the selected operation.

According to an embodiment of the present disclosure, the method may further comprise, upon detecting another additional event, outputting the determined operation candidates.

According to an embodiment of the present disclosure, the method may further comprise obtaining text obtained by recognizing the user voice and determining the operation candidates by combining the keyword included in the text with an associated keyword on an ontology, wherein the ontology may have layers classified depending on abstraction levels related to accuracy for grasping an intention of a command and include association information between the layers or association information between the included keywords.

According to an embodiment of the present disclosure, when the response level of the user voice is the second response level, performing an operation corresponding to the user voice based on a time point of detecting the additional event may include obtaining user identification information corresponding to the user voice, and when the response level of the user voice is the second response level, performing an operation corresponding to the user voice depending on whether a user corresponding to the additional event has the same user identification information as the user identification information corresponding to the user voice.

According to an embodiment of the present disclosure, when the response level of the user voice is the second response level, performing an operation corresponding to the user voice based on a time point of detecting the additional event may include determining a first time when the user voice is obtained, and when the response level of the user voice is the second response level, performing an operation corresponding to the user voice depending on whether a difference between the first time and a second time when the additional event is detected is less than a predetermined threshold.

According to an embodiment of the present disclosure, the method may further comprise obtaining another user voice and comparing the response level of the user voice with a response level of the other user voice and performing one of an operation corresponding to the user voice or an operation corresponding to the other user voice.

According to an embodiment of the present disclosure, the method may further comprise performing one of the operation corresponding to the user voice or the operation corresponding to the other user voice using relation information between a first user corresponding to the user voice and a second user corresponding to the other user voice.

According to an embodiment of the present disclosure, the method may further comprise outputting a control signal for performing the operation to hardware different for each of the first response level and the second response level.

According to an embodiment of the present disclosure, the method may further comprise, when the response level of the user voice is a third response level, disregarding the user voice.

According to an embodiment of the present disclosure, a method for controlling an electronic device may comprise detecting a first event set to run a first operation, determining whether a restricting condition on performing the first operation is met, when the restricting condition on performing the first operation is not met, performing the first operation based on a time point of detecting the first event, and when the restricting condition on performing the first operation is met, performing the first operation based on a time point of detecting a second event different from the first event.

According to an embodiment of the present disclosure, the second event may be an event where the restricting condition is released.

According to an embodiment of the present disclosure, a method for controlling an electronic device may comprise obtaining a user motion, determining a response level of the user motion, when a response level of the user motion is a first response level, performing an operation corresponding to the user motion based on a time point of obtaining a user voice, and when the response level of the user motion is a second response level, performing the operation corresponding to the user motion based on a time point of detecting an additional event.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing instructions executed by at least one processor to enable the processor to perform at least operation that may include obtaining a user voice, determining a response level of the user voice, when the response level of the user voice is a first response level, performing an operation corresponding to the user voice based on a time point of obtaining the user voice, and when the response level of the user voice is a second response level, performing the operation corresponding to the user voice based on a time point of detecting an additional event.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a microphone;
   a memory; and
   at least one processor electrically connected with the memory, the display and the microphone,
   wherein the memory is configured to store instructions for the at least one processor,
   wherein the instructions, which when executed by the at least one processor, cause the electronic device to:
      obtain a user voice of a first user via the microphone,
      obtain at least one keyword from the user voice,
      identify a response level of the user voice based on the at least one keyword obtained from the user voice,
      when the response level of the user voice identified based on the at least one keyword obtained from the user voice is a first response level, perform a first operation corresponding to the user voice as a response to the user voice,
      when the response level of the user voice identified based on the at least one keyword obtained from the user voice is a second response level different from the first response level, control the display to display a user interface including one or more operation candidates based on the at least one keyword, and
      when the response level of the user voice is the second response level and an event associated with the first user is detected within a predetermined time after obtaining the user voice of the first user, begin to perform a second operation corresponding to at least one operation candidate among the one or more operation candidates as the response to the user voice,
   wherein the first response level is a statement to directly perform a command, and
   wherein the second response level is a statement to in-directly perform a command.

2. The electronic device of claim 1, wherein the instructions being further configured to, which when executed by the at least one processor, cause the electronic device to:
   obtain text by recognizing the user voice, and
   identify the response level of the user voice based on whether the at least one keyword included in the text meets a predetermined rule.

3. The electronic device of claim 2, wherein the instructions being further configured to, which when executed by the at least one processor, cause the electronic device to, when the at least one keyword included in the text meets a rule corresponding to the first response level, identify that the response level of the user voice is the first response level.

4. The electronic device of claim 3, wherein the rule corresponding to the first response level comprises detecting at least one of a control keyword indicating control of the electronic device, a keyword indicating the electronic device, a keyword indicating a place, or a keyword indicating a time.

5. The electronic device of claim 2, wherein the instructions being further configured to, which when executed by the at least one processor, cause the electronic device to, when the at least one keyword included in the text meets a rule corresponding to the second response level, identify that the response level of the user voice is the second response level.

6. The electronic device of claim 5, wherein the rule corresponding to the second response level comprises detecting at least one of a keyword indicating a user's emotion or status, a keyword indicating a status of an environment, a keyword indicating a history of the electronic device, a keyword indicating a content of an operation of the electronic device, or a keyword indicating an operation status of the electronic device.

7. The electronic device of claim 2, wherein the predetermined rule comprises an ontology having layers classified depending on abstraction levels related to accuracy for grasping an intention of a command and including association information between the layers or association information between included keywords.

8. The electronic device of claim 7, wherein the instructions being further configured to, which when executed by the at least one processor, cause the electronic device to:
   compare the at least one keyword included in the text with the ontology,
   assign a score to each keyword included in the text according to a result of the comparison, and
   compare a sum of assigned scores with a predetermined threshold to determine the response level of the user voice.

9. The electronic device of claim 8, wherein the instructions being further configured to, which when executed by the at least one processor, cause the electronic device to:
   when a sum of the assigned scores exceeds a first threshold, identify that the response level of the user voice is the first response level, and
   when the sum of the assigned scores exceeds a second threshold and not more than the first threshold, identify that the response level of the user voice is the second response level.

10. The electronic device of claim 2, wherein the instructions being further configured to, which when executed by the at least one processor, cause the electronic device to expand or update the predetermined rule based on obtained information.

11. The electronic device of claim 2, wherein the instructions being further configured to, which when executed by the at least one processor, cause the electronic device to:
    interpret the text in natural language, and
    determine whether a keyword classified as a verb as a result of the interpretation of the natural language meets the predetermined rule.

12. The electronic device of claim 2, wherein the instructions being further configured to, which when executed by the at least one processor, cause the electronic device to:
    obtain a user's emotion using a result of analysis of the user voice or using additional information from another electronic device,
    identify the response level of the user voice using the user's emotion, and
    determine whether the predetermined rule is met.

13. The electronic device of claim 1,
wherein the instructions being further configured to, which when executed by the at least one processor, cause the electronic device to:
output a voice output including the at least one operation candidate via a speaker of the electronic device, and
upon detecting the event within the predetermined time after obtaining the user voice, select the at least one operation candidate, and
wherein the second operation corresponding to the selected at least one operation candidate is performed based on a time point of detecting the event.

14. The electronic device of claim 13, wherein the instructions being further configured to, which when executed by the at least one processor cause the electronic device to, upon detecting another event associated with the first user, output the at least one operation candidate.

15. The electronic device of claim 1,
wherein the memory is configured to store an ontology having layers classified depending on abstraction levels related to accuracy for grasping an intention of a command and association information between the layers or association information between included keywords, and
wherein the instructions being further configured to, which when executed by the at least one processor, cause the electronic device to:
obtain text by recognizing the user voice, and
identify the at least one operation candidate by combining the at least one keyword included in the text with an associated keyword on the ontology.

16. The electronic device of claim 1, wherein the instructions being further configured to, which when executed by the at least one processor, cause the electronic device to:
obtain user identification information corresponding to the user voice, and
when the response level of the user voice is the second response level, perform the second operation corresponding to the user voice depending on whether a user corresponding to an event is the same as a user identified by the user identification information corresponding to the user voice.

17. The electronic device of claim 1, wherein the instructions being further configured to, which when executed by the at least one processor, cause the electronic device to:
determine a first time when the user voice is obtained, and
when the response level of the user voice is the second response level, perform the first operation corresponding to the user voice depending on whether a difference between the first time and a second time when an event is detected is less than a predetermined threshold.

18. The electronic device of claim 1, wherein the instructions being further configured to, which when executed by the at least one processor, cause the electronic device to:
obtain another user voice and compare the response level of the user voice with a response level of the other user voice, and
perform one of an operation corresponding to the user voice or an operation corresponding to the other user voice based on the comparison result.

19. The electronic device of claim 18, wherein the instructions being further configured to, which when executed by the at least one processor, cause the electronic device to perform one of the operation corresponding to the user voice or the operation corresponding to the other user voice by using relation information between the first user corresponding to the user voice and a second user corresponding to the other user voice.

20. The electronic device of claim 1, wherein the instructions being further configured to, which when executed by the at least one processor, cause the electronic device to output a control signal for performing the operation to hardware that is different for each of the first response level and the second response level.

21. The electronic device of claim 1, wherein the instructions being further configured to, which when executed by the at least one processor, cause the electronic device to, when the response level of the user voice identified based on the at least one keyword obtained from the user voice is a third response level, disregard the user voice.

22. The electronic device of claim 1, wherein the user interface including the one or more operation candidates is displayed after the identifying of the second response level.

* * * * *